US009802142B2

(12) United States Patent
Laverdiere et al.

(10) Patent No.: US 9,802,142 B2
(45) Date of Patent: Oct. 31, 2017

(54) PURIFIER CASSETTE

(71) Applicant: Entegris, Inc., Billerica, MA (US)

(72) Inventors: Marc Brian Laverdiere, Wakefield, MA (US); Hirokazu Kuwabara, Tokyo (JP); Koichi Kurata, Yonezawa (JP); John Paul Puglia, Townsend, MA (US); Ben Mai Pak Lee, Pelham, NH (US); Louis Joseph Barrows, Jr., Billerica, MA (US); Kalyan Madhavaram, Lowell, MA (US); Dmitri Michael Menn, Marblehead, MA (US); John Karl Niermeyer, Tyngsboro, MA (US)

(73) Assignee: ENTEGRIS, INC., Billerica, MA (US)

( * ) Notice: Subject to any disclaimer, the term of this patent is extended or adjusted under 35 U.S.C. 154(b) by 910 days.

(21) Appl. No.: 14/043,620

(22) Filed: Oct. 1, 2013

(65) Prior Publication Data

US 2014/0091027 A1   Apr. 3, 2014

Related U.S. Application Data

(60) Provisional application No. 61/708,470, filed on Oct. 1, 2012, provisional application No. 61/775,051, filed
(Continued)

(51) Int. Cl.
*B01D 29/52* (2006.01)
*B01D 63/14* (2006.01)
(Continued)

(52) U.S. Cl.
CPC ............ *B01D 29/52* (2013.01); *B01D 63/14* (2013.01); *B01D 65/00* (2013.01); *B25B 17/02* (2013.01);
(Continued)

(58) Field of Classification Search
CPC ........ B01D 29/52; B01D 65/00; B01D 63/14; B01D 2313/13; B01D 2313/18;
(Continued)

(56) References Cited

U.S. PATENT DOCUMENTS 1,664,125 A    3/1928 Lowrey
2,152,977 A    4/1939 Schindel
(Continued)

FOREIGN PATENT DOCUMENTS

CN    1676189       10/2005
CN    102202760    9/2011
(Continued)

OTHER PUBLICATIONS

Written Opinion issued for PCT/US2013/062744, mailed Sep. 12, 2014, 4 pages.
(Continued)

*Primary Examiner* — Madeline Gonzalez

(57) ABSTRACT

The present disclosure relates to purification cassettes that have reinforcing features. One embodiment relates to a purification cassette with tensions members. A purification system may include a removable cassette defining a media cavity. A set of tension members may span between a first sidewall and second sidewall. The set of tension members can divide the media cavity into a plurality of lanes.

12 Claims, 66 Drawing Sheets

Related U.S. Application Data on Mar. 8, 2013, provisional application No. 61/813,983, filed on Apr. 19, 2013, provisional application No. 61/826,880, filed on May 23, 2013, provisional application No. 61/835,884, filed on Jun. 17, 2013.

(51) Int. Cl.
| | |
|---|---|
| *B01D 65/00* | (2006.01) |
| *B25B 17/02* | (2006.01) |
| *F16L 19/00* | (2006.01) |
| *F16L 19/02* | (2006.01) |
| *F16L 19/025* | (2006.01) |

(52) U.S. Cl.
CPC ........... *F16L 19/005* (2013.01); *F16L 19/025* (2013.01); *F16L 19/0225* (2013.01); *B01D 2313/105* (2013.01); *B01D 2313/125* (2013.01); *B01D 2313/13* (2013.01); *B01D 2313/18* (2013.01); *B01D 2313/20* (2013.01); *B01D 2313/21* (2013.01); *B01D 2313/54* (2013.01); *B01D 2319/022* (2013.01); *B01D 2319/04* (2013.01); *Y10T 29/49826* (2015.01)

(58) Field of Classification Search
CPC ............ B01D 2319/04; B01D 2313/54; B01D 2313/21; B01D 2313/105; B01D 2313/20; B01D 2319/022; B01D 2313/125; F16L 19/0225; F16L 19/025; F16L 19/005; B25B 17/02; Y10T 29/49826
USPC ....... 210/346, 331, 335, 340, 314, 224, 231, 210/493.1, 262
See application file for complete search history.

(56) References Cited

U.S. PATENT DOCUMENTS

| | | | |
|---|---|---|---|
| 2,359,138 | A | 9/1944 | Martin |
| 2,387,368 | A | 10/1945 | Vokes |
| 2,419,004 | A | 4/1947 | Bieker et al. |
| 3,596,932 | A | 8/1971 | Kinsey |
| 3,712,583 | A | 1/1973 | Martindale et al. |
| 3,948,777 | A | 4/1976 | Murata et al. |
| 3,965,012 | A | 6/1976 | Eguchi et al. |
| 4,043,239 | A | 8/1977 | DeFusco |
| 4,098,419 | A | 7/1978 | Virog, Jr. et al. |
| 4,219,422 | A | 8/1980 | Knothe et al. |
| 4,304,669 | A | 12/1981 | Knothe et al. |
| 5,219,529 | A | 6/1993 | Ngo et al. |
| 5,376,270 | A | 12/1994 | Spearman |
| 5,405,528 | A | 4/1995 | Selbie et al. |
| 5,468,449 | A | 11/1995 | Sjogren et al. |
| 5,470,531 | A | 11/1995 | Sjogren et al. |
| 5,543,047 | A | 8/1996 | Stoyell et al. |
| 5,628,417 | A | 5/1997 | Van Halteren |
| 5,871,239 | A | 2/1999 | Boscaljon et al. |
| 6,050,609 | A | 4/2000 | Boscaljon et al. |
| 6,073,973 | A | 6/2000 | Boscaljon et al. |
| 6,117,390 | A | 9/2000 | Corey, Jr. |
| 6,143,174 | A | 11/2000 | Graus |
| 6,207,116 | B1 | 3/2001 | Heed |
| 6,277,277 | B1 | 8/2001 | Jacobi et al. |
| 6,378,907 | B1 | 4/2002 | Campbell et al. |
| 6,409,784 | B1 | 6/2002 | Wehr |
| 6,458,278 | B1 | 10/2002 | Leoncavallo et al. |
| 6,511,098 | B1 | 1/2003 | Luterstein |
| 6,568,540 | B1 | 5/2003 | Holzmann et al. |
| 6,800,199 | B1 | 10/2004 | Rhee |
| 6,908,121 | B2 | 6/2005 | Hirth et al. |
| 7,021,667 | B2 | 4/2006 | Campbell et al. |
| 7,037,424 | B2 | 5/2006 | Niermeyer et al. |
| 7,163,237 | B2 | 1/2007 | Niermeyer et al. |
| 7,222,889 | B2 | 5/2007 | Breay |
| 7,296,582 | B2 | 11/2007 | Campbell et al. |
| 7,300,483 | B2 | 11/2007 | Hauville |
| 7,350,821 | B2 | 4/2008 | Campbell et al. |
| 7,387,210 | B2 | 6/2008 | Burrows et al. |
| 7,407,148 | B2 | 8/2008 | Bassett et al. |
| 7,547,049 | B2 | 6/2009 | Gashgaee |
| 7,963,572 | B2 | 6/2011 | Bull et al. |
| 2002/0163181 | A1 | 11/2002 | Russell |
| 2003/0094405 | A1 | 5/2003 | Stamey et al. |
| 2003/0217958 | A1 | 11/2003 | Reid |
| 2004/0070200 | A1 | 4/2004 | Campbell et al. |
| 2004/0207202 | A1 | 10/2004 | Parks |
| 2004/0232064 | A1 | 11/2004 | Wilkinson et al. |
| 2005/0167352 | A1 | 8/2005 | Burrows et al. |
| 2006/0032806 | A1 | 2/2006 | Parker |
| 2006/0043021 | A1 | 3/2006 | Pesakovich et al. |
| 2006/0213827 | A1 | 9/2006 | Nozaki |
| 2006/0219622 | A1 | 10/2006 | Arteche et al. |
| 2006/0254230 | A1 | 11/2006 | Powell |
| 2007/0125541 | A1 | 6/2007 | Bull et al. |
| 2008/0116688 | A1 | 5/2008 | Bull et al. |
| 2009/0321339 | A1 | 12/2009 | Suzuki et al. |
| 2010/0140156 | A1 | 6/2010 | Levy et al. |
| 2011/0011782 | A1 | 1/2011 | Myers et al. |
| 2012/0074053 | A1 | 3/2012 | Collignon et al. |
| 2013/0154253 | A1 | 6/2013 | Yuhara et al. |
| 2013/0161941 | A1 | 6/2013 | Zulauf et al. |
| 2014/0238922 | A1 | 8/2014 | Puglia et al. |
| 2014/0246383 | A1 | 9/2014 | Puglia et al. |
| 2015/0247595 | A1 | 9/2015 | Laverdiere et al. |
| 2015/0273365 | A1 | 10/2015 | Laverdiere et al. |

FOREIGN PATENT DOCUMENTS

| | | |
|---|---|---|
| CN | 102228754 A | 11/2011 |
| CN | 102574065 | 7/2012 |
| CN | 202561304 U | 11/2012 |
| CN | 202612910 U | 12/2012 |
| DE | 2851776 A1 | 6/1980 |
| DE | 7835503 U1 | 7/1981 |
| DE | 10337652 A1 | 3/2005 |
| EP | 0983784 | 3/2000 |
| EP | 1600199 A1 | 11/2005 |
| EP | 1600199 A1 | 11/2005 |
| EP | 1637206 A1 | 3/2006 |
| EP | 2484430 A1 | 8/2012 |
| FR | 2664672 A1 | 1/1992 |
| FR | 2935102 A1 | 2/2010 |
| GB | 771968 | 4/1957 |
| GB | 1152093 | 5/1969 |
| GB | 1392401 | 4/1975 |
| GB | 1510394 | 5/1978 |
| GB | 2082080 | 3/1982 |
| GB | 2082080 A | 3/1982 |
| GB | 2086762 A | 5/1982 |
| GB | 2485360 A | 5/2012 |
| JP | S55-95743 | 7/1980 |
| JP | EP 2484430 A1 * | 8/2012 ............ B01D 53/22 |
| WO | WO 97/33673 A1 | 9/1997 |
| WO | WO0053285 | 9/2000 |
| WO | WO 01/48413 A1 | 7/2001 |
| WO | WO0147620 | 7/2001 |
| WO | WO 01/83079 A1 | 11/2001 |
| WO | WO 2007/007898 A1 | 1/2007 |
| WO | WO2007024842 A2 | 3/2007 |
| WO | WO2007149273 | 12/2007 |
| WO | WO 2009/022768 A1 | 2/2009 |
| WO | WO 2009/059324 A2 | 5/2009 |
| WO | WO 2009/062912 A2 | 5/2009 |

OTHER PUBLICATIONS

International Search Report and Written Opinion issued for PCT/US2013/062743, mailed Sep. 25, 2014, 19 pages.
Written Opinion issued for PCT/US2013/062745, mailed Oct. 15, 2014, 12 pages.
ZeeWeed1000 Ultrafiltration Membrane, GE Water Product Information, 3 pgs., GE Water & Process Technologies, Trevose, PA, US,

(56) References Cited

OTHER PUBLICATIONS accessed Oct. 3, 2011 at http://www.gewater.com/products/equipment/mf_uf_mbr/zeeweed_1000.jsp.
Purifier Design History, Feb. 19, 2007, 13 pgs., Entegris, Inc., Billerica, MA.
International Search Report and Written Opinion of the International Searching Authority for International Application No. PCT/US2012/000427, mailed Dec. 19, 2012, 12 pgs.
International Search Report and Written Opinion of the International Searching Authority for International Application No. PCT/US2012/000437, mailed Dec. 21, 2012, 14 pgs.
Second Written Opinion of the International Preliminary Examining Authority for International Application No. PCT/US2012/000427, mailed Sep. 30, 2013, 11 pgs.
Second Written Opinion of the International Preliminary Examining Authority for International Application No. PCT/US2012/000437, mailed Sep. 30, 2013, 11 pgs.
Office Action issued for Chinese Patent Application No. 201280048928.6, mailed Sep. 7, 2015, 18 pages.
Office Action issued for U.S. Appl. No. 14/432,741, mailed Jan. 13, 2016, 14 pages.
Office Action issued for Chinese Patent Application No. 201280048928.6, mailed Feb. 1, 2016, 15 pages.
Office Action issued for Chinese Patent Application No. 201380062389.6, mailed Feb. 1, 2016, 14 pages.
Office Action issued for Chinese Patent Application No. 201280048849.5, mailed Nov. 13, 2014, 6 pages.
International Preliminary Report on Patentability issued for PCT Application No. PCT/US2013/062744, mailed Dec. 11, 2014, 32 pages.
Office Action issued for U.S. Appl. No. 14/349,623, mailed Dec. 19, 2014, 20 pages.
International Search Report and Written Opinion issued for PCT Application No. PCT/US2013/062745, mailed May 21, 2014, 19 pages.
International Search Report and Written Opinion of the International Searching Authority for International Patent Application No. PCT/US2013/062744, mailed Dec. 3, 2013, 11 pgs.
Final Examination Report (Notice of Allowance) issued for Singaporean Patent Application No. 11201401180X, mailed Nov. 24, 2015, 14 pgs.
Chinese Patent Application No. 201280048849.5, mailed Dec. 10, 2015, 11 pages.
Corrected International Preliminary Report on Patentability issued for PCT Application No. PCT/US2012/000427, mailed Dec. 14, 2015, 37 pages.
Office Action issued for U.S. Appl. No. 14/349,623, mailed Dec. 14, 2015, 26 pages.
Office Action issued for Chinese Patent Application No. 201380062532.1, mailed Dec. 16, 2015, 21 pages.
Partial International Search for International Patent Application No. PCT/US2013/062743, mailed Jan. 23, 2014, 4 pgs.
Partial International Search for International Patent Application No. PCT/US2013/062745, mailed Jan. 23, 2014, 4 pgs.
International Preliminary Report on Patentability for International Application No. PCT/US2012/000427, mailed Feb. 12, 2014, 69 pgs.
International Preliminary Report on Patentability for International Application No. PCT/US2012/000437, mailed Feb. 12, 2014, 45 pgs.
Examination Report issued for Singaporean Patent Application No. 11201401179P, mailed Jan. 5, 2015, 11 pages.
Office Action issued for Chinese Patent Application No. CN201280048928.6, mailed Dec. 2, 2014, 7 pages.
2nd Written Opinion issued for PCT Application No. PCT/US2013/062743, mailed Feb. 16, 2015, 12 pages.
International Preliminary Report on Patentability (IPRP) issued for PCT Application No. PCT/US2013/062745, mailed Mar. 30, 2015, 100 pages.
Search Report issued for Singaporean Patent Application No. 11201401180X, mailed Feb. 27, 2015, 8 pages.
Written Report issued for Singaporean Patent Application No. 11201401180X, mailed Feb. 27, 2015, 11 pages.
International Preliminary Report on Patentability (IPRP) issued for PCT Application No. PCT/US2013/062743, mailed Jun. 6, 2015, 90 pages.
Office Action issued for Chinese Patent Application No. 201280048849.5, mailed Jun. 15, 2015, 12 pages.
Final Office Action issued for U.S. Appl. No. 14/349,623, mailed Jul. 15, 2015, 21 pages.

\* cited by examiner

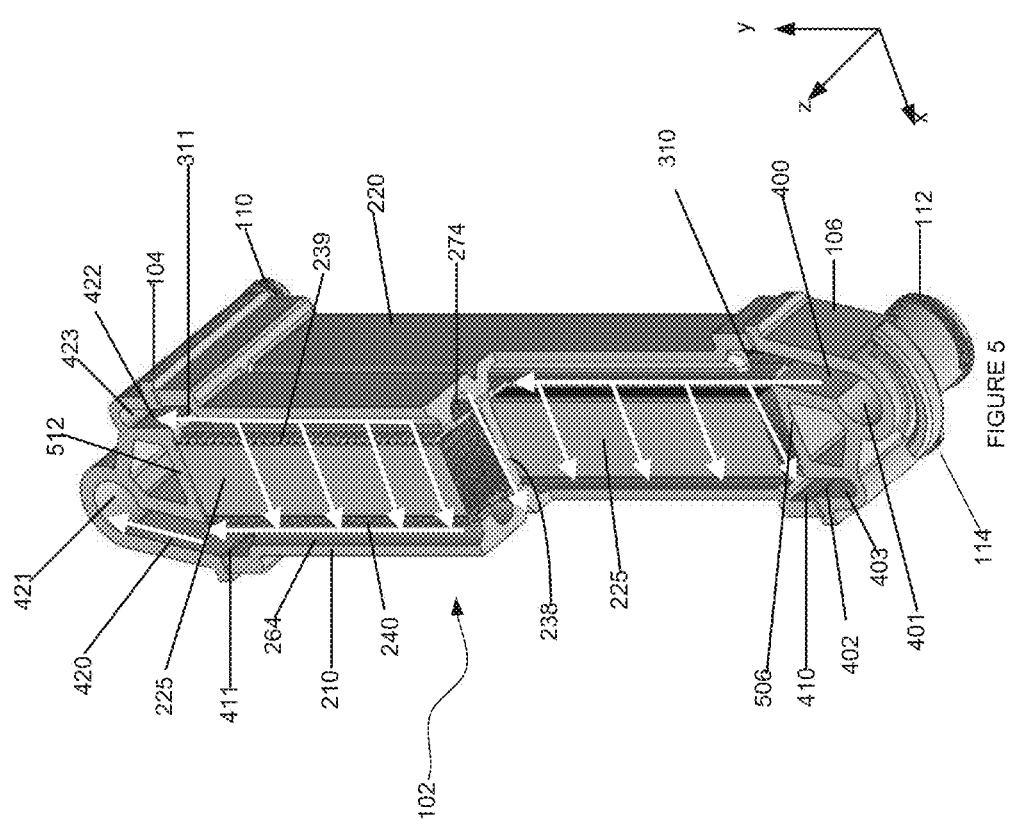

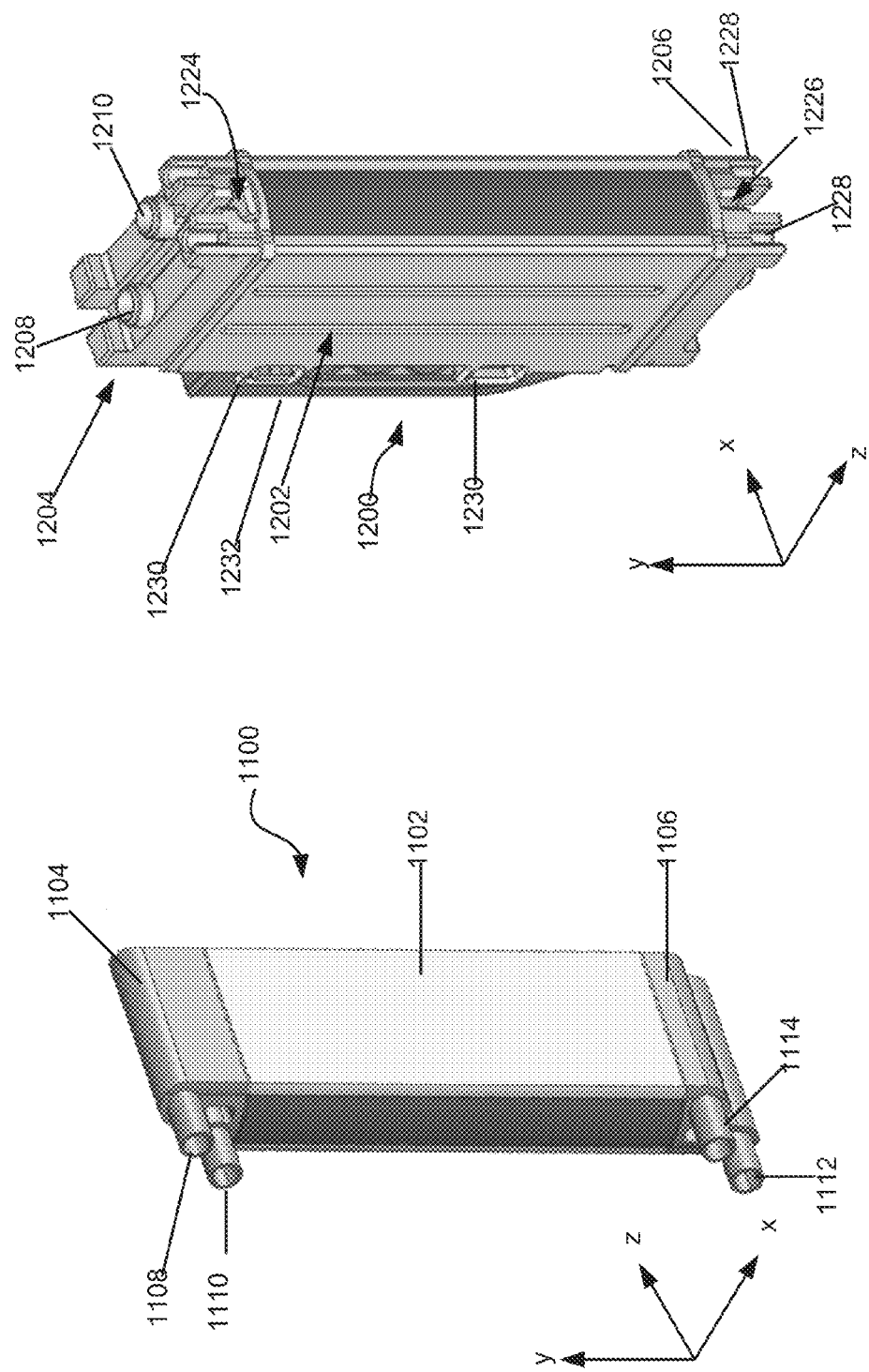

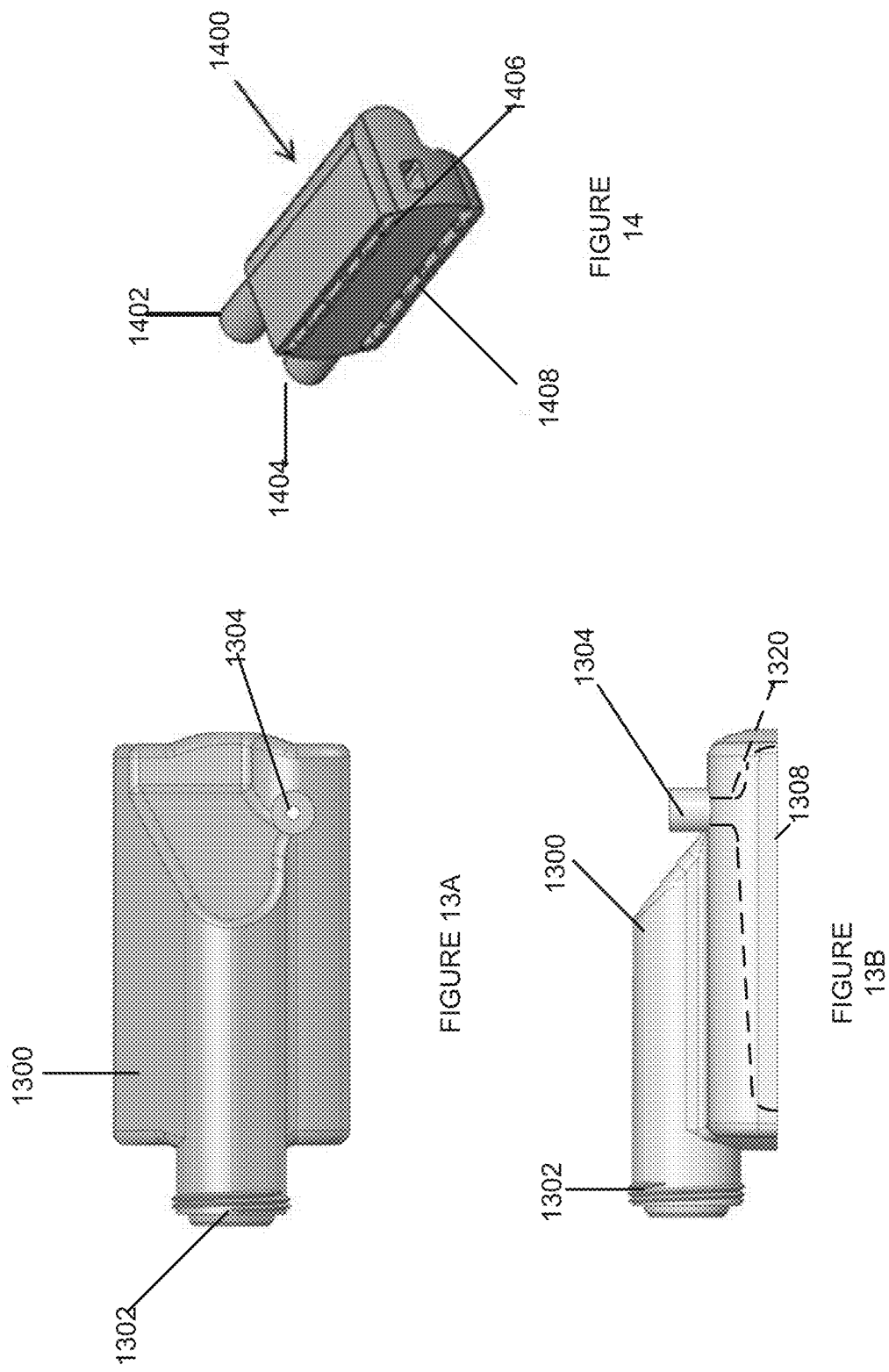

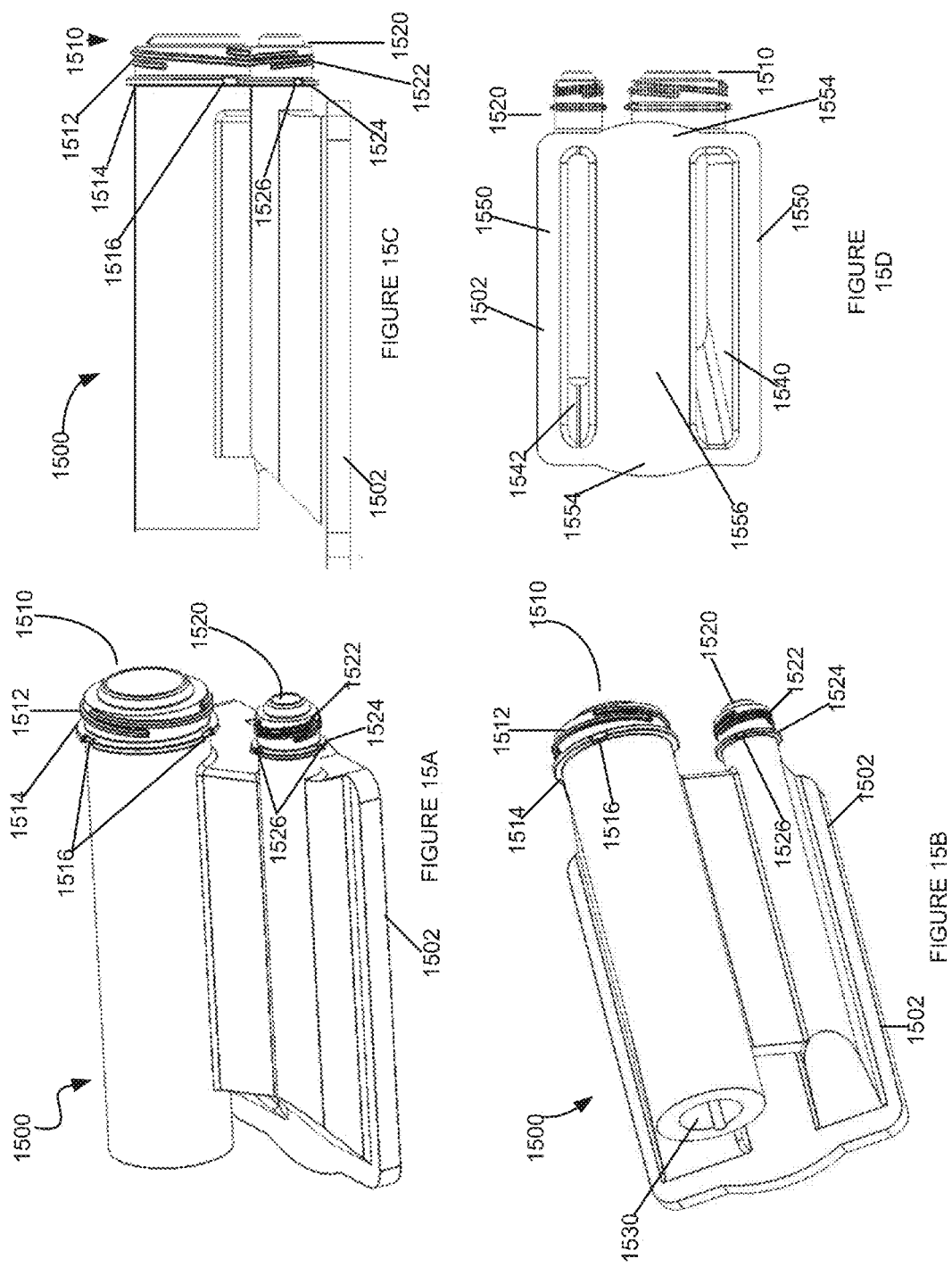

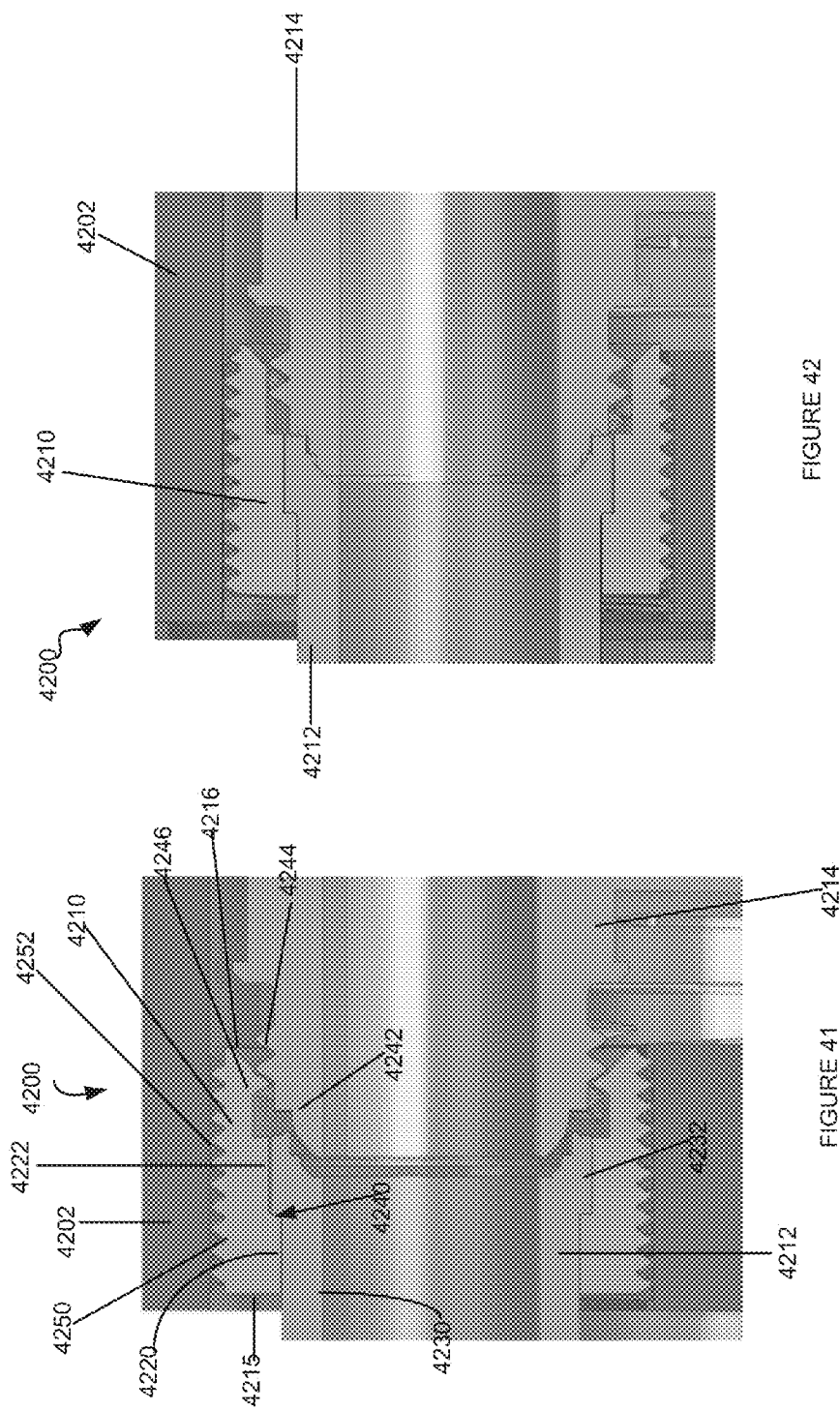

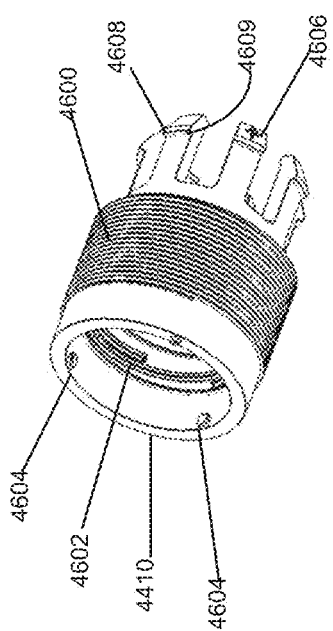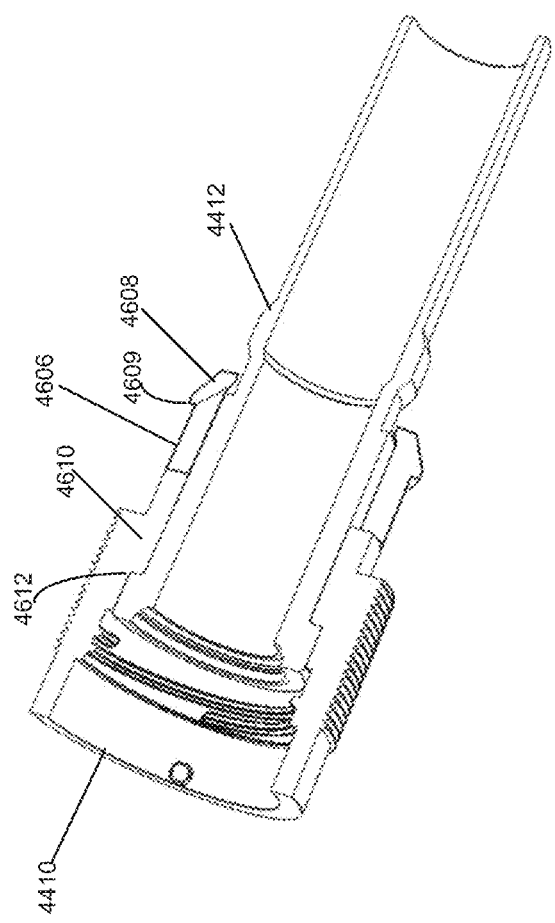

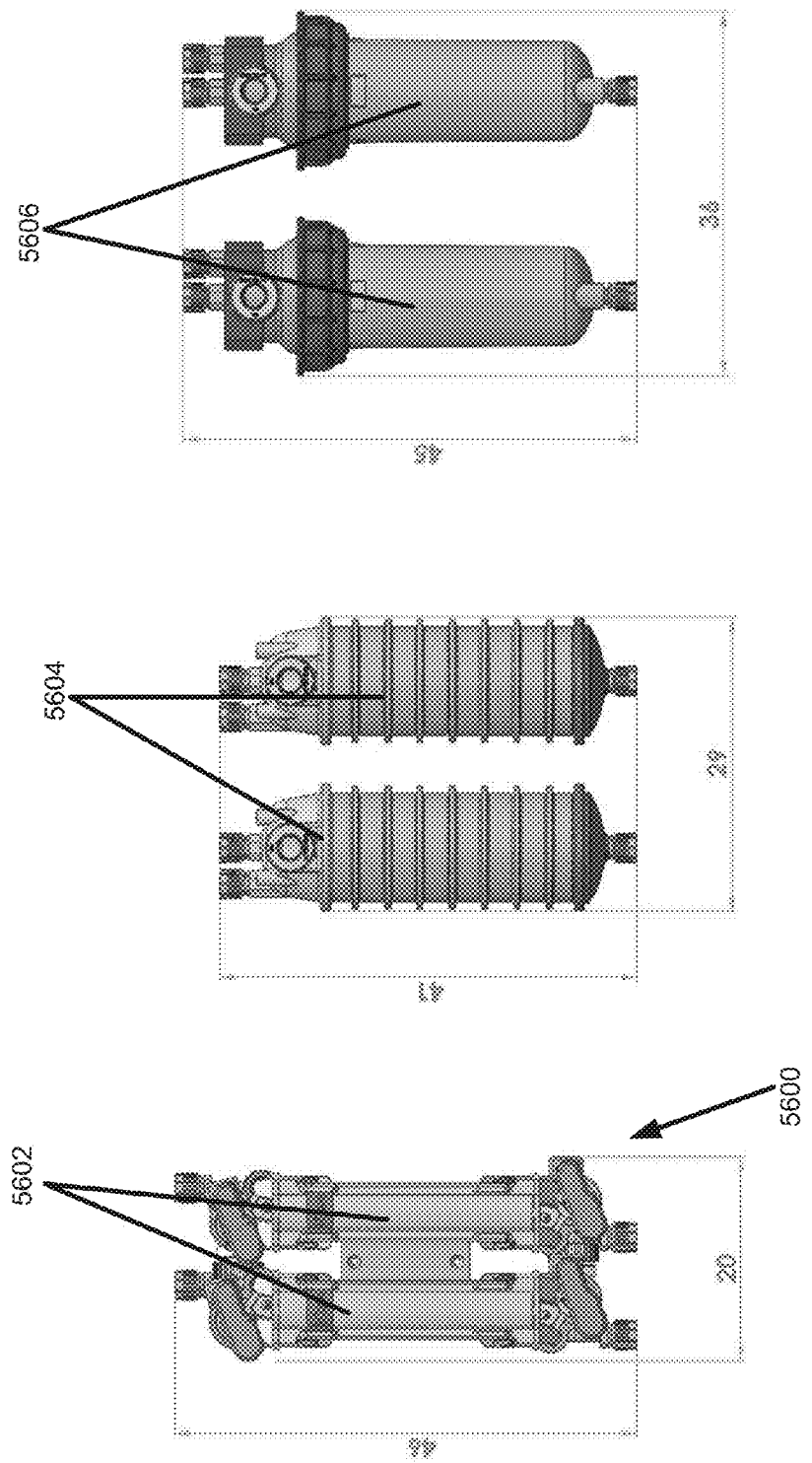

PURIFIER CASSETTE

RELATED APPLICATIONS

This application claims the benefit of priority under 35 USC 119(e) to U.S. Provisional Patent Application No. 61/708,470, entitled "Modular Filter With Tension Members," filed Oct. 1, 2012, U.S. Provisional Patent Application No. 61/775,051, entitled "Modular Filter With Tension Members and Manifold for Modular Filters," filed Mar. 8, 2013, U.S. Provisional Patent Application No. 61/813,983, entitled "Manifold for Modular Filters, Modular Filter Cassettes and Connection Systems," filed Apr. 19, 2013, U.S. Provisional Patent Application No. 61/826,880, entitled "Modular Filter with Tension Members," filed May 23, 2013, and U.S. Provisional Patent Application No. 61/835,884, entitled "Manifold for Modular Filters, Modular Filter Cassettes and Connection Systems," filed Jun. 17, 2013, each of which is fully incorporated herein by reference for all purposes.

TECHNICAL FIELD

This disclosure relates to purification and filtration systems. More particularly, embodiments described herein relate to modular purification and filtration systems. Even more particularly, embodiments described herein relate to modular purification and filtration systems for purifying semiconductor manufacturing fluids.

BACKGROUND

Semiconductor manufacturing processes are highly sensitive to contamination because depositing even a tiny particle or other contaminants (metals, not volatile residue) on a semiconductor wafer can lead to defects. Therefore, it is common to employ ultraclean purifiers having membranes that remove submicron particles, residues like metal ions and other contaminants. Although different filtration modules have been developed to filter semiconductor manufacturing liquids, rectangular shaped filters have been avoided because rectangular designs are typically unable to meet the filtering and flow rate requirements in a compact design that can withstand the pressures used in semiconductor manufacturing. Therefore, many existing filter modules are cylindrical, having a housing with a one-piece cylindrical bowl or sleeve in which the filter membrane resides. Typically, these filters contain a circular pleated filter membrane that is encased between an external shell and an internal core. Fluid enters the filter module from the top or bottom, flowing between the sleeve before passing through the shell, passing through the filter membrane to the hollow core and exiting the module.

Existing cylindrical filter modules suffer several shortcomings. One deficiency is that the circular pleated membrane unduly restricts fluid flow because the membrane must be more tightly packed towards the center in order to achieve the circular configuration. Another deficiency is that the cylindrical housings are molded or extruded as single pieces, making it difficult or impossible to add geometries that run perpendicular to the cylinder's axis. Furthermore, many existing filter modules are difficult to install and replace. Since many liquids used in semiconductor manufacturing are corrosive or toxic, filter module replacement presents a danger to workers.

Current filtration systems that employ cylindrical filters have limited configurability. In many cases, filters are connected through multiple units in a fixed configuration, making it difficult to change the flow through the filters from serial to parallel as needed. Additionally, many filtration systems use only a single type of filter, limiting the ability to apply different filters for different purposes or particle sizes in a single filtration system.

SUMMARY

Embodiments of modular purification systems and methods are described. One embodiment can include a compact pressure vessel that can be used as a purifier cassette or for another purpose. The pressure vessel can comprise a main body having a set of media cavity sidewalls that define an interior cavity. A first port can be fluidly connected to a first portion of the interior cavity and a second port can be fluidly coupled to a second portion of the media cavity.

The set of interior cavity sidewalls can comprise a first sidewall, a second sidewall, a third sidewall and a fourth sidewall, the first sidewall opposite the second sidewall and the third sidewall opposite the fourth sidewall. One or more tension members can be coupled to the first sidewall and the second sidewall of the media cavity and can divide the media cavity into a plurality of sections.

According to one embodiment, the purifier body can be configured with reinforcing structures. According to one embodiment, the reinforcing structures comprise reinforcing ribs extending the length of the device (or other length) that can provide, in one embodiment, the dual functions of providing flow paths and reinforcing the main body. The reinforcing ribs may define arced, elliptical or otherwise rounded flow paths, thereby providing reinforcing arches. Thus, according to one embodiment, a series of reinforcing arches can define the flow paths along the sidewall.

The main body, according to one embodiment, can include a plurality of hoop-like structures to distribute load through the pressure vessel structure, allowing the pressure vessel to withstand high pressure and temperature applications. The hoop-like structures can promote hoop stress to place the first sidewall, second sidewall third sidewall and fourth sidewall in tension.

One or more tensions members can be provided. According to one embodiment, the tension members can run parallel to the third sidewall and fourth sidewall and divide the media cavity into a plurality of lanes. A purification element can be disposed in each of the plurality of lanes. In some embodiments, the purification elements can comprise a compressed generally rectangular pleat pack arranged with a first set of pleat tips facing the upstream portion of the media cavity and a second set of pleat tips facing the downstream portion of the media cavity.

The purifier cassette can further comprise a first set of primary flow channels disposed along the first sidewall and a second set of primary flow channels disposed along the second sidewall. The first set of primary flow channels and second set of primary flow channels can be aligned with the plurality of lanes on opposite sides of the plurality of lanes. Each of the first set of primary flow channels may be fluidly coupled to the first port and be configured to exchange fluid with the first side of the plurality of lanes and each of the second set of primary flow channels may be fluidly coupled to the second port and be configured to exchange fluid with a second side of the plurality of lanes. A first set of sub-channels may be disposed in the first set of primary flow channels and a second set of sub-channels may be disposed in the second set of primary flow channels. The first set of primary flow channels can include a first set of plenums connected to the first set of sub-channels and the second set of primary flow channels can include a second set of plenums connected to the second set of sub-channels.

According to one embodiment, the main body comprises a first side cover comprising the first sidewall and defining the first set of primary flow channels, a second side cover comprising the second sidewall and defining the second set of primary flow channels and a main shell. The main shell may further comprise a base having openings to allow fluid to flow between the plurality of lanes and the second set of flow channels. The main shell may further comprise the third sidewall, the fourth sidewall and a set of tension members. The second side cover can be coupled to the base and the first side cover can be coupled to a distal end of the third sidewall, a distal end of the fourth sidewall and a distal end of the tension member and the second side over is coupled to the base.

The purifier cassette can further include a first end cap and a second end cap. An end cap can include a port fitting having a set of port fitting external threads, such as multi-start threads that configured to engage with inner threads of a connection nut. The connection system and fitting may include alignment features to help ensure that the fitting external threads and connection nut internal threads are properly aligned.

The connection system and cassette may include alignment features. In one embodiment, the alignment features of the fitting may include an alignment rib and a slot disposed in a rotation member to receive the alignment rib. The alignment rib and slot may be configured so that the rotation member is rotated to a certain angle (e.g., corresponding to a position in which the threads are aligned) before the alignment rib can enter the slot. The alignment rib and slot may be helical.

The connection nut may include the connection system alignment features. In one embodiment, the connection nut can include a first alignment feature and the port fitting may comprise a second alignment feature spaced to align with the first alignment feature of the connection nut. According to one embodiment, the first alignment feature can be a set of inner projections and the second alignment feature can be a set of notches (e.g., defined in a port rib or elsewhere). The second alignment feature can be spaced from a start of a set of port fitting external threads such that inner connection nut threads cannot engage the set of port fitting external threads unless the alignment feature of the connection nut mates with the alignment feature of the fitting (for example, the inner projections are received by the notches). In some cases, the alignment feature of the connection system passes through the alignment feature of the fitting before the connection nut can rotate (or vice versa).

The alignment features can be configured so that only certain cassettes fit in certain manifolds (or particular positions within a manifold) (e.g., to ensure proper cassettes are used for certain applications). For example, the notch sets and inner projections can be altered in geometry, spacing, or other aspect for different fittings/connection nuts.

Another embodiment can comprise an end cap configured to engage with a connection system that has a connection system fitting and a connection nut with inner multi-start threads. The end cap can include a first port fitting that has a set of external multi-start threads configured to engage with the connection nut inner multi-start threads such that the connection nut inner multi-start threads. The connection nut internal threads can be configured to create a seal between the first port fitting and another fitting with less than 360 degrees of rotation. In some embodiments, less than 360 degrees of rotation may result in at least 360 degrees or more of threaded engagement and in other embodiments may result in less than the 360 degrees of threaded engagement. The threaded engagement may provide a circumferential axial sealing force (e.g., an axial sealing force of at least 360 degrees or, in some cases, less than 360 degrees) sufficient to create a seal between the fittings.

The fitting of the end cap may also include an alignment rib spaced from an opening of the first port fitting. The alignment rib, in one embodiment, can define a set of spaced notches, the spaced notches positioned to align with inner projections of the connection nut in a selected angular position of the connection nut. The rib can be spaced from a start to the set of external multi-start threads such that the connection nut inner multi-start threads cannot engage the external multi-start threads unless the inner projections pass through the spaced notches. In another embodiment, the alignment rib can be spaced to align with a slot in a rotating arm of the connection system.

Embodiments described herein provide an advantage by providing a compact purifier cassette that can provide the comparable purification, flow rate and pressure drop to a cylindrical purifier having the same membrane area, but in a compact package. The purifier cassette with smaller size may even be achieved with deformable materials such as perfluoroalkoxy polymer (PFA) and other such materials used in semiconductor manufacturing systems.

Embodiments described herein provide another advantage by maximizing the effectiveness of pleated purifiers, such as pleated microporous polymeric membranes. For rectangular pleat packs, the pleat pack density can remain uniform through the device, maximizing the effectiveness of the purification area. For devices with the same purification area, a rectangular pleat pack will perform as if it has more purification area than a round pleated membrane.

As another advantage to embodiments that use rectangular pleat packs, a rectangular shaped pleat pack generally allows for taller pleats than that of a round purifier cartridge. Therefore, a rectangular pleat pack can better fill a volume and provide a more uniform shape than a round pleat pack, thereby reducing the envelope dimensions for a rectangular pleat pack device.

As another advantage, embodiments can reduce purifier plugging. In many current purification systems, a single purifier is responsible for purifying an entire fluid stream. Consequently, the purifier used is selected based on the finest particle size to be purified. This means that a fine granularity, typically expensive, purifier is used to purifier both large and small particles, causing undue plugging. Embodiments of purification systems described herein, however, allow for purifying in series, providing an advantage over traditional purifying systems in which a single purifier is used. Prior to the last purifier, other, potentially cheaper, purifiers can be used to pre-purify out larger particles and other contaminants. This may result in reduced deterioration or extending the capacity of the final purifier.

As another advantage, many manufacturers (for example, semiconductor manufacturers) use purifying systems distributed throughout a manufacturing system (e.g., at point of entry, in the subfloor, at the manufacturing tool). A purification system that allows for purifying in series in a single purification unit can do away with the need for multiple separate purification systems and allow all the purifying to take place at a single point in the manufacturing system.

As yet another advantage, embodiments can provide a quick connect mechanism for fluid fittings and, in some embodiments, a quick connect system that allows multiple fittings to be sealed simultaneously. In some cases, the quick connect system can allow a user to seal ports even when the ports are located to the rear of a purifier cassette away from the user. Furthermore, the quick connection can be o-ringless, improving contamination control and providing more reliable higher temperature operation.

BRIEF DESCRIPTION OF THE DRAWINGS

The drawings accompanying and forming part of this specification are included to depict certain aspects of embodiments of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 5 is a diagrammatic representation of one embodiment of flow through a system.

FIG. 11 is a diagrammatic representation of another embodiment of a cassette.

FIG. 12 is a diagrammatic representation of another embodiment of a cassette.

FIGS. 13A-13B are diagrammatic representations of an embodiment of an end cap.

FIG. 14 is a diagrammatic representation of an embodiment of an end cap.

FIGS. 15A-15D are diagrammatic representations of an embodiment of an end cap.

FIG. 41 is a diagrammatic representation of one embodiment of a connection system in a non-engaged state.

FIG. 42 is a diagrammatic representation of one embodiment of a connection system in an engaged state.

FIG. 46A is a diagrammatic representation of one embodiment of a connection nut.

FIG. 46B is a diagrammatic representation of one embodiment of a connection nut and fitting.

FIG. 56 is a diagrammatic representation of one embodiment of a filtration system using generally rectangular cassettes versus traditional cylindrical cassettes.

DESCRIPTION

Figure 1:
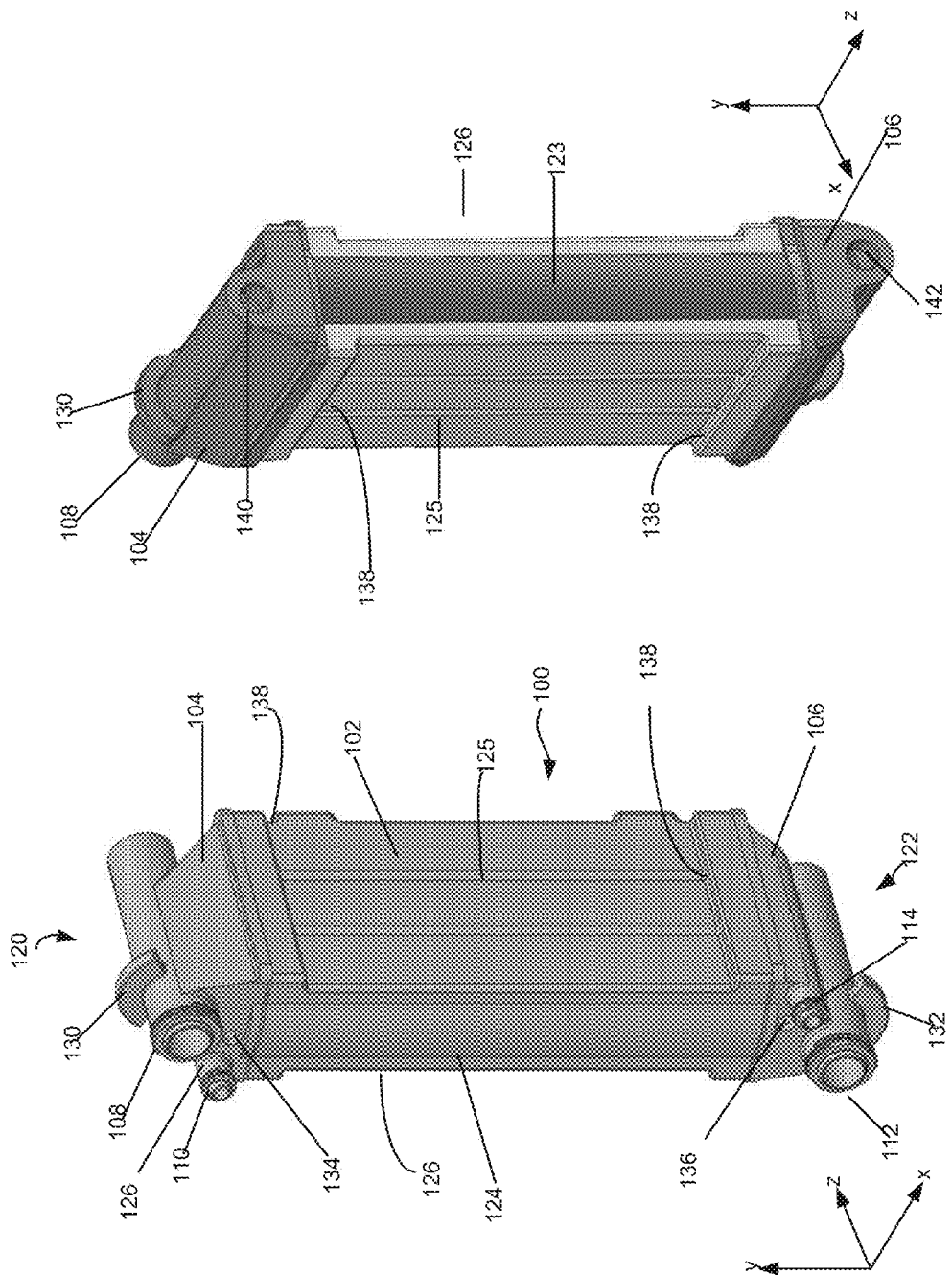
FIGS. 1A-1B are diagrammatic representations of one embodiment of a cassette.

Purification systems and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

For the sake of explanation, embodiments may be described relative to a first axis (the x-axis), a second axis (the y-axis), and a third axis (the z-axis). Furthermore, embodiments may be referred to as having a top, bottom, front, rear, left and right sides and a height, depth and width. These axes and terms are provided by way of explanation. Embodiments may be otherwise oriented and configured. Furthermore, while certain items may be referred to as "first," "second," "third," "fourth," etc. (e.g., a first sidewall, second sidewall) it would be understood that such terms are used for explanation and any one of multiple such items may be considered the "first," "second," etc.

Embodiments described herein relate to compact, generally rectangular pressure vessels, including purifier cassettes capable of removing contaminants like particles, ions, gases and the like from liquids. More particularly, some embodiments relate to purifier cassettes for purifying a variety of fluids including, but not limited to, semiconductor process fluids such as chemicals used in wet etch and cleaning applications. In other examples, embodiments can be applied to purifying chemicals in photolithographic processing (photochemicals). Photochemicals include materials such as primers, adhesion promoters, photoresists, edge bead removers, anti-reflective coatings, developers, dielectrics, and the like. The chemicals can be purified at the point of use (POU), the subfloor or elsewhere. Purifier cassettes may also be used to filter other liquids, including slurries.

A purifier cassette may include a purification element to add or remove material from a process liquid or other fluid. A purification element or purifier element refers to any purification media that can add or remove material from a liquid or other fluid. For example, contaminants which can be removed by the media include but are not limited to particles, gels, molecular contaminants, ions, dissolved gases, bubbles, or combination of these. Material which can be added can include gases like ozone and carbon dioxide. Filtration as used herein refers to the acts or steps of removing all or a portion of contaminants from a liquid or other fluid. Purification can include but is not limited to mechanical sieving, electrostatic, chemical bonding, ion exchange, chelation, adsorption, degassing, and combinations of these.

Media refers to a material or combination of materials that removes contaminants from a liquid or other fluid or transfers material into the liquid or other fluid. The media can include but is not limited to porous membranes for particle removal; non-porous membranes for degassing liquids; porous membranes with ion exchange groups or ligands or porous membranes that contain ion exchange media within the membrane or porous membranes that encapsulate ion exchange, adsorption, or other reactive particulate media such as but not limited to silicon beads, ion exchange beads, or activated carbon, for removing ions, or residues in liquids. A media may be porous (e.g., for filtration) or non-porous (e.g., for gas exchange). In some embodiments the media can be used to transfer material into a process fluid such as a liquid. An example would include a porous or non-porous membrane used for adding ozone gas or carbon dioxide gas to the liquid. In various embodiments, purifier cassettes contain one or more media.

A purification media can include a membrane. Example membranes include, but are not limited to those made from polymeric materials. Examples can include but are not limited to polyolefins like ultra-high molecular weight polyethylene, polypropylene, and high density polyethylene; halogenated polyolefins such as polytetrafluoroethylene and polyvinylidene fluoride; perfluorinated polymers like perfluoroalkoxy polymer (PFA) and fluorinated ethylene propylene (FEP); polysulfones, polyamides including nylon 6,6, and polyesters. The membranes can be porous, non-porous, or have skinned surfaces (porous or non-porous). Porous membranes can be single or multilayer and include those with symmetric or asymmetric (and combinations) of pore size across the thickness of the membrane. The membranes can be cast, extruded, or formed by melt blowing or electro spinning or multilayer membranes made by a combination of these. Polymeric netting materials and other materials may be pleated with a membrane. In some embodiments a non-porous membrane can be used for heat exchange.

Before discussing specific embodiments, some context may be helpful. In filtering semiconductor manufacturing fluids, there is often a need to balance particle retention or containment removal, flow rate, size and pressure drop across the filter. As the retention or contaminant removal or flow rate increases, the size of the filter may also increase to reduce the increased pressure drop. For example, for a given filtration medium, reducing the pore size 50% may increase the flow resistance by 400%. This means that to maintain a desired flow rate, the pressure drop in the filter will increase dramatically. To compensate for pressure drop increases, the size of the filter housing and corresponding membrane area may have to be increased accordingly. The use of large filters, however, maybe undesirable or infeasible due to space constraints or other considerations.

Conventionally, cylindrical filters represented a good balance of size, retention or containment removal, flow rate and pressure loss. Hence, the semiconductor manufacturing industry has by and large adopted cylindrical filters. Rectangular filters have been avoided because the stress in a rectangular filter requires that the rectangular filter be made larger than a comparable cylindrical filter to achieve the same filtration and flow rate. Furthermore, it is believed that the pressures typically experienced in semi-conductor manufacturing filters would cause high localized stress in typical rectangular designs. Such stresses would cause the non-reactive materials often used in semiconductor manufacturing devices, such as perfluoroalkoxy polymer (PFA) and polytetrafluoroethylene (PTFE), to yield, resulting in filter failure.

Embodiments described herein can provide a purifier cassette with a generally rectangular profile in a compact design that may provide comparable or superior retention (or other purification), flow rate and pressure drop compared to a cylindrical filter having a comparable filter media area. The cassette can further provide lower housing surface area and dead volume for improved filtration performance. In some embodiments, the cassette can be formed of materials such as PFA and other non-reactive materials and can, thus, be suitable for use with semiconductor manufacturing fluids. RFID tags and other features can be integrated into a purifier cassette to promote programmed operations and facilitate filter changes by robots.

According to one embodiment, a cassette can be configured as a purifier cassette. A variety of purifier elements can be used, including pleated filters formed from membranes to filter a liquid or other fluid. The membranes can be selected to achieve desired particle size retention or other purification result. For some semiconductor manufacturing applications, porous membranes can be selected that have particle size retentions of 20 nanometer, 15 nanometer, 10 nanometer or lower. A relatively high flow rate can be maintained at these retention ratings (including but not limited to greater than 15 liters per minute) for sub-15 nanometer retentions. For example, contaminants which can be removed by the media include but are not limited to particles, gels, molecular contaminants, ions, dissolved gases, bubbles, or combination of these.

Another issue experienced in semiconductor manufacturing is the lack of a suitable quick connect fitting. Many fittings that can withstand higher pressures must be rotated several times in order to complete a seal. Such connections are difficult to use, especially in cramped spaces, and do not facilitate filter changes by robots. To this end, embodiments described herein further provide a quick connect fitting that can be utilized in a variety of applications, including in semiconductor manufacturing systems. The quick connect fitting can provide o-ringless sealing. The o-ringless design can reduce contamination and provide more reliable high temperature operation. The quick connect fitting can further provide features to prevent insertion errors or incorrect seating.

It may be noted that the purifier cassettes may include any suitable purification media to perform purification as discussed above. In some cases, a cassette maybe configured for other applications such as heat exchange or other application.

FIGS. 1A and 1B are diagrammatic representations of one embodiment of a purifier cassette 100. For purposes of discussion, purifier cassette will be described in terms of a first end 120 (a top end), a second end 122 (a bottom end), a first side 123 (a front side), a second side 124 (a rear side), a third side 125 and a fourth side 126. Purifier cassette 100 has a main body 102 having a generally rectangular profile, a first end cap 104 and a second end cap 106. Main body 102 can provide an interior cavity in which a purifier element is disposed. End cap 104 and end cap 106 provide ports (e.g., one or more of first port 108, second port 110, a third port 112 and fourth port 114) that are fluidly coupled to the interior cavity. Depending on the configuration of purifier cassette 100, any of the one or more ports may act as an inlet port, an outlet port, a vent port, drain port or other type of port. In some cases, the ports may be placed so that the purifier cassette can be reversed (e.g., the purifier cassette can be mated to a manifold with end 120 as the top and end 122 as the bottom or vice versa or in another orientation). The various housing components may be coupled together using any suitable mechanism including, but not limited to, joining through sonic bonding, thermal bonding, adhesives or other joining scheme or through mechanical fasteners or a combination thereof.

In other embodiments, the port fittings may be internally threaded or not have threads. As depicted, the ports are open in the x-y plane to the rear of cassette 100 and the primary flow path through the ports is parallel to the z axis. The ports on an end cap are offset from each other in both the x and y axes. By, offsetting the ports along the y-axis, the end caps may be narrower, allowing the overall width of the purifier cassette 100 (e.g., size in the x direction) to remain smaller. While two end caps are illustrated, a purifier cassette may have one end cap, with the other end sealed. In other embodiments, the ports may be disposed in a sidewall of the cassette or elsewhere and end caps not used.

Figure 49:
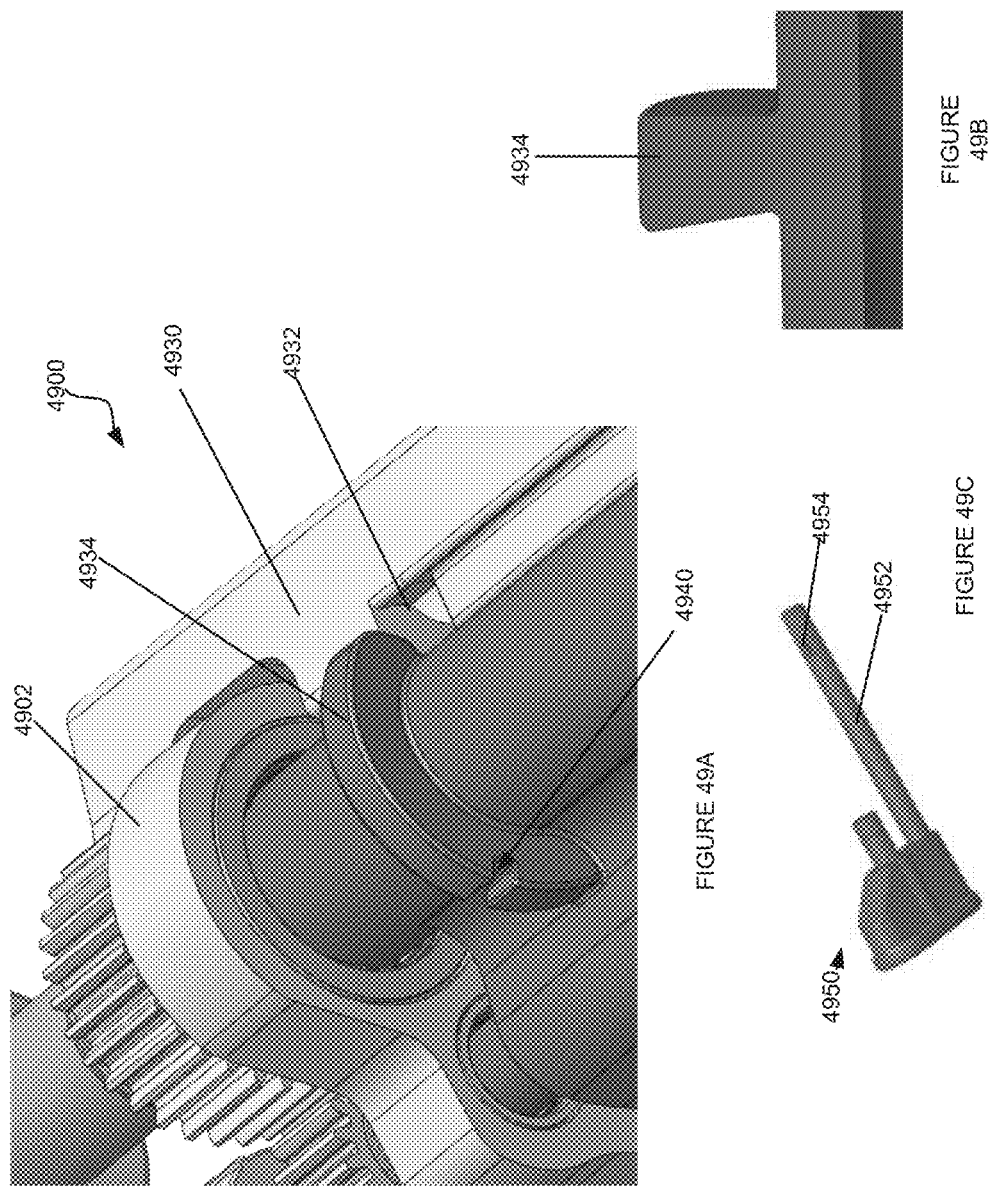
FIGS. 49A-49C are diagrammatic representations of another embodiment of a drive system.

As depicted in FIG. 1A, the port fittings may include port fitting external threads to engage with threads of a manifold or other component. Additionally, a port fitting may include a radially projecting port rib (e.g., radial rib 130 and radial rib 132) extending from a surface of the end cap and set back from the respective port openings (e.g., port 108 and port 112). Radial rib 130 and radial rib 132 may be used as an alignment feature and help ensure a sealed connection as discussed below. In some embodiments there is no radial rib. One example of a radial rib is a helical rib discussed in conjunction with FIG. 49 below. However, radial rib 130 and radial rib 132 may also have other configurations.

The end caps may include features such as alignment holes, rails, guide channels or the like to engage with complementary features on a manifold assembly to help ensure proper placement of the purifier cassette. In the embodiment of FIG. 1A, end cap 104 includes alignment hole 134 and end cap 106 includes alignment hole 136 open to the front of cassette 100 to receive guide pins of a manifold (e.g., such as alignment knobs discussed below or other guides). Alignment holes 134/136 can receive corresponding guides of a manifold to vertically position and hold cassette 100. End cap 104 may further include an alignment opening 140 and end cap 106 may include alignment opening 142. According to one embodiment, alignment opening 140 is axially aligned with port 108 and alignment opening 142 is axially aligned with port 112. Alignment opening 140 and alignment opening 142 may receive an alignment post of a drive handle as discussed below. The outer sidewalls of cassette 100 may further include shoulders 138 that can be used to support and align the cassette. For example, shoulders 138 may contact guide arms or other alignment features of a manifold to help align and support cassette 100.

Cassette 100 may include additional features for convenience and safe handling, such as labeling, handles, etc. as discussed below. As one example, feet or flat surfaces can be disposed on the opposite side of cassette 100 from the port openings to allow cassette 100 to rest on a surface with the port openings facing up and without tipping over.

Figure 2:
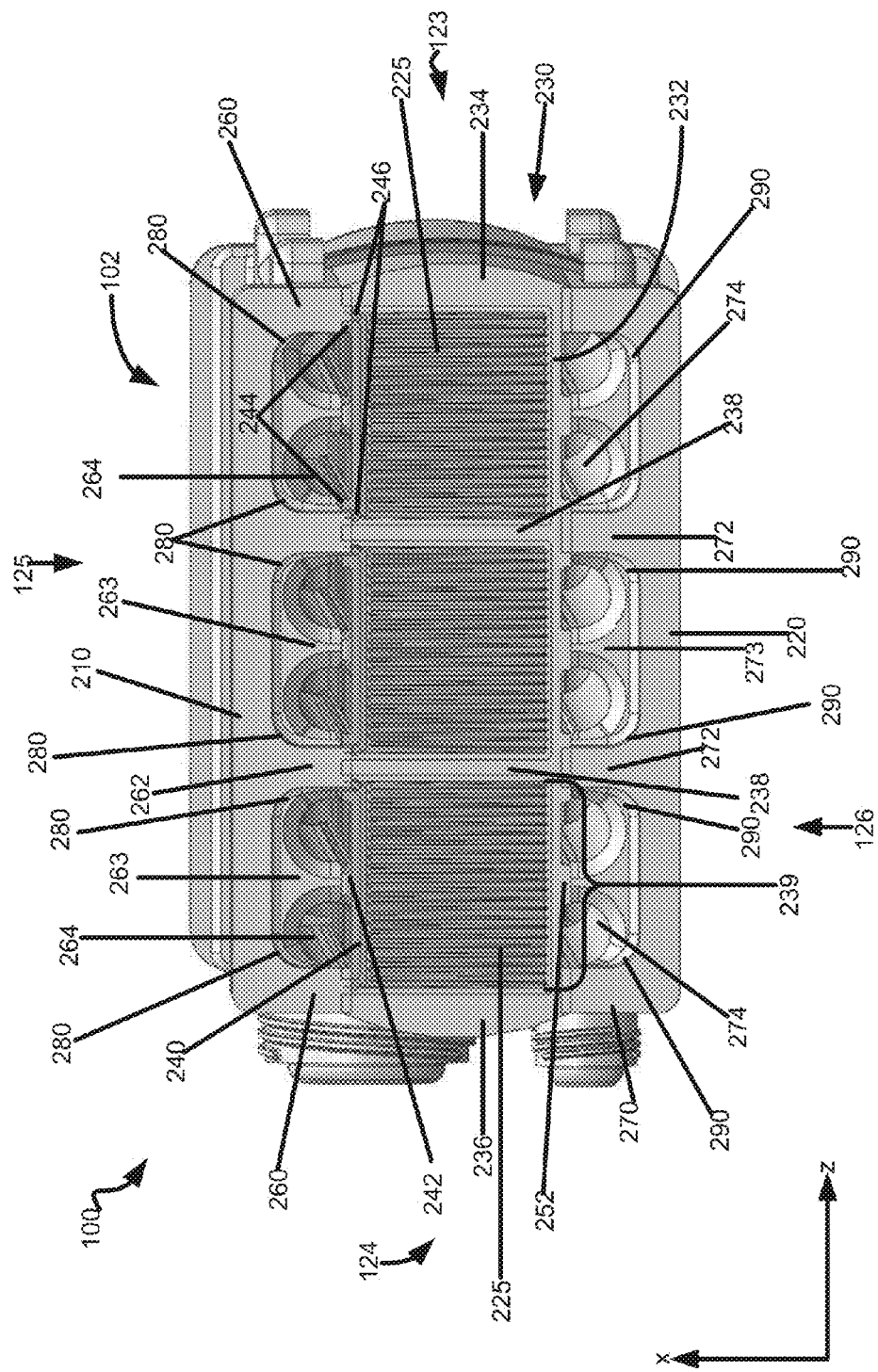
FIG. 2 is a diagrammatic representation of a view of one embodiment of a cassette body.

FIG. 2 is a diagrammatic representation of one embodiment of main body 102 viewed from an end (e.g., with end cap 106 removed). Main body 102 may define a media cavity. The media cavity may be segregated into lanes with a purifier element 225 disposed in each lane. According to one embodiment, the parallel lanes have a generally rectangular (including square) profile in the x-z plane and x-y plane. While three lanes are shown, the purifier cassette may have more or fewer lanes. The lanes may be sealed from each other such that fluid does not flow between lanes. In other embodiments, openings may be provided so that fluid may flow between the segregated lanes.

According to one embodiment, main body 102 comprises first side cover 210, a second side cover 220, main shell 230 and lane covers 240 (one of which is indicated). Main shell 230, first side cover 210, second side cover 220 and the end caps may be coupled together using fasteners, sonic bonding, interference fits or other coupling mechanism and may cooperate to form the media cavity and parallel lanes. Main shell 230 provides a base 232 extending between outer sidewall 234 and outer sidewall 236 and a set of spaced tension members 238 extending from base 232. Sidewall 234, sidewall 236, side cover 210 and side cover 220 may form the sidewalls of the internal cavity. The main shell sidewalls and tension members 238 may extend a length along the long axis within the cavity to form lane sidewalls. The portions of base 232 between the lane sidewalls (for example, between the outer sidewalls 234/236 and a tension member 238 and between two tension members 238) form integrated lane covers 239 that comprise a grate to allow fluid flow into or out of the corresponding lane. In some embodiments, a support member 252 may run the length of the grate to provide additional support. In some cases support member 252 may be broken into noncontiguous sections to allow different portions of the grate to expand or contract independently under heat for assembly processes. For example, a number of grate slots may extend all the way across an integrated lane cover 239, dividing support member 252 into sections.

One side of base 232 may include features to facilitate coupling of side cover 220 to base 232. According to one embodiment, the base provides a set of side cover mounting surfaces to which a portion of side cover 220 may be thermally bonded or otherwise coupled. On the opposite side, the ends of outer sidewall 234, outer sidewall 236 and tension members 238 distal from base 232 can provide features to facilitate coupling of side cover 210 to main shell 230. The distal end surfaces may, for example, provide side cover mounting surfaces to which a portion of side cover 210 may be bonded or otherwise coupled.

Lane covers 240 span between each main shell sidewall 234/236 and a tension member 238 or between adjacent tension members 238 and may extend the length of the lanes to cover the opposite side of lanes from base 232. Lane covers 240 may comprise an outer frame including frame members 244 that run the length of lane covers 240 and a grate portion spanning between frame members 244. A support member 242 running the length of the grate can provide additional rigidity to a lane cover 240. In some cases, support member 242 may be broken into noncontiguous sections to allow different portions of the grate to expand or contract independently under heat. The openings in lane covers 240 may be the same as or different than the openings in integrated lane covers 239 of base 232.

The surfaces of frame members 244 facing side cover 210 may provide a side cover mounting surface to facilitate coupling of side cover 210. For example, the side cover mounting surfaces may provide a surface to which a portion of side cover 210 may be bonded or otherwise coupled. The lane covers 240 may also include coupling features to facilitate coupling of lane covers 240 to main shell 230 using a snap-fit, interference fit, sonic bonding or according to any suitable coupling mechanism. According to one embodiment, lane covers 240 may include tongues 246 projecting from frame members 244. Tongues 246 are received in corresponding grooves of the respective outer sidewall 234/236 or tension member 238 to capture the lane cover 240 in the proper location.

As depicted in FIG. 2, a lane cover is provided on both an upstream and a downstream side of a purifier element 225 (e.g., in the form of lane cover 240 and integrated lane cover 239). In other embodiments, a lane cover is only provided on one side of purifier element 225. In yet another embodiment, lane covers are not used at all. One advantage to having lane covers to cover both the upstream and downstream side of purifier element 225 is that the purifier element 225 can be supported in both forward and reverse flow, allowing the cassette to function similarly in either flow direction.

Side cover 210 can include side support members 260, a set of spaced ribs 262 that align with tension members 238 and may include a set of spaced ribs 263 that align with media cover support members 242. In the orientation of FIGS. 1A and 1B, the side support members run along the front side (side 123) and rear side (side 124) edges of side cover 210. Side cover 220 can similarly include side support members 270, a set of spaced ribs 272 that align with tension members 238 and a set of spaced ribs 273 that generally align with the support members 252 of the second lane covers.

Flow channels may be disposed along the sidewalls. To this end, side support members 260, spaced ribs 262 and spaced ribs 263 may extend a length and cooperate to form a set of parallel flow channels 264 that are open to lane covers 240 along their length. Similarly, side support members 270, spaced ribs 272 and spaced ribs 273 may extend a length and cooperate to form a set of parallel flow channels 274 that are open to lane covers 239 along their length. The ends of the flow channels may be fluidly coupled to one or more of the inlet, outlet, vent or drain ports.

While two flow channels are depicted per lane, the cassette may have a single flow channel per lane. For example, ribs 263 and 273 may be omitted or there may be a gap between ribs 263/273 and the respective lane cover. Other embodiments may have additional flow channels per lane. The flow channels 264 and 274 may have any desired shape and size and different flow channels on the same side or opposite sides may have different configurations. According to one embodiment, the flow channels may be arced, elliptical or otherwise rounded to create a series of arches along the inside of the side covers that define the channels. Rounded or elliptical shapes can create hoop stress to keep the main body in tensions, maximizing its strength capabilities.

Some of the spaced ribs on each side cover are spaced to align with tension members 238. The inner surface of these ribs may be coupled to the ends of the tension members. For example, the inner surfaces of ribs 272 may be coupled to main shell 230 at the base of tension members 238 and the inner surfaces of ribs 262 may be coupled to the distal end of the tension members 238. Consequently, when the pressure vessel cavity is under pressure, tension members 238 will assert a force on side covers 210 and 220 to reduce or prevent bowing of side covers 210 and 220. The size and configuration of tension members 238 may be selected so that the volumetric deformation of the pressure vessel cavity is less than a desired percentage under expected operating pressures.

Others of the spaced ribs may align with the support members 242 of the lane covers (e.g., spaced ribs 263 align with the support members 242 of lane covers 240 and spaced ribs 273 align with the support members 252 of lane covers 239). The ends of ribs 263 and 273 may be coupled to the respective support member 252 or a gap may remain between the ends of ribs 263 and 273 and the respective support member.

Main body 102 can comprise a series of hoop-like structures to better distribute forces. According to one embodiment, transitions in internal surfaces running parallel to the lanes are curved. Thus, for example, corners 280 of side cover 210, corners 290 of side cover 220 and the flow passages are curved about axes parallel to the lanes. Furthermore, the main shell sidewalls 234 and 236 have curved exteriors and side covers 210 and 220 have curved corners at the transitions from side 125 to side 124 and side 123 and the transitions from side 126 to side 124 and side 123.

The hoop-like structures about the lanes cause pressure in the chamber to result at least in part in hoop stress (stress normal to the pressure in a direction tangential to the curvature) and to distribute the stress. The effect can be to create tension in side cover 210 and side cover 220 over the center lane and to tension in sidewalls 234 and 236 along the center axes of the side walls. The configuration of the hoop like structures can be selected so that the von Mises stress are less than the yield stress of side cover 210, side cover 220, sidewall 234 and sidewall 236, as well as the tension members, filter covers and other features and the mating locations that experience such stress when the main body is pressurized.

As discussed above, the lanes can provide purifier element holding areas to hold purifier elements 225. The purifier elements 225 can be pleat packs of porous polymeric membrane pleated with the length of the membrane pleat parallel to the long axis of the cassette. The pleat tips may be oriented so that the pleat tips on one side point at side cover 210 while the opposite pleat tips are oriented to point at side cover 220 with the pleat tips abutting the respective lane cover. In this arrangement, one set of pleat tips faces the upstream portion of the cavity and the other set of pleat tips faces the downstream portion of the cavity. The purifier elements 225 may be separate purifier elements or each of the purifier elements may be portions of the same continuous pleat pack such that, for example, the last pleat of one purifier element 225 transitions into the first pleat of the next purifier element 225 and the last pleat of that purifier element transitions into the first pleat of the next purifier element 225 and so on. The pleats of each purifier element can be formed from a single membrane or multiple membranes formed from the same or different materials. Preferably the pleats are compressed together and form a generally planer rectangular entrance interface on the upstream side and a generally planer rectangular exit interface on the downstream side. The amount of pleat compression of the membrane in a lane for a given area of membrane can be selected to optimize a desired pressure drop versus flow rate. In some embodiments, the lane cover (e.g., lane cover 240) can be contoured to increase the surface area of the pleat pack exposed, which may take on the contoured shape.

Figure 3:
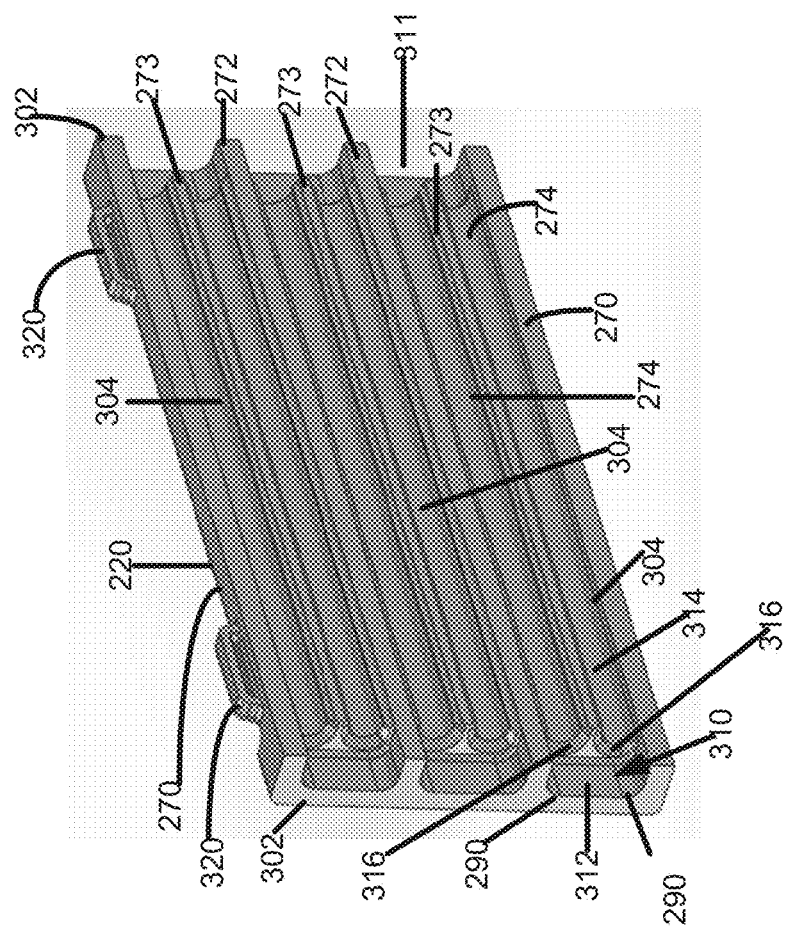
FIG. 3 is a diagrammatic representation of one embodiment of a side cover.

FIG. 3 is a diagrammatic representation of one embodiment of side cover 220, which may be identical to side cover 210 or may be different. Side cover 220 comprises side support members 270, intermediate ribs 272 and intermediate ribs 273. The inner surfaces of side support members 270, intermediate ribs 272 and intermediate ribs 273 may provide mounting surfaces that can be bonded or otherwise coupled to other components. Side cover 220 may also include end surfaces 302 that can provide end cap mounting surfaces to which an end cap may be bonded or otherwise coupled.

Side support members 270 and spaced intermediate ribs 272 may form a set of primary flow channels 304 aligned with the lanes and spaced intermediate ribs 273 may form as set of sub-channels 274 within the primary flow channels. A primary flow channel 304 may comprise a plenum area at one or both ends (e.g., plenum area 310 and plenum area 311). The plenum area 310 can be an area having a greater cross-sectional area than sub-channels 274 (e.g., when viewed from the end) and can act to distribute fluid to sub-channels 274 with reduced loss and also services to reduce pressure loss effects due to bonding flash or misalignment from coupling the end caps to the main body. In the embodiment depicted, plenum area 310 has a generally rectangular cross-section (viewed from the end) with rounded corners 290, while the sub-channels 274 have a semi-circular profile.

Increasing the entrance cross-section of plenum area 310 can decrease pressure drop caused by side cover 220. For example, using a lane cover as a reference, a configuration in which inner surface 312 of plenum area 310 is 3 millimeters further away than the apex of inner surface 314 of sub-channel 274 from the lane cover provides decreased pressure loss compared to a configuration in which inner surface 312 and the apex of inner surface 314 are the same distance from the lane cover. Additionally, shaping the transitions 316 into sub-channels 274 may reduce pressure drop. Accordingly, a transition that comprises a fillet, chamfer or other shaped transition 316 between plenum area 310 and secondary flow passages 274 may exhibit less pressure drop than a sharp corner, though corners may be used in some embodiments.

Also, as illustrated in FIG. 3, side cover 220 may also include tabs 320 projecting from the front side outer surface of a side support member 270. Tabs 320 may include a groove, opening or other feature to accommodate labels, handles or other components as discussed below. Furthermore, tabs 320 of cover 220, acting with corresponding tabs on media cover 210 (not shown), can provide feet so that a purifier cassette can be placed on a flat surface with the ports facing up without tipping over.

Figure 4A:
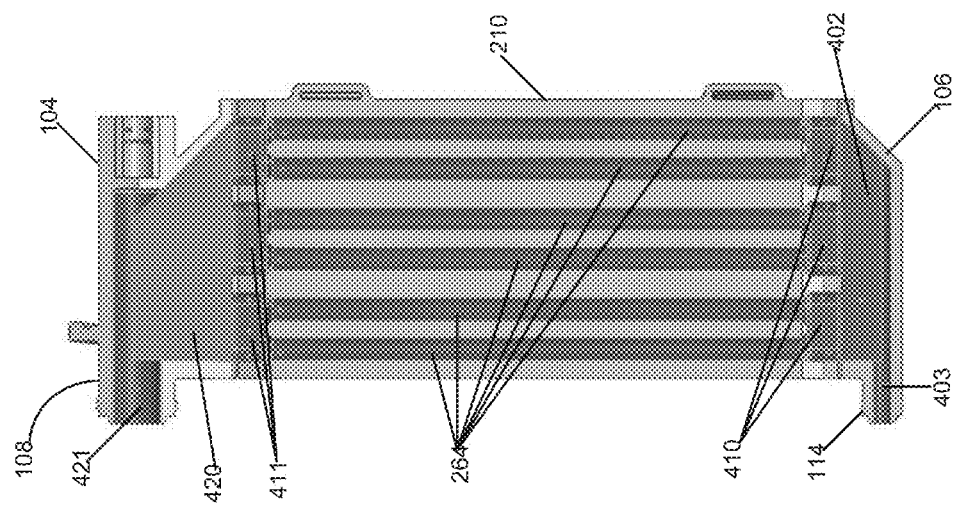
FIGS. 4A-4B are diagrammatic representations of one embodiment of a side cover and end cap.
Figure 4B:
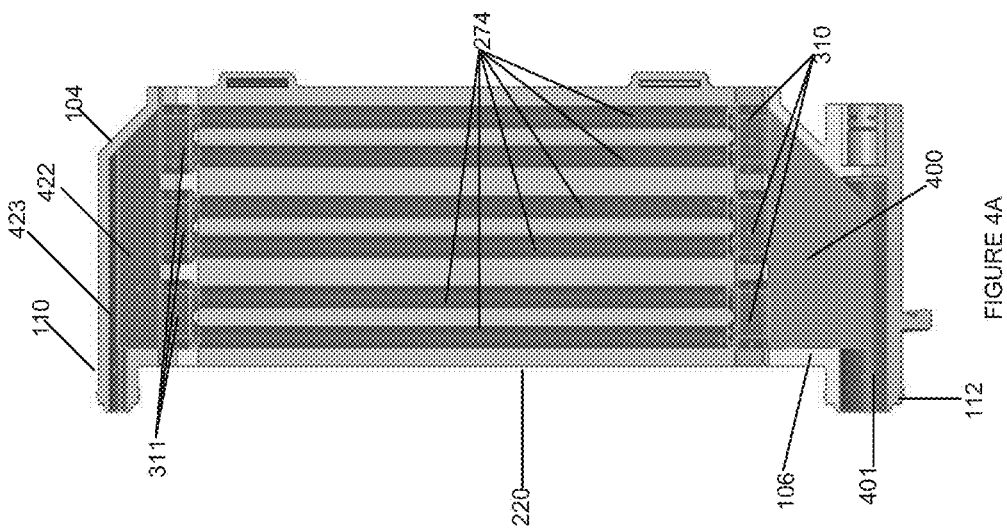

FIGS. 4A and 4B are diagrammatic representations of a cross-section of one embodiment of side cover 220 (FIG. 4A) and side cover 210 (FIG. 4B) coupled to end cap 104 and end cap 106. End cap 106 may include end cap flow channel 400 that fluidly couples a port chamber 401 to plenums 310 at one end of sub-channels 274 and a second end cap flow channel 402 that fluidly couples plenums 410 to port chamber 403 at one end of sub-channels 264. End cap 104 can include a flow channel 420 that fluidly couples a port chamber 421 to plenums 411 at the other end of sub-channels 264 and a second flow channel 422 that fluidly couples plenums 311 to port chamber 423. It can be noted from FIGS. 4A and 4B that the end caps and side covers may be identical parts as depicted. In other embodiments, the two side covers may have different features or be asymmetrical such that they are not interchangeable.

Referring to FIG. 5, a cutaway view of one embodiment of purifier cassette 100 having end cap 104 and end cap 106 bonded or otherwise coupled to the ends of side cover 210, side cover 220 and main shell 230 (FIG. 2) to form a sealed housing. End cap 104 has an inner wall 512 that can act as an end wall at one end of the lanes and end cap 106 can include an inner wall 512 that can act as an end wall at another end of the lanes. The ends of the tension members 238 and the main shell sidewalls may be sealed to the end walls 506 and 512. Furthermore, the ends of the filter membranes may also be sealed, for example, by potting with a polymeric resin then bonding to the end walls 506 and 512, so that that there is no space between the ends of the filter membranes and the end walls through which fluid can flow.

End cap 104 includes a shaped cavity forming channel 420 and port chamber 421 and a shaped cavity comprising flow channel 422 and port chamber 423. Port chamber 421 in the embodiment depicted is generally cylindrical and can be tapered to be wider at the port opening. The interface of port chamber 421 to flow channel 420 may be offset relative the interface between flow channel 420 and plenums 411. Accordingly, flow channel 420 may be angled outward travelling from port chamber 421 to plenums 411. Flow channel 420 may have a constant cross-sectional area that is the same as the cross-sectional entrance area of plenum 411. In other embodiments, flow channel 420 may have a varying cross-sectional area and may have a cross-sectional area that is different than the cross-sectional area of plenum 411. In yet another embodiment, flow channel 420 may be divided into multiple internal channels.

End cap 106 includes a shaped cavity forming channel 400 and port chamber 401 and a shaped cavity comprising flow channel 402 and drain port chamber 403. Port chamber 401 in the embodiment depicted is generally cylindrical and can be tapered to be wider at the port opening. The interface of port chamber 401 to flow channel 400 may be offset relative the interface between flow channel 400 and plenums 310. Accordingly, flow channel 400 may be angled outward travelling from port chamber 401 to plenums 310. Flow channel 400 may have a constant cross-sectional area that is the same as the cross-sectional entrance area of plenum 310. In other embodiments, flow channel 400 may have a varying cross-sectional area and may have a cross-sectional area that is different than the cross-sectional area of plenum 310. In yet another embodiment, flow channel 400 may be divided into multiple internal channels. End cap 106 may further include a shaped cavity forming flow channel 402 and drain port chamber 403.

In the example of FIG. 5, a liquid supply system is configured such that port 112 is the inlet port, port 108 (FIG. 1A) is the outlet port, port 114 (FIG. 1A) is an outlet drain port and port 110 is an inlet vent port. In operation, fluid can enter the purifier cassette through port 112, be directed from port chamber 401 to plenums 310 by flow channel 400 and be distributed to primary flow channels 304 and/or sub-channels 274. The fluid flows through lane covers 239, through the purifier element 225 in a pleat tip-to-tip direction and through lane covers 240 to primary flow channels and/or sub-channels 264 in side cover 210. Thus, the purifier cassette may provide efficient normal flow filtration. The fluid from flow in side cover 210 can be combined in channel 420 and outlet chamber 421. The fluid exits chamber 421 through the outlet port. Gas in the fluid may rise to the vent port (port 110) and, when pressure is removed from the purifier cassette, can be drained out the drain port and the outlet port (e.g., at startup) or inlet port. The various flow paths are configured to avoid dead space—that is, space where a process fluid can stagnate. Thus, the purifier cassette can provide increased cleanliness.

With respect to venting, main body 102 can be formed of a material such that the interior surfaces are more philic to gas than the purifier element—or, put another way, the purifier element can be selected to be more phobic to gas than the housing material—to promote affinity of gas to the housing sidewalls. By way of example, but not limitation, the difference in surface energy between the side cover 220 material and purifier element 225 can be greater than 10 dynes/cm2. Thus, there may be a surface energy gradient between the purifier element and the sidewalls. Consequently, as fluid washes over the interior of a side cover 220, gas in the fluid will be attracted to the sidewall. The gas is therefore more likely to rise to the filter vent than pass through the purifier element. Accordingly, the inlet vent may be located at the highest point on the upstream side of the filter to help ensure that gas does not get trapped.

In the embodiment of FIG. 5, the flow channels are configured so that flow passes through each pleat pack in parallel. In other embodiments, however, flow channels can be configured so that fluid flows through the purifier elements 225 in series (e.g., for example through geometry in the side covers and/or end caps). Accordingly, different purifier elements can be placed in each lane such that each lane serves a purification purpose (e.g., pre-filtration, degassing, ion exchange, polishing filtration, etc.).

Using an example of a media cavity with three lanes (e.g., a first lane, second lane, third lane), an inlet flow channel can be connected to a distribution channel on a first side of the first lane. Fluid can flow through the distribution channel and through the purifier element in the first lane. The flow channels on the second side of the first lane can direct flow to the second lane and the fluid can flow through the purifier element in the second lane back to the first side. A distribution channel on the first side of the filter can direct fluid received from the second lane to the third lane. Fluid can flow through the purifier element in the third lane to a distribution channel connected to the outlet port. In another embodiment, the end caps may include flow channels to direct fluid from one lane to the next in a serial manner. In yet another embodiment, multiple types of purifier elements may be stacked in a lane (for example, two or more different types of pleat packs) so that multiple types of can be performed serially in a single lane (e.g., in the embodiment of FIG. 5, a coarse filtration pleat pack can be located proximate to cover 239 and a fine filtration pleat pack can be located proximate to cover 240 in a lane), even if fluid is directed to the lanes in parallel.

Figure 6:
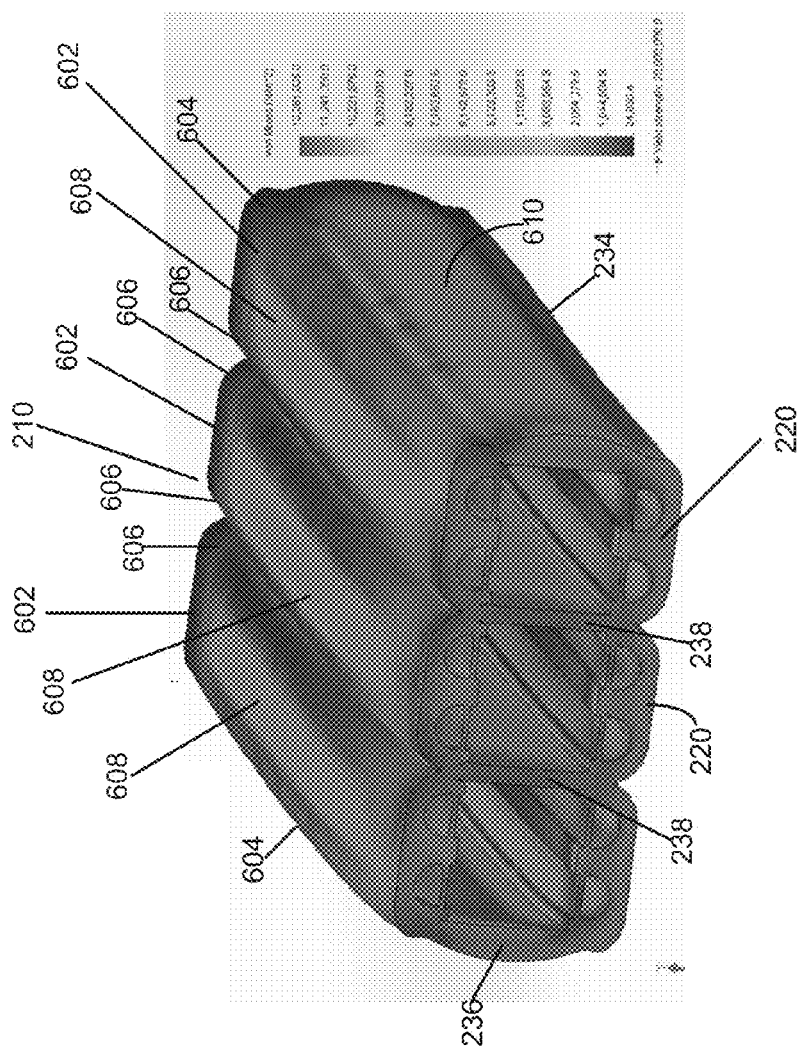
FIG. 6 is a diagrammatic representation of one embodiment of stress in a cassette.

During purification, the purifier cassette will be under pressure. Embodiments of purifier cassettes may incorporate features to prevent or minimize deformation under expected operating pressures (with a safety factor). Turning to FIG. 6, FIG. 6 is a diagrammatic representation of one embodiment of a main body 102 showing an example distribution of stress along with additional stress distribution features.

As discussed above, embodiments may provide a hoop-like structure about each lane. To this end, one embodiment of a side cover 210 may have a lane portion 602 corresponding to each lane. Each lane portion 602 may comprise curved exterior corners. The outermost lane portions 602, for example, include curved end corners 604 such that the outer surface transitions from one side to an adjacent side are curved. Furthermore, the outer surface may be curved inward at corners 606 between adjacent lane portions 602 (e.g., to create parallel creases generally aligned with tension members 238). Thus, at each exterior corner of side cover 210 the inner surface may be curved (e.g., due to the curvature of the flow channels or corners 280 (as shown in FIG. 2)) and the outer surface may be curved.

Providing hoop-like structures can provide a desired stress profile. As depicted in FIG. 6, while there may be some localized areas of increased stress, the calculated von Mises stresses in side cover 210 are generally highest proximate to the center axis of each lane portion 602, as indicated by areas of increased stress 608, and the von Mises stresses in each main shell sidewall are generally highest along the center axis of each main shell sidewall, as indicated by area of increased stress 610 in sidewall 234. The von Mises stresses remain below the yield strength of main body 102, with a safety factor.

Figure 7:
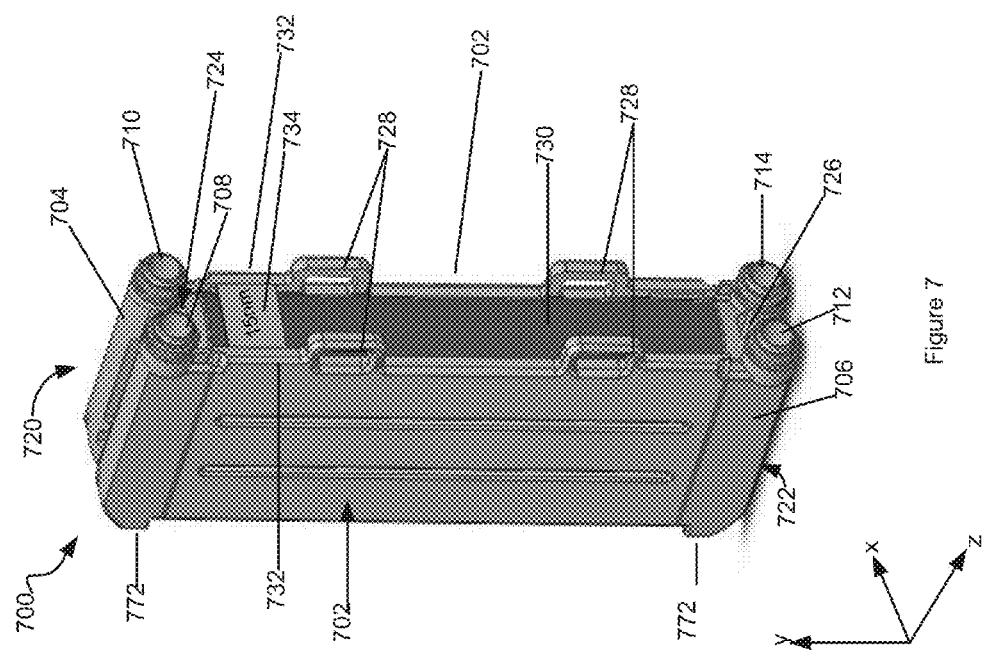
FIG. 7 is a diagrammatic representation of another embodiment of a cassette.

FIG. 7 is a diagrammatic representation of another embodiment of a purifier cassette 700. Purifier cassette 700 has a cassette housing 702 having a generally rectangular profile, a first end cap 704 and a second end cap 706. Cassette housing 702 can provide an interior cavity in which one or more purifier elements are disposed. As discussed above, the interior cavity may be segregated into a set of lanes with a generally rectangular pleat pack or other purifier element disposed in each lane.

End cap 704 and end cap 706 can provide ports (e.g., one or more of first port 708, second port 710, a third port 712 and fourth port 714) that are fluidly coupled to the interior cavity. Depending on the configuration of purifier cassette 700, any of the one or more ports may act as an inlet port, an outlet port, a vent port, drain port or another type of port (and more or less ports may be present). As depicted in FIG. 7, the port fittings have port fitting exterior threads to connect to a manifold or other supply. According to one embodiment, the threaded port may be multi-start threads as discussed below.

As depicted, the ports are open in the x-y plane toward the front of cassette 700 and the primary flow path through the ports is parallel to the z axis. In some cases, the ports may be placed so that the purifier cassette can be reversed (e.g., the purifier cassette can be mated to a manifold with end 720 as the top and end 722 as the bottom or vice versa).

The end caps may include features such as alignment holes, rails, guide channels or the like to engage with complementary features on a manifold assembly to help ensure proper placement of the purifier cassette. In the embodiment of FIG. 7, end cap 704 includes guide slot 724 and end cap 706 includes guide slot 726 open to the front of cassette 700. Guide slots 724/726 can receive corresponding guide arms of a manifold to vertically position and hold cassette 700.

A cassette may include a carrying handle that connects to the same side of the cassette as to which the ports are open. Cassette 700, for example, includes handle connection members 728 to allow connection of a removable handle from the rear of the cassette. This arrangement allows a user (such as a human user or robot) to carry the cassette with all the ports facing up. According to one embodiment, handle connection members may comprise tabs extending rearward from the cassette at the side edges and defining openings to receive protrusions from a removable handle. In another embodiment, handle connection features may be integrated in surface 730. In yet another embodiment, a handle may be integrated. In another embodiment, the handle connection features may be incorporated in end caps 704 and 706, side covers or elsewhere.

A cassette may also include features to allow the cassette to be conveniently carried and stored. According to one embodiment, the cassette may include flat surfaces on the opposite side of the cassette from the port openings or elsewhere to allow the cassette to be placed on a flat surface. Cassette 700, for example, comprises feet 772 extending from the front side of end cap 704 and end cap 706. Thus, cassette 700 can be placed on a storage shelf with the ports facing up and without cassette 700 falling over or rolling away.

Cassette 700 may also include a label system. While adhesive-based label may be used, such labels often peel when attached to PFA devices, especially for high temperature applications. According to one embodiment, cassette 700 can include one or more label holders 732. Label holder 732, according to one embodiment, can comprise a tab or other extension extending rearward proximate to the side edges of the cassette or elsewhere and defining a set of grooves facing each other. Label 734 may be a snap-fit label that fits in the grooves, and can also be made so that the label is inserted during the cassette assembly operation, if desired. The label may be made of a plastic material, metal or other material. For example, the label may comprise colored PTFE or PFA material laser cut, molded, direct injected, etc. so that it contrasts with the purifier cassette and makes the text highly visible. Color-coding the labeling makes it easy for users to distinguish between devices. For example, one color of label can be used to label the 15 nanometer filter while another color label can be used to label the 10 nanometer filter. For purifier cassettes that are used in applications that require an "all Teflon" designation, the PTFE material maintains this designation for the purifier cassette. Alternate materials can be used if desired. A label system may be used in the embodiment of FIGS. 1A and 1B, and can, for example, be implemented on side 123 or 124. Labels can also be implemented in other embodiments of purifier cassettes.

Figure 8:
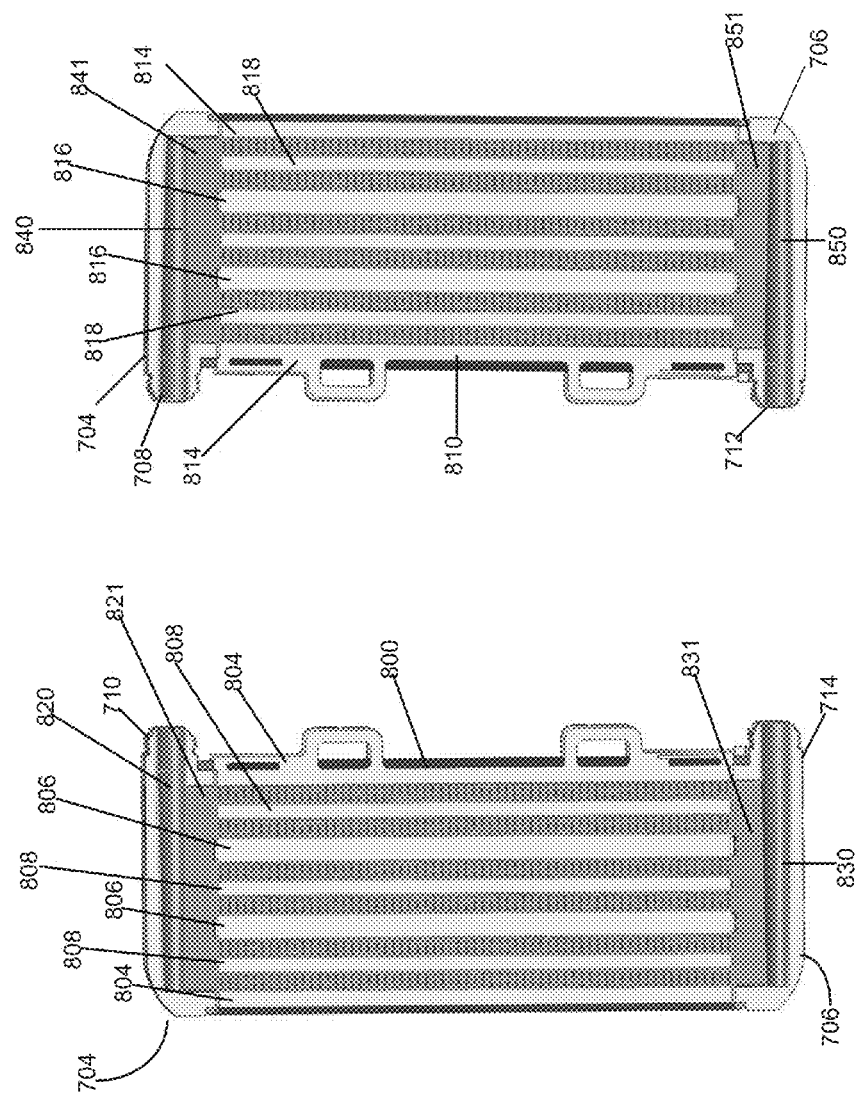
FIGS. 8A-8B are diagrammatic representations of another embodiment of a side cover and end cap.

FIGS. 8A-8B are diagrammatic representations of a cross-sections of one embodiment of cassette 700 depicting side cover 800 and side cover 810 coupled to end caps 704 and 706. It may be noted that the two sides are symmetric. In the embodiment of FIGS. 8A and 8B, side cover 800 may include side support members 804 that may be bonded to or otherwise coupled to a set of sidewalls, spaced intermediate ribs 806 that may be coupled to tension members and spaced intermediate ribs 808 that may be coupled to a lane cover (in some cases not all the ribs are coupled to the lane cover). The side support members 804 and spaced ribs 806 may form flow channels corresponding to each lane in the filter housing and spaced ribs 808 further divide the primary flow channels into smaller flow channels. Side cover 810 may include side support members 814 that may be bonded to or otherwise coupled to a set of sidewalls, spaced intermediate ribs 816 that may be coupled to tension members and spaced intermediate ribs 818 that may be coupled to a lane cover. The side support members 814 and spaced ribs 816 form flow channels corresponding to each lane in the filter housing and spaced ribs 818 that may further divide the lanes into smaller flow channels. In the embodiments of FIGS. 8A-8B, however, plenums are not provided in the side covers.

With reference to FIG. 8A, end cap 704 may include a shaped cavity that provides a port chamber 820 and a flow channel 821 connecting the port chamber 820 to a first end of the distribution flow channels. End cap 706 may include a shaped cavity that provides a port chamber 830 and a flow channel 831 that connects port chamber 830 to the second end of the distribution flow channels defined by side cover 800. With reference to FIG. 8B, end cap 704 provides a second shaped cavity that provides a port chamber 840 and a flow channel 841 that connects port chamber 840 to the first end of the distribution flow channels defined by side cover 810. End cap 706 provides a second shaped cavity that provides a port chamber 850 and a flow channel 851 that connects port chamber 850 to the first end of the distribution flow channels defined by side cover 810. The port chambers may be sloped such that the top surface of port chamber 820 slopes upward toward the opening of port 710, the bottom surface of port chamber 830 slopes downward toward the opening of port 714, the upper surface of port chamber 840 slopes upward toward the opening of port 708 and the bottom surface of port chamber 850 slopes downward toward the opening of port 712. For port chambers 820 and 840, this means that gas reaching the port chamber can exit the respective ports.

Figure 9:
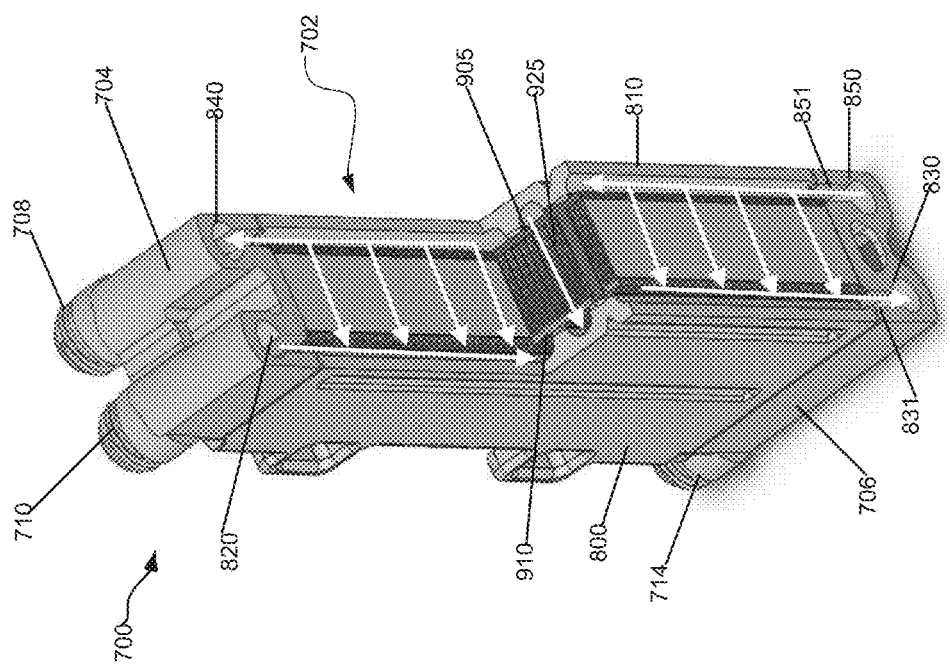
FIG. 9 is a diagrammatic representation of flow through another embodiment of a cassette.

FIG. 9 is a diagrammatic representation of one embodiment of flow through purifier cassette 700. In this example, a supply system is configured such that port 712 (FIG. 7) is an inlet port, port 714 is an outlet port, port 708 is an upstream (inlet) side vent port and port 710 is a downstream (outlet) side vent port. In operation, fluid flows into port chamber 850 through the port opening and is directed to upstream flow distribution channels disposed on the side cover 810 via flow channel 851, through a lane cover 905, through a purifier element 925 and through a lane cover 910. Flow channel 831 connects downstream flow channels disposed on side cover 800 with port chamber 830 so that fluid may flow into port chamber 830 and exit purifier cassette 700 via port 714.

As discussed above, the side covers may be more philic to gas than purifier element 925. Consequently gas bubbles may be attracted to the side covers. The upstream fluid distribution channels may direct gas to port chamber 840 and downstream fluid distribution channels may direct gas to port chamber 820. The port chambers 840 and 820 may be drafted so that the gas flows to the respective port opening and out of cassette 700.

Figure 10:
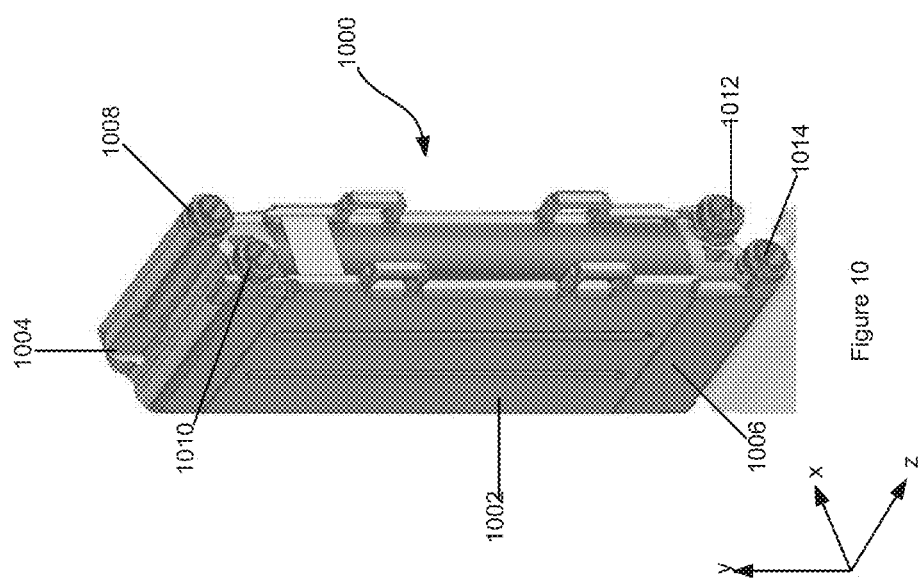
FIG. 10 is a diagrammatic representation of another embodiment of a cassette.

FIG. 10 is a diagrammatic representation of another embodiment of a purifier cassette 1000 having a purifier cassette body 1002, end cap 1004 and end cap 1006. Purifier cassette 1000 may be similar to purifier cassette 700 (FIG. 7). As depicted in FIG. 10, however, end cap 1004 has ports 1008 and 1010 that are offset along both the x and y axes from each other and end cap 1006 has ports 1012 and 1014 that are offset along both the x and y axes from each other. Offsetting the ports along the y axis may allow the ports to be placed closer together in the x direction, thus allowing the overall width of the purifier cassette 1000 (size in the x direction) to remain smaller.

FIG. 11 is a diagrammatic representation of another embodiment of a purifier cassette 1100. Purifier cassette 1100 has a main body 1102 having a generally rectangular profile, a first end cap 1104 and a second end cap 1106. Main body 1102 can provide an interior cavity in which a purifier element is disposed. End cap 1104 and end cap 1106 can provide ports (e.g., one or more of first port 1108, second port 1110, third port 1112 and fourth port 1114) that are fluidly coupled to the interior cavity. Depending on the configuration of purifier cassette 1100, any of the one or more ports may act as an inlet port, an outlet port, a vent port, drain port or another type of port. In the embodiment of FIG. 11, the ports are not threaded.

FIG. 12 is a diagrammatic representation of another embodiment of a purifier cassette 1200. Purifier cassette 1200 has a main cassette housing 1202 having a generally rectangular profile, a first end cap 1204 and a second end cap 1206. Cassette housing 1202 can provide an interior cavity in which a purifier element is disposed. End cap 1204 and end cap 1206 can provide ports (e.g., one or more of first port 1208, second port 1210, a third port and a fourth port) that are fluidly coupled to the interior cavity. Depending on the configuration of purifier cassette 1200, any of the one or more ports may act as an inlet port, an outlet port, a vent port, drain port or another type of port.

The end caps may include features such as alignment holes, rails, guide channels or the like to engage with complementary features on a manifold assembly to help ensure proper placement of the purifier cassette. In the embodiment of FIG. 12, end cap 1204 includes guide slot 1224 and end cap 1206 includes guide slot 1226 open to the front of cassette 1200. Guide slots 1224/1226 can receive corresponding guide arms of a manifold to vertically position and hold cassette 1200. Furthermore, end cap 1204 or end cap 1206 may include vertical snap fit slots 1228 to receive pins on the manifold to horizontally position and secure cassette 1200.

Cassette 1200 may further include handle connection members 1230. According to one embodiment, handle connection members may comprise tabs extending rearward from the cassette at the side edges. The tabs define openings that can receive protrusions from a removable handle 1232.

FIGS. 13A-13B are diagrammatic representations of another embodiment of an end cap 1300. End cap 1300 may include a primary port 1302 that is open in a first plane (e.g., an x-y plane) and a secondary port 1304 open in a second plane (e.g., an x-z plane). According to one embodiment, primary port 1302 may act as an inlet or outlet configured as discussed above or otherwise configured and secondary port 1304 may act as a vent or drain. End cap 1300 may further define a shaped cavity 1308 that is in fluid communication with the interior fluid distribution channels and is shaped so that all interior surfaces defining cavity 1308 will direct gas bubbles to channel 1320 and out port 1304 such that port 1304 acts as a vent port or direct fluid to port 1304 such that port 1304 acts as a drain.

FIG. 14 is a diagrammatic representation of another embodiment of a cassette end cap 1400. End cap 1400 comprises ports 1402 and 1404. Fluid entering port 1402 is distributed to a series of end cap flow channels 1406 internal to end cap 1400. Fluid may be received through end cap flow channels 1408 internal to end cap 1400 and combined in end cap 1400 prior to exiting port 1404. The end clap flow channels 1406 and 1408 may align with corresponding flow distribution channels defined in the filter body and may be arranged to distribute fluid in series or in parallel. The end cap flow channels may align, for example, plenums, primary flow channels or sub-channels and may be used with a variety of port designs.

FIGS. 15A-15D are diagrammatic representations of another embodiment of an end cap 1500. End cap 1500 comprises a base 1502 that can be coupled to a cassette main body, a first port fitting 1510 and a second port fitting 1520. Although two port fittings are shown, devices with one port fitting opposing ports or more than two port fittings may be used. The port fittings may be externally threaded as shown by threads 1512 and 1522. The port fittings may be threaded in the same or opposite directions.

The port fittings may include alignment features that, in cooperation with corresponding alignment features of a connection system, may facilitate alignment of the port fitting with the connection system. The alignment features may be configured so that the start of threads 1512 and 1522 cannot engage corresponding threads of the connection system unless the corresponding features of the fitting and connection system align or mate.

Figure 44A:
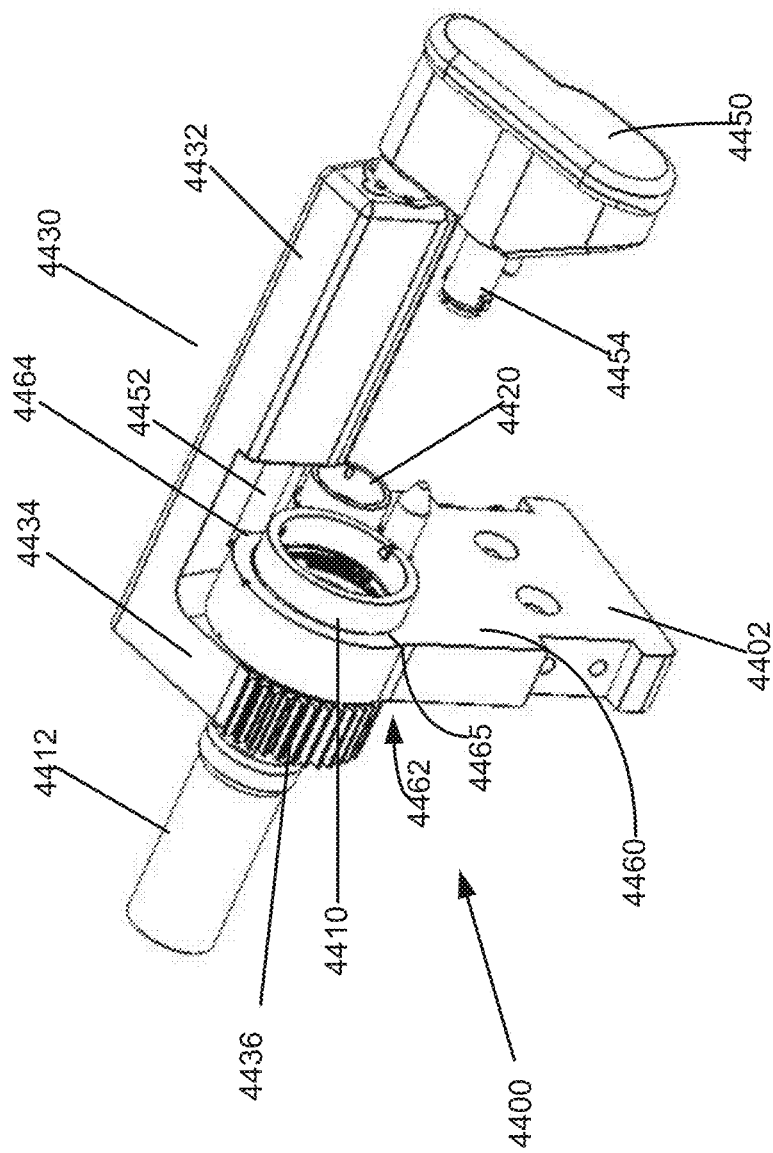
FIGS. 44A-44B are diagrammatic representations of another embodiment of a connection system.

According to one embodiment, for example, a set of alignment features may include notches that align with inner projections of a connection nut (e.g., inner projections 4604 of connection nut 4410 of FIG. 44A). To this end, in the embodiment illustrated, an annular alignment rib extends radially outward from each port fitting as shown by port ribs 1514 and 1524. Each alignment rib may include spaced alignment notches at the periphery of the rib. For example, rib 1514 includes spaced notches 1516 and rib 1524 includes spaced notches 1526. The spaced alignment notches may be arranged so that an alignment features in a connection system may pass through the notches only when threads 1512 and 1522 are properly aligned with threads of the connection system.

The port rib 1514 may be set back from the start of port fitting external threads 1512 a selected distance such that the start of threads 1512 cannot engage corresponding threads of the connection system unless the alignment features pass through alignment notches 1516. Similarly, port rib 1524 may be set back from the start of port fitting external threads 1522 a selected distance such that the start of threads 1522 cannot engage corresponding threads of the connection system unless the alignment features pass through notches 1526. While the example of corresponding projections and notches is used, any suitable alignment features may be employed.

End cap 1500 may have an alignment opening 1530 to accept a drive handle alignment insert. Alignment opening 1530 may be axially aligned with port 1510 or may be otherwise located. Alignment opening 1530 may form a keyhole so that the handle may only fit in alignment opening 1530 in a desired orientation.

FIG. 15D is a view from a bottom of base 1502. Base 1502 may include openings for flow passages that fluidly connect port 1510 and port 1520 to flow passages in the filter body. To this end, the opening to flow passage 1540 in base 1502 may be located such that it interfaces with a first set of plenums and the opening to flow passage 1542 may be located such that it interfaces with a second set of plenums. While shown as a single flow passage, each of flow passages 1540 and 1542 may be divided into several flow passages.

Base 1502 may also provide a surface that can be bonded or otherwise coupled to the end of the cassette main body. Regions 1550, for example, may be bonded to the ends of side covers and regions 1554 may be bonded to the ends of main shell sidewalls. Area 1556 can provide an end wall to a set of lanes internal to the purifier cassette body and may provide a surface to which the ends of tensions members and lane covers may be bonded or otherwise coupled.

Figure 16:
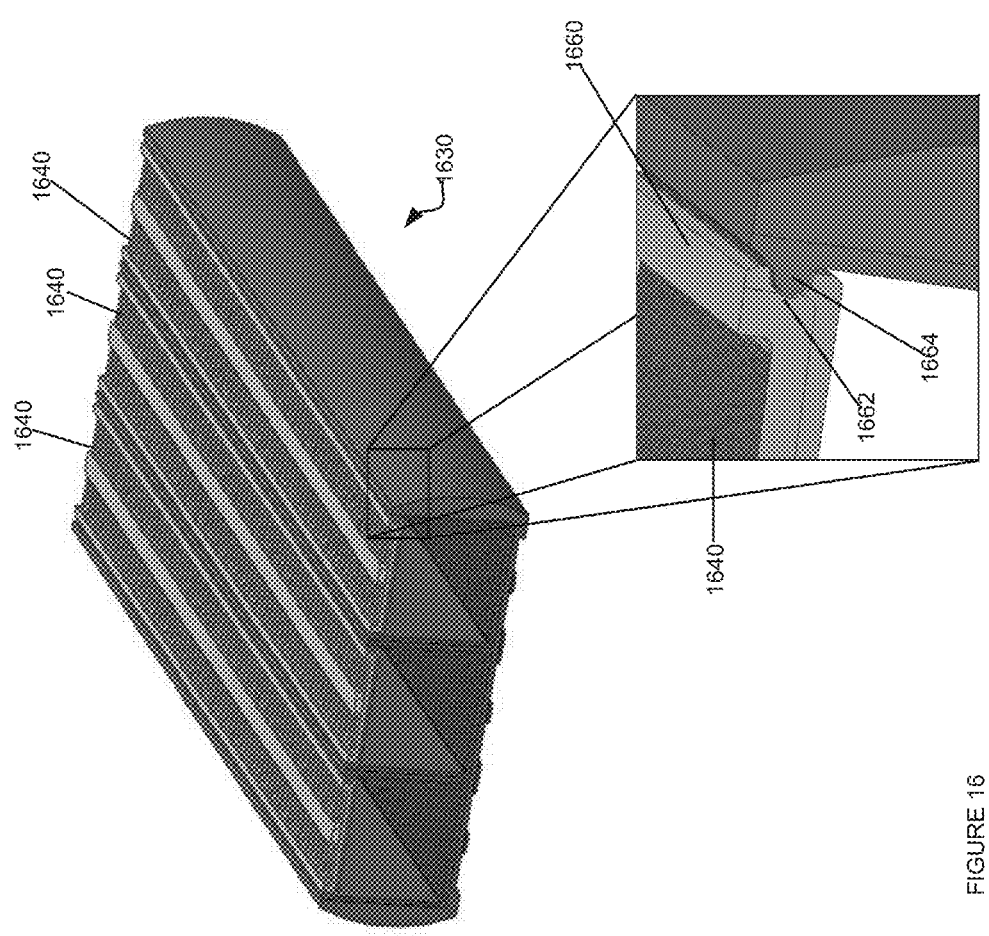
FIG. 16 is a diagrammatic representation of another embodiment of a main shell and lane cover.

FIG. 16 is a diagrammatic representation of another embodiment of a main shell 1630 and lane covers 1640. In the embodiment of FIG. 16, lane covers 1640 include a frame having frame members 1660. The lane covers 1640 and main shell 1630 may include features to facilitate coupling lane covers 1640 to main shell 1630 using a snap-fit, interference fit, sonic bonding or according to any suitable coupling mechanism. According to one embodiment, lane covers 1640 may include grooves 1662 running along the length of frame members 1660. Tongues 1664 projecting from the main shell sidewalls and tension members may be received in corresponding grooves 1662 to create a snap fit. In other embodiments, the tongue can be on the lane covers 1640 and the grooves on the sidewalls and tension members. Other mechanisms may also be used to secure the lane covers.

Purifier cassettes may be assembled in any suitable manner. According to one embodiment, a side cover (e.g., side cover 220 of FIG. 2), may be bonded to the main shell and then pleat packs are inserted in the lanes. The first and last pleats of a pleat pack may stick out along the length of the pleat pack. The separate lane covers can be attached, with the first and last flap of each pleat pack captured between a lane cover and respective sidewall or tension member. The second side cover (e.g., side cover 210 of FIG. 2) can be bonded to the main shell. The ends of the main body may be potted or otherwise sealed to seal the ends of the lanes and pleat packs. The end caps may then be bonded to the main body. In another embodiment, for example, the first step can be to install the purification elements and lane covers and then bond side cover 210, 220, end cap 104 and end cap 106 either in series or two or more of these components simultaneously. Other purification media or media to facilitate other processes (such as heat exchange) as described herein may be placed in the lanes.

As discussed above, embodiments of purifier cassettes may be used for a variety of applications including, but not limited to, semiconductor manufacturing applications. In some semiconductor manufacturing processes, filters typically operate at less than 100 psi. Embodiments described herein can provide an all polymeric cassette (a filter in which the fluid flow path and structural components of the filter are made of polymeric materials, without requiring, for example, metal support plates, metal mounting brackets and the like) (including a purifier cassette in which the main body and end caps are formed primarily or entirely of PFA, PTFE or other non-reactive material) that can have burst pressures of 100 psi (0.68 MPa) or greater, including greater than 400 psi (2 MPa) and in some cases greater than 900 psi (6.2 MPa) in a smaller volume than required by a cylindrical filter that provides comparable retention, flow rates and pressure drop.

Additionally, flow rates are typically about 5-20 liters per minute (lpm) and filters are often used that can handle up to 50 lpm. Embodiments of purifier cassettes may be used for applications with a wide range of flow rates including flow rates of less than 50 lpm and flow rates of greater than 50 lpm. Purifier cassettes as discussed above can provide high flow rates (e.g., greater than 15 lpm) during filtration of sub 15 nanometer particles. Purifier cassettes can also be configured with other purification media to perform other filtration or purification processes.

In addition, purifier cassettes may exhibit a desired pressure drop. According to one embodiment, a purifier cassette can be configured to have a baseline pressure drop (pressure drop with a fluid having a viscosity of 1 MPa and no purifier element installed) including, but not limited to, a baseline pressure drop of less than 30 kPa (including, in some cases, less than 10 kPa) at 40 liters per minute, less than 20 kPa (including, in some cases, less than 10 kPa) at 30 liters per minute, less than 20 kPa (including, in some cases, less than 10 kPa) at 20 liters per minute. Generally, the configuration of the purifier can balance flow rate and pressure drop.

Adding a purification media to the lanes may increase pressure drop and the configuration of the purifier element can be selected to balance retention performance with pressure drop. In general, the pressure drop across a filter for a given flow rate will increase with increased pleat height (distance from pleat tip to pleat tip) and compression ratio for the same amount of membrane area. The compression ratio is the amount a pleat pack is compressed relative to a ratio of 1.0 in which the pleats are not separated, but are not being further compressed together. Thus, for example, a filter membrane with 100 pleats and a thickness of 0.0415 centimeters would have a width of approximately 4.15 centimeters at a compression ratio of 1.0, but a width of approximately 2.905 cm for a compression ratio of 0.7.

For a given membrane filtration area the volume required to hold a rectangular pleat pack is roughly:

$$v=a*t*cr,$$

where:
v=the filter pack volume,
a=the filtration area,
t=the uncompressed thickness of the filter membrane
cr=the compression ratio.

Now take a cylindrical filter having a membrane area 3 m2, a pleat pack length (parallel to the pleats) of 210 millimeters an inner diameter of 63 millimeters and an outer diameter of 76 millimeters, and a thickness of 0.0415 centimeters, the cylindrical purifier element requires approximately 714 cm3 of volume and must be at least 7.6 centimeters wide. For the same membrane area, a square pleat pack with a compression ratio of 1.0 can be approximately 124 cm3.

A pleat pack can be arranged in a desired volume by selecting length of the pleats, height of the pleats and width of the pleat pack. The height of the pleats and compression ratio may affect pressure drop across the pleat pack. Desired pleat heights and compression ratios can be determined through testing of different membranes. Depending on the application and flow needs, a pleat pack may have any desired compression ratio, including, but not limited to a compression ratios of 0.6-1.0. In some cases the pleats may not be compressed (may have a ratio of greater than 1).

Figure 17A:
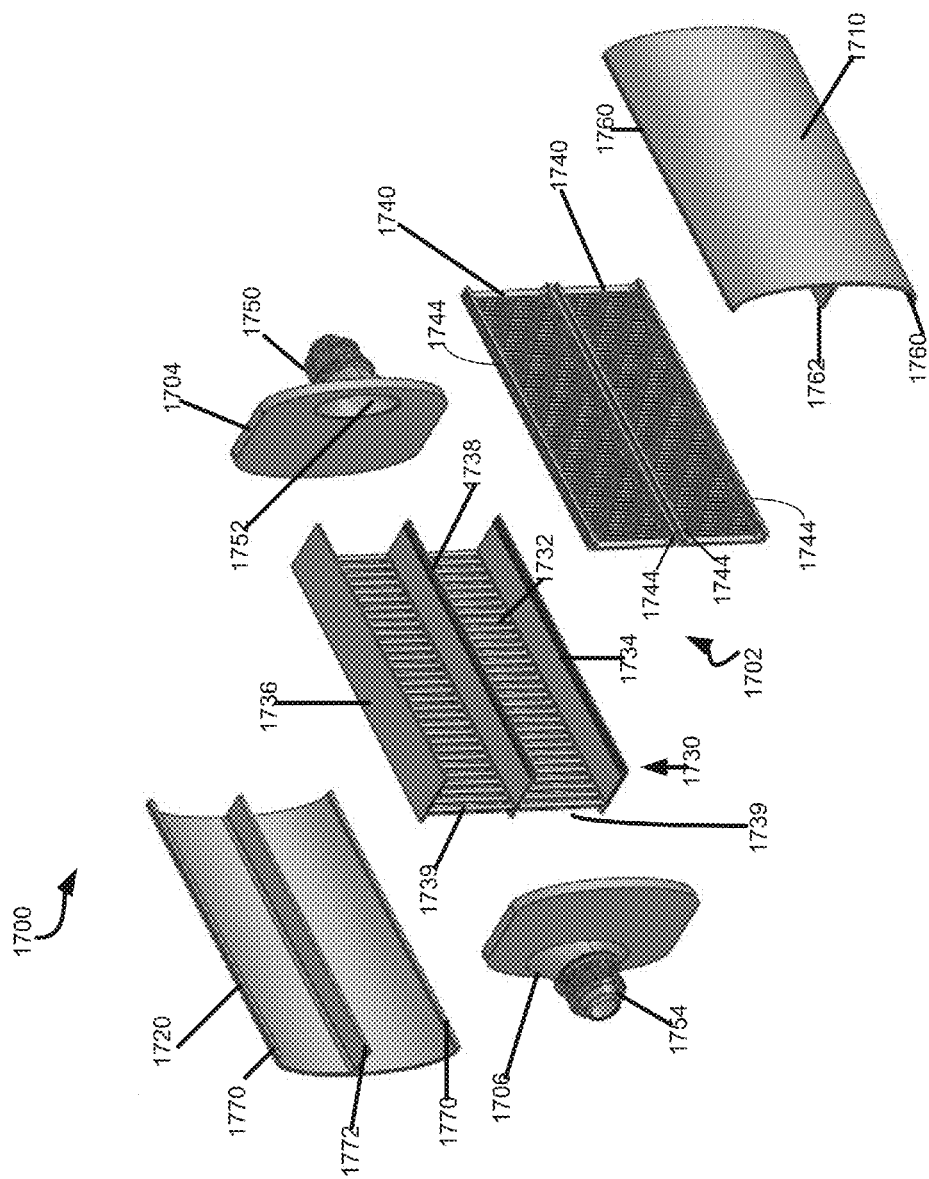
FIGS. 17A-17B are diagrammatic representations of another embodiment of a cassette.
Figure 17B:
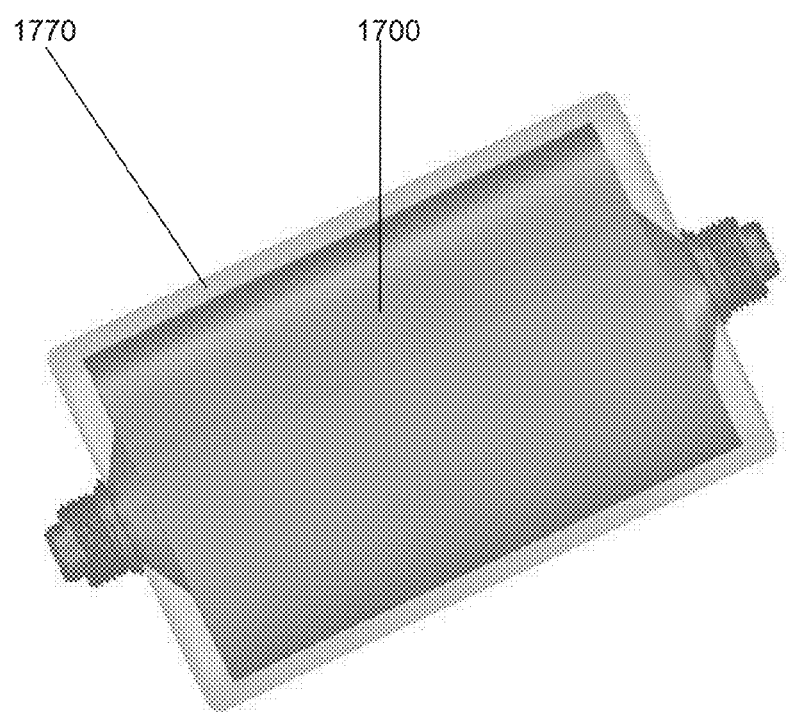

FIGS. 17A and 17B are diagrammatic representations of one embodiment of purifier cassette 1700 having a main body 1702 and end caps 1704 and 1706. Main body 1702 may define a media cavity. The media cavity may be segregated into lanes with a purifier element disposed in each lane. According to one embodiment, the parallel lanes have a generally rectangular (including square) profile. While two lanes are shown, the purifier cassette may have more or fewer lanes. The lanes may be sealed from each other such that fluid does not flow between lanes. In other embodiments, openings may be provided so that fluid may flow between the segregated lanes.

According to one embodiment, main body 1702 comprises first side cover 1710, a second side cover 1720, and main shell 1730. Main shell 1730, first side cover 1710, second side cover 1720 and the end caps may be coupled together using fasteners, sonic bonding, interference fits or other coupling mechanism and may cooperate to form the media cavity and parallel lanes. Main shell 1730 provides a base 1732 extending between outer sidewall 1734 and outer sidewall 1736 and a tension member 1738 extending from base 1732. Sidewall 1734, sidewall 1736, side cover 1710 and side cover 1720 may form the sidewalls of the internal cavity. The main shell sidewalls and tension member 1738 may extend a length along the long axis within the cavity to form lane sidewalls. The portions of base 1732 between the lane sidewalls (for example, between the outer sidewalls 1734/1736 and a tension member 1738 and between two tension members 1738 if there are multiple tension members) form integrated lane covers 1739 that comprise a grate to allow fluid flow into or out of the corresponding lane.

One side of base 1732 may include features to facilitate coupling of side cover 1720 to base 1732. According to one embodiment, the base provides a set of side cover mounting surfaces to which a portion of side cover 1720 may be bonded or otherwise coupled. On the opposite side, the ends of outer sidewall 1734, outer sidewall 1736 and tension member 1738 distal from base 1732 can provide features to facilitate coupling of side cover 1710 to main shell 1730. The distal end surfaces may, for example, provide side cover mounting surfaces to which a portion of side cover 1710 may be bonded or otherwise coupled.

Lane covers 1740 can span between each main shell sidewall 1734/1736 and a tension member 1738 or between adjacent tension members 1738 and extend the length of the lanes to cover the opposite side of lanes from base 1732 (separate lane covers may also be provided). Lane covers 1740 may comprise a frame including frame members 1744 that run the length of lane covers 1740 and a grate portion spanning between frame members. The lane covers 1740 may also include support members as discussed above. The openings in lane covers 1740 may be the same as or different than the openings in integrated lane covers 1739 of base 1732.

Surfaces of lane cover 1740 facing side cover 1710 may provide a side cover mounting surface to facilitate coupling of side cover 1710. For example the side cover mounting surfaces may provide a surface to which a portion of side cover 1710 may be bonded or otherwise coupled. The lane cover may also include coupling features to facilitate coupling of lane cover 1740 to main shell 1730 using a snap-fit, interference fit, sonic bonding, thermal bonding or according to any suitable coupling mechanism.

As depicted in FIG. 17A, a lane cover is provided on both an upstream and a downstream side of a purifier element in form of lane covers 1740 and lane covers 1739. In other embodiments, a lane cover is only provided on one side of the lane. In yet another embodiment, lane covers are not used at all.

Side cover 1710 can include side support members 1760, a center rib 1762 that aligns with tension member 1738. Side cover 1720 can similarly include side support members 1770, a center rib 1772 that aligns with tension member 1738 (or a set of spaced ribs if there are more lanes). The inner surface of these ribs may be coupled to the ends of the tension members. For example, the inner surfaces of rib 1772 may be coupled to main shell 1730 at the base of tension member 1738 and the inner surface of rib 1762 may be coupled to the distal end of the tension member 1738. Consequently, when the pressure vessel cavity is under pressure, tension member 1738 will assert a force on side covers 1710 and 1720 to reduce or prevent bowing of side covers 1710 and 1720. The size and configuration of tension members 1738 may be selected so that the volumetric deformation of the pressure vessel cavity is less than a desired percentage under expected operating pressures. The areas between the side support members and ribs can form flow channels for each lane. In some cases, additional ribs or other features may define additional flow channels.

Main body 1702 can be configured to distribute stress. According to one embodiment, side cover 1720 and side cover 1710 can be outwardly curved. Furthermore, the main shell sidewalls 1734 and 1736 can have curved exteriors and side covers 1710 and 1720 have curved corners at the transitions between sides of the purifier cassette.

As discussed above, the lanes can provide purifier element holding areas to hold purifier elements. The purifier elements are preferably pleat packs pleated with the length of the pleat parallel to the long axis of the cassette. The pleat tips may be oriented so that the pleat tips on one side point at side cover while the opposite pleat tips are oriented to point at side cover with the pleat tips abutting the respective lane cover. In this arrangement, one set of pleat tips faces the upstream portion of the cavity and the other set of pleat tips faces the downstream portion of the cavity. The purifier elements may be separate purifier elements or each of the purifier elements may be portions of the same continuous pleat pack such that, for example, the last flap of one purifier element transitions into the first flap of the next filer element and the last flap of that purifier element transitions into the first flap of the next purifier element and so on. The pleats of the each purifier element can be formed from a single membrane or multiple membranes formed from the same or different materials. Preferably the pleats are compressed together and form a generally planer rectangular entrance interface on the upstream side and a generally planer rectangular exit interface on the downstream side. The amount of compression for a given area of membrane can be selected to achieve a desired pressure drop and flow rate.

End cap 1704 can comprise a port fitting 1750 that is fluidly coupled to the flow channels on one side of the lanes (e.g., as indicated by opening 1752). End cap 1706 can comprise a port fitting 1754 that is fluidly coupled to the flow channels on the other side of the lanes. Thus, one port fitting can provide an inlet port and the other port fitting an outlet port. In other embodiments, the inlet and outlet ports may be located on the same end cap. Vent and drain ports may also be provided.

FIG. 17B is a diagrammatic representation of one embodiment of purifier cassette 1700 overmolded with an over mold material 1770. According to one embodiment, the use of an overmold can provide several benefits. The overmold material can be selected to reduce cost, provide strength, provide different thermal expansion properties, account for dimensional variations of the main body material, reduce permeation through the housing (chemistry, gasses, etc.), provide a material in which it is easier to incorporate ergonomic and ornamental features, etc. While an overmold is shown in the context of cassette 1700, it should be understood that other embodiments of cassettes may also be overmolded.

Figure 18A:
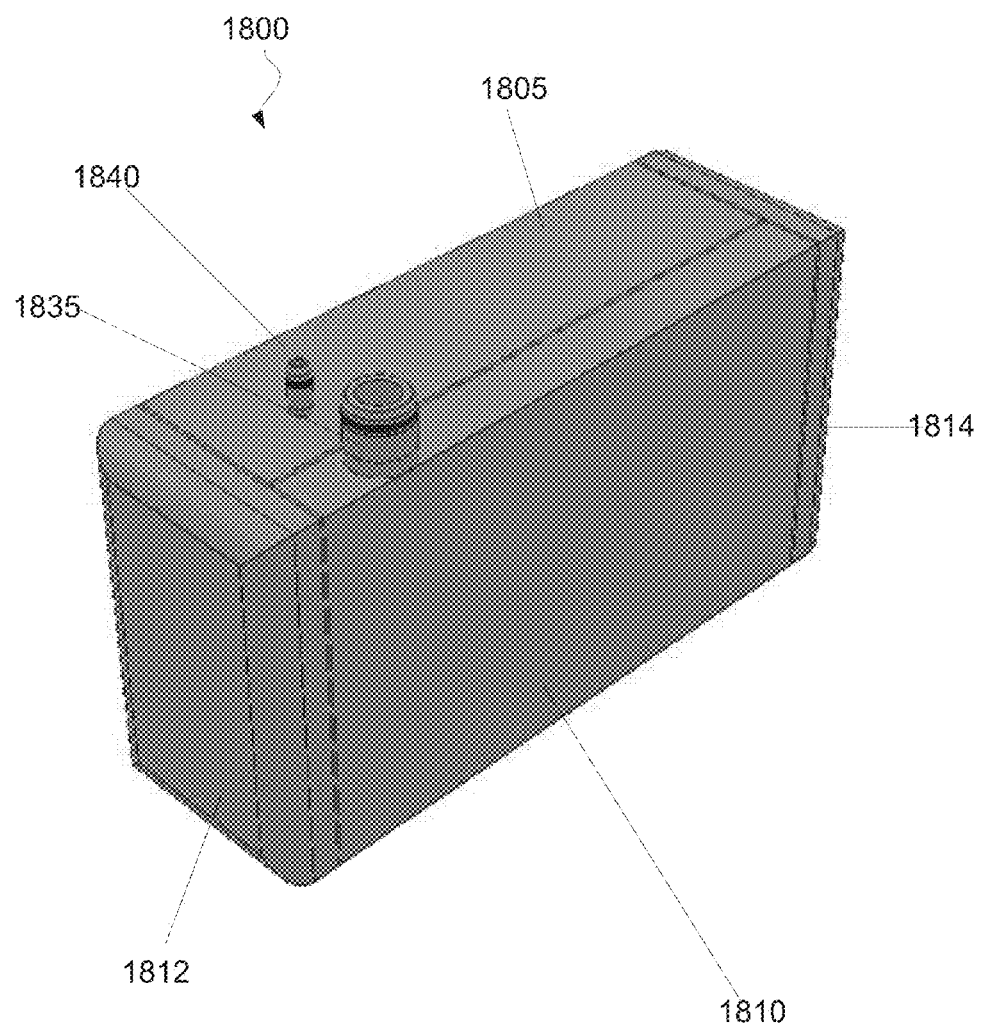
FIGS. 18A-18B are diagrammatic representations of yet another embodiment of a cassette.
Figure 18B:
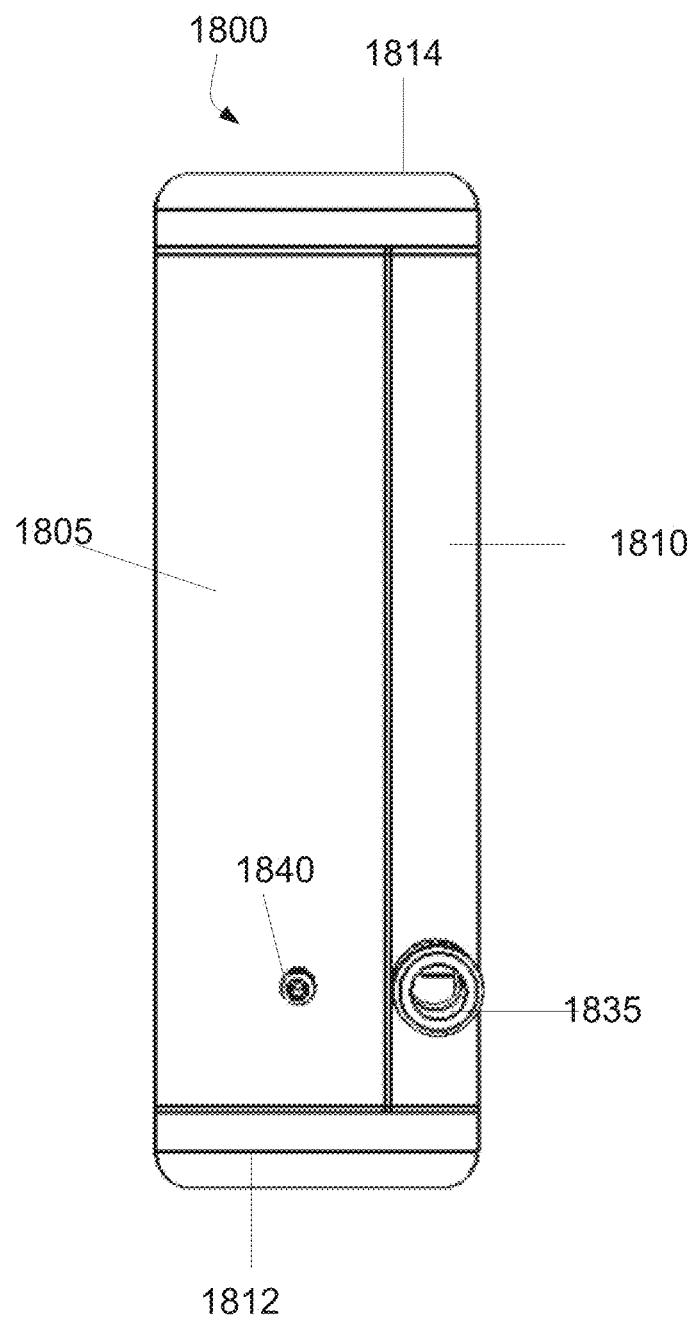

FIGS. 18A-18B are diagrammatic representations of one embodiment of a purifier cassette 1800. A purifier cassette housing may be formed from a number of housing components. The purifier cassette housing is formed from a side cover 1805, a side cover 1810, a first end cover 1812 and a second end cover 1814. The housing may include various ports including a filter inlet port, a filter outlet port 1835 and filter vent ports 1840

Figure 19:
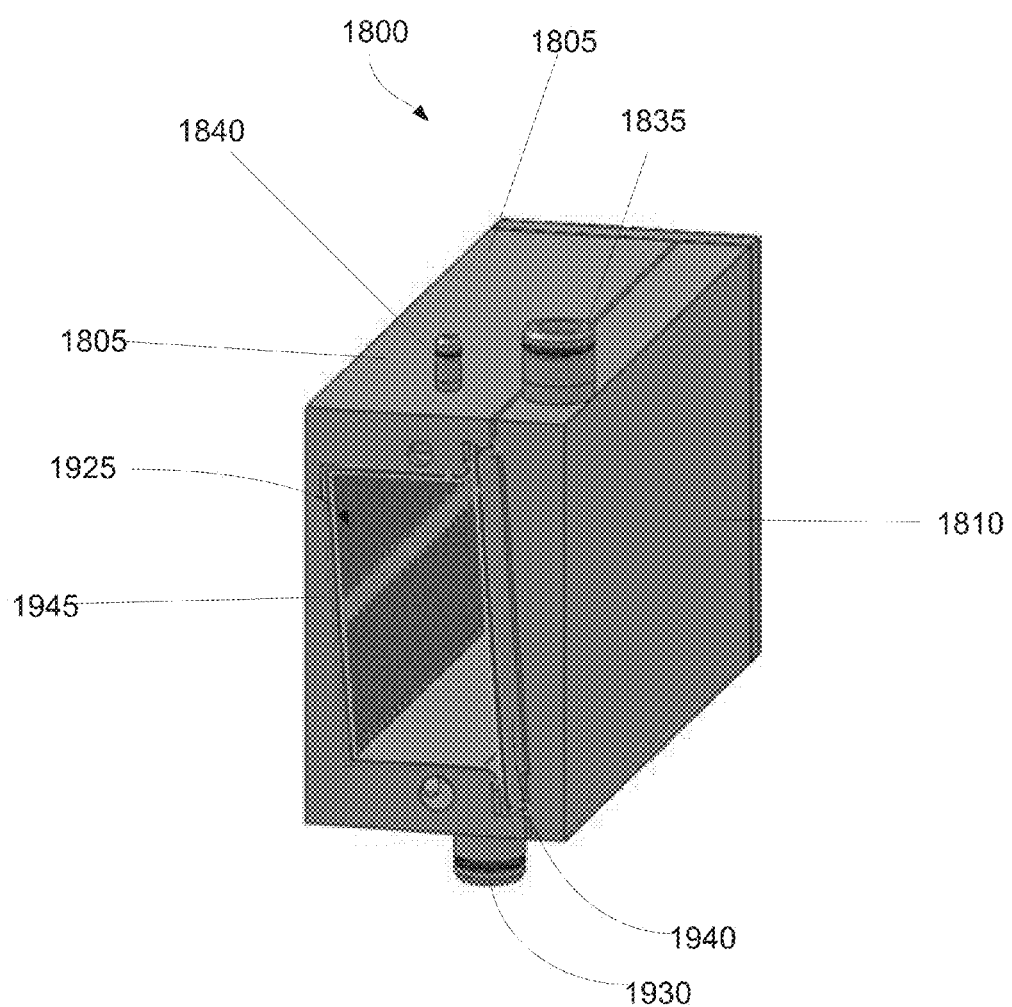
FIG. 19 is a diagrammatic representation of a cross-section of another embodiment of a cassette.

FIG. 19 is a diagrammatic representation of one embodiment of a cross section of a purifier cassette 1800, having a filter housing (including first side cover 1805 and second side cover 1810) defining a media cavity divided into an upstream portion and downstream portion by a purifier element (not shown) disposed in a filter holding area 1925. The purifier element can be any suitable purification media including, but not limited to one or more pleated filters, depth filters, hollow fiber membranes, or other purification media. In one embodiment, the purifier element comprises one or more rectangular pleat packs. The pleats of the filter can be formed from a single membrane or multiple membranes formed from the same or different materials. The filter membrane may be pleated with the length of the pleat parallel to the long axis of the cassette. Purifier element holding area 1925 may be configured so that a pleat pack will have a shifted parallelogram cross-section when viewed from the ends of the pleats.

A filter inlet port 1930 is located upstream of purifier element and a filter outlet port 1835 is located downstream of the purifier element (from a fluid flow perspective running through the filter). Filter vent ports (e.g., filter vent port 1840) can be located upstream and/or downstream of the purifier element. According to one embodiment, filter inlet port 1930 defines an upwardly vertical inlet flow path perpendicular to the pleat direction (such that flow entering is normal to the top and bottom flaps of the pleat pack), filter outlet port 1835 defines an upwardly vertical outlet flow path perpendicular to the pleat direction and filter vent port 1840 defines an upwardly vertical vent flow path. Preferably, filter vent port 1840 is open to the upstream portion of the media cavity at the highest point possible so that any gas in upstream portion naturally rises to filter vent port 1840. Similarly, an outlet vent port can be provided that is preferably open to the downstream portion of the media cavity at the highest point possible so that any gas in downstream portion naturally rises to the outlet vent port. The vent ports (or corresponding ports in the manifold) may be pressure actuated with an actuation pressure that is greater than the driving pressure of the fluid. The ports can comprise Connectology® connections from Entegris, Inc. of Billerica, Mass., Swagelok fittings or other connection capable of fluidic sealing. Other types of connections may also be used including a threaded connection as discussed below.

According to one embodiment, the various ports can be located as far to the front of the purifier cassette as possible while still allowing for bonding between the components. In other embodiments the ports may be otherwise arranged (e.g., with one or more ports near the center or back end of the purifier cassette). The centerlines of the openings for the filter inlet port (e.g., filter inlet port 1930 of FIG. 19), and 1835 can be located at the widest portion of the cassette in one embodiment. From a fluid flow perspective within the cassette, opening for filter inlet port can be located at the lowest point of the media cavity and the openings for ports 1835 and 1840 can be located at the highest point of the media cavity.

A downstream media cover 1940 and an upstream media cover 1945 can be disposed in the cavity and may form a purifier element holding area 1925. The upstream media cover 1945 and downstream media cover 1940 may be angled toward an upstream sidewall from bottom to top. In one embodiment, the angle of the upstream media cover 1945 and downstream media cover 1940 may match the taper of sidewall offset portions of ribs disposed on side cover 1805. Embodiments of the upstream and downstream media covers are discussed in more detail below.

To efficiently place ports in a footprint, purifier element holding area 1925 may be positioned so that the pleated area of the purifier element overlaps filter inlet port 1930, filter outlet port 1835 and/or filter vent port(s) 1840. However, if the flow of fluid entering filter assembly 1800 is sufficient, the fluid may damage the membrane. Accordingly, upstream media cover 1945 (one embodiment of which is discussed in more detail below) may include a portion that obstructs flow toward the membrane and redirects flow to the upstream sidewall.

The interior surfaces of the media cavity can be formed of a material that is more phobic or philic relative to the material of the purifier element. In one embodiment, the filter housing can be formed of a material such that the interior surfaces of the sidewalls are more philic to gas than the purifier element—or, put another way, the purifier element can be selected to be more phobic to gas than the housing material—to promote affinity of gas to the sidewalls. The gas is therefore more likely to rise to filter vent port 1840 rather than pass through the purifier element. A similar phenomenon can occur in the downstream portion. Furthermore, the shape of the cassette can be selected so that the width and/or height of the upstream and downstream portions of the interior cavity decrease away from the respective ports. Consequently, the hydraulic diameter of the upstream portion of the media cavity decreases away from filter inlet port 1930 and the hydraulic diameter of the downstream portion of the media cavity can increase toward filter outlet port 1835.

Figure 20A:
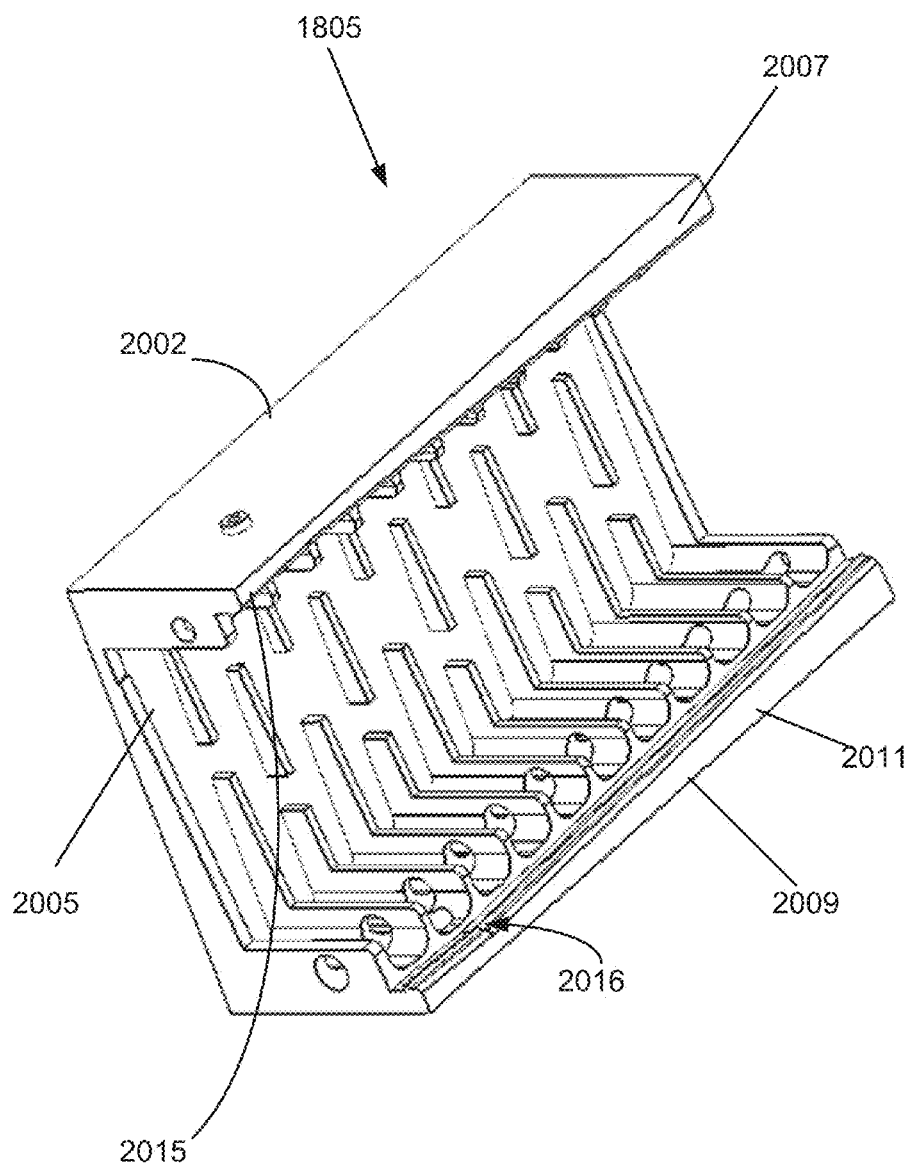
FIGS. 20A-20B are diagrammatic representations of one embodiment of a side cover.
Figure 20B:
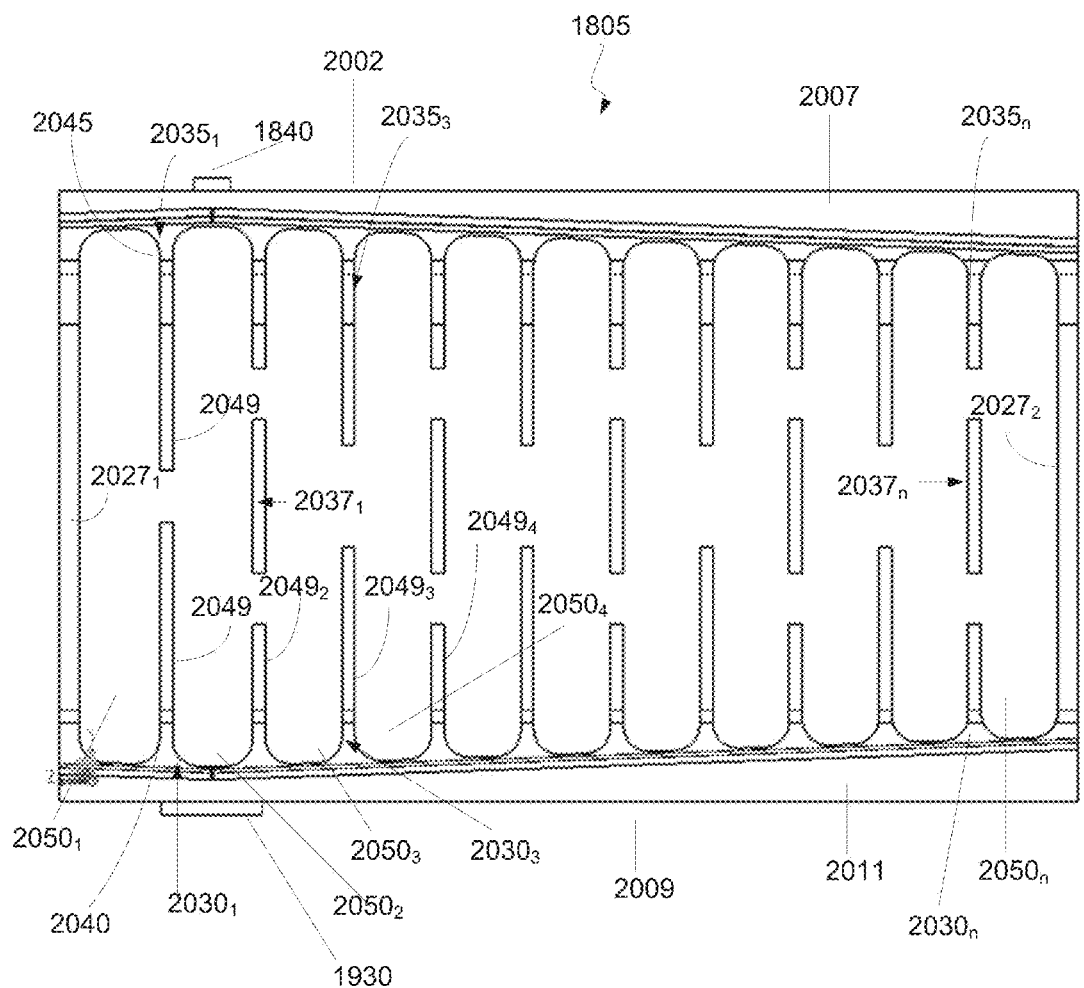

FIGS. 20A-20B are diagrammatic representations of one embodiment of side cover 1805. Side cover 1805 can include a top wall portion 2002, an upstream sidewall 2005 and a bottom wall portion 2009. Top wall portion 2002 may extend from upstream sidewall 2005 to a top wall portion joining edge 2007 and bottom wall portion 2009 may extend from sidewall portion 2005 to bottom wall portion joining edge 2011. Top wall portion 2002 and bottom wall portion 2009 may include an upper coupling portion 2015 and a lower coupling portion 2016. Upper coupling portion 2015 and lower coupling portion 2016 may comprise tongues and grooves running the length of side cover 1805.

According to one embodiment, side cover 1805 may have a series of ribs projecting into the interior cavity including; for example, end ribs $2027_1$ and $2027_2$, bottom ribs $2030_1$ through $2030_n$, top ribs $2035_1$ through $2035_n$ and intermediate ribs $2037_1$ through $2037_n$. Preferably n can be 1 to 20 and even more preferably n can be 1 to 10 bottom, top and intermediate ribs. There may a different number of top ribs, bottom ribs and intermediate ribs (e.g., 10 top ribs, 4 intermediate ribs and 7 bottom ribs). Each rib may include one or more of a bottom offset portion (e.g., bottom offset portion 2040), a top offset portion (e.g., top offset portion 2045) and a sidewall offset portion (e.g., sidewall offset portions 2049). Ribs 2030, for example, may be generally L shaped with a bottom offset portion 2040 extending a first height from bottom wall portion 2009 and a sidewall offset portion 2049 extending a second height greater than the first height. In one embodiment, the bottom offset portion 2040 extends across the bottom of the interior cavity from wall 2005 a first distance perpendicular (or at another angle) to the length of the interior cavity and the sidewall offset portion 2049 extends from sidewall 2005 into the interior cavity a distance that is less than that of bottom offset portion 2040. Bottom offset portion 2040 may act as a membrane standoff from the bottom surface of the interior cavity and sidewall offset portion 2049 may act as a pleat standoff from sidewall 2005. Sidewall offset portion 2049 may be tapered such that the distance sidewall offset portion 2049 extends away from sidewall 2005 decreases toward the top, thereby reducing the area of the upstream portion of the interior cavity from bottom to top.

Top ribs 2035 may also be generally L shaped with a top offset portion 2045 extending a first depth from top wall portion 2002 and a sidewall offset portion 2040 proximate to sidewall 2005 extending a second depth, greater than the first depth. In one embodiment, top offset portion 2045 extends from sidewall 2005 across the top of the interior cavity a first distance perpendicular (or at another angle) to the length of the interior cavity and sidewall offset portion 2049 extends from sidewall 2005 into the interior cavity a distance that is less than that of the top offset portion 2045. Top offset portion 2045 may act as a membrane standoff from the top surface of the interior cavity and sidewall offset portion 2049 may act as a pleat standoff from sidewall 2005. Sidewall offset portion 2049 may be tapered such that the distance sidewall offset portion 2049 extends away from sidewall 2005 decreases toward the top.

According to one embodiment, the height of bottom ribs 2030 is selected so that the upper edges of bottom offset portions 2040 are level with each other when the purifier cassette is installed. The top ends of sidewall offset portions 2049 of alternating bottom ribs may also level with each other when the purifier cassette is in a fully installed position (e.g., with filter inlet port 1930 aligned vertically). For example, the upper edges of a bottom offset portions 2040 of ribs 2030 lie in a first plane and the upper edges of sidewall offset portions 2049 of a first set of alternating bottom ribs 2030 lie in a second plane. Thus, when the filter is installed, the tops of the bottom offset portions 2040 of each rib $2030_1$ through $2030_n$ will be at the same fluid level and the tops of the sidewall offset portions 2049 of the first set of alternating bottom ribs 2030 (e.g., ribs $2030_2$, $2030_4$, etc.) will be at the same fluid level as each other.

Similarly, the lower edges of top offset portions 2045 of top ribs 2035 can be level with each other and the lower edges of sidewall offset portions 2049 of alternating top ribs 2035 may also be level with each other when the purifier cassette is installed. For example, the lower edge of top offset portions 2045 of ribs 2035 may lie in a third plane and the lower edges of sidewall offset portions 2049 of a first set of top ribs 2035 may lie in a fourth plane. The first, second, third and fourth planes can be parallel horizontal planes when the purifier cassette is in a full installed, operating position (e.g., with the filter inlet port 1930 aligned vertically).

Side cover 1805 may further comprise a set of intermediate ribs $2037_1$-$2037_n$ aligned with alternating top and bottom ribs and projecting inward from sidewall 2005 to provide sidewall offsets. The distance that intermediate ribs 2037 project inward may decrease along the rib from bottom to top. Alternating top ribs 2035 and bottom ribs 2030 may be vertically aligned with intermediate ribs 2037. According to one embodiment, the length of an intermediate rib 2037 is selected so that the top end of the intermediate rib overlaps sidewall offset portions 2049 of adjacent alternating top ribs 2035 and the lower end of the intermediate rib overlaps sidewall offset portion 2049 of adjacent alternating bottom ribs 2030. For example, the top end of rib $2037_1$ overlaps sidewall offset portions 2049 of ribs $2035_1$ and $2035_3$ and the lower end of rib $2037_1$ overlaps the tops of sidewall offset portions 2049 of bottom ribs $2030_1$ and $2030_3$.

The spaces between adjacent ribs form flow channels in cooperation with the bottom of the upstream media cover. For example, the area between adjacent ribs $2030_1$ and $2030_2$ forms flow channel $2050_2$ open to the filter inlet. When the upstream media cover is in place and fluid is introduced into the media cavity, the fluid will follow the flow channels. In the example shown, fluid will fill flow channel $2050_2$ along the bottom of the interior cavity and then follow flow channel $2050_2$ up sidewall 2005 until it overtops rib $2030_2$, at which point the fluid will flow into adjacent channel $2050_3$. Fluid will continue to fill channels $2050_2$ and $2050_3$ until the fluid overtops ribs $2030_1$ and $2030_3$ to begin to fill flow channels $2050_1$ and $2050_4$. This process can continue until fluid fills channel $2050_n$. The rib configuration helps ensure that fluid weaves along sidewall 2005 increasing the likelihood that gas bubbles will be attracted to sidewall 2005 and flow upwards. Furthermore, the rib configuration helps distribute fluid along the length of sidewall 2005 to promote even wetting of the purifier element.

According to one embodiment, the bottom offsets and top offsets each have a radiused base to form flow channels with radiused sides. The radiused bases provide better stress distribution than cases in which ribs meet the top and bottom walls at a sharp angle. Additionally, holes through the bottom offset portions of bottom ribs 2030 and top offset portions of top ribs 2035 allow flow between adjacent flow channels.

FIG. 20B further illustrates that top wall portion 2002 and bottom wall portion 2009 may have inner surfaces that taper toward each other away from filter inlet port 1930. In the embodiment illustrated, the taper begins immediately at filter inlet port 1930. This can help decrease the hydraulic diameter of the media cavity away from filter inlet port 1930, helping reduce or eliminate dead space. Furthermore, filter vent port 1840, in the embodiment shown, is open to the highest point in the media cavity. Other embodiments may include un-tapered portions and tapered portions.

Figure 21A:
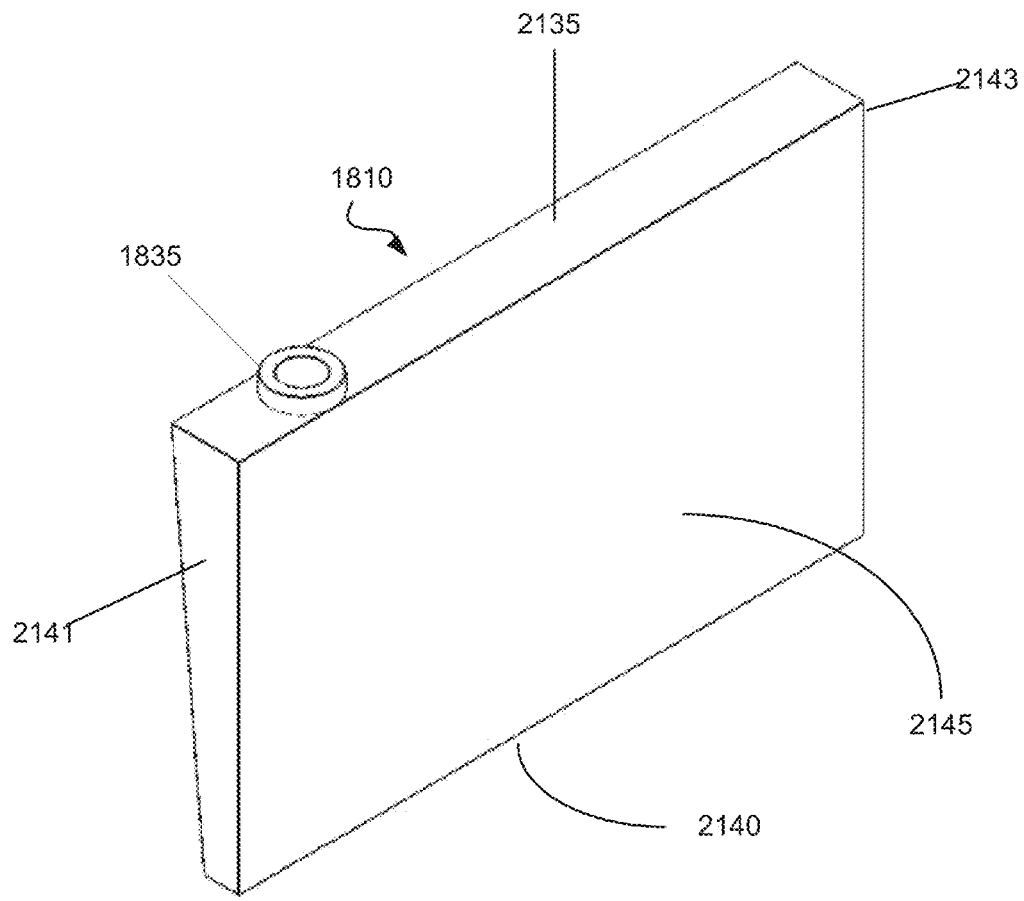
FIGS. 21A-21B are diagrammatic representations of one embodiment of a side cover.
Figure 21B:
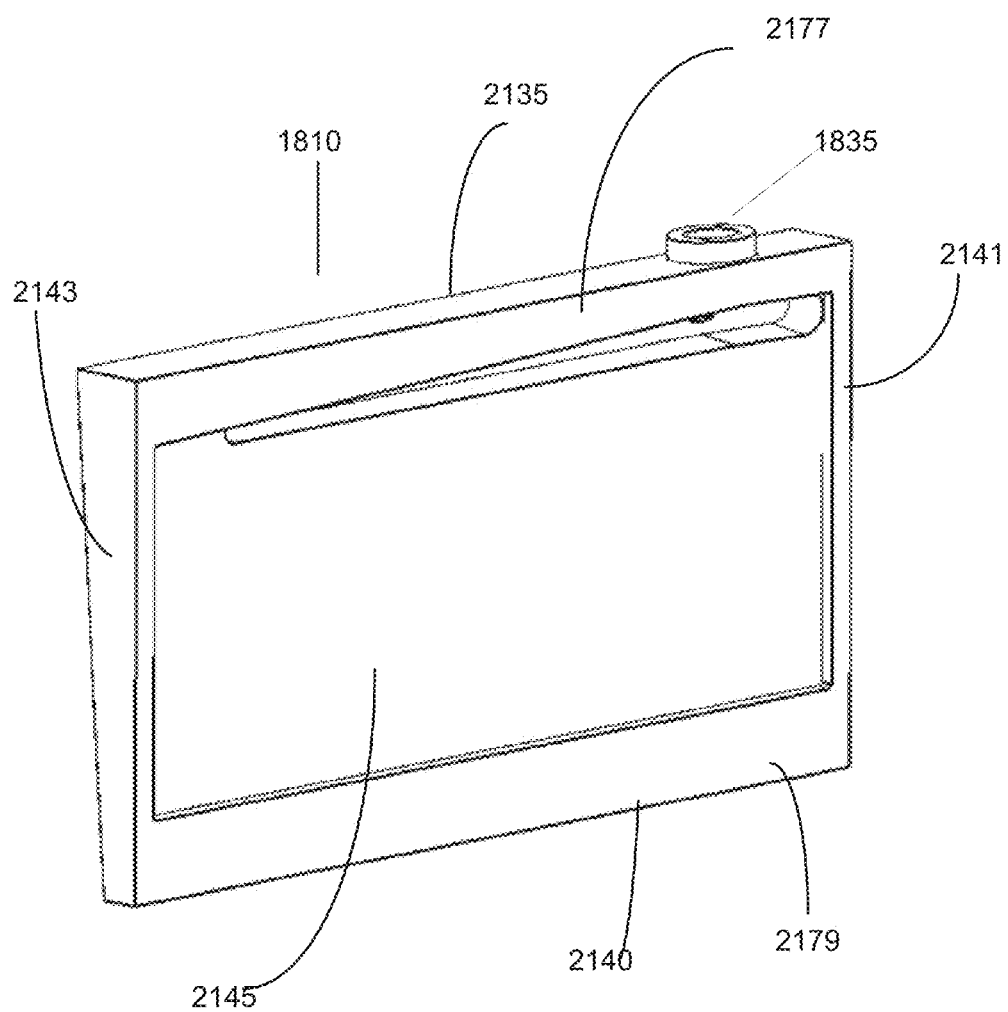

FIGS. 21A and 21B are diagrammatic representations of one embodiment of a side cover 1810. Side cover 1810 may include a top wall portion 2135, a bottom wall portion 2140, a sidewall portion 2145, a first end portion 2141 and a second end portion 2143. Top wall portion 2135 may extend from sidewall portion 2145 to an inner edge 2177 and bottom wall portion 2140 may extend from sidewall portion 2145 to an inner edge 2179. Edges 2177 and 2179 may be bonded to edges 2007 and 2011 respectively to create a joining seam that runs the length of the filter cartridge parallel to the pleats of the pleat pack.

Side cover 1810 may be shaped so that the widest portion of the cassette, or at least the widest portion of the downstream portion of the interior cavity, is coincident with the centerline of filter outlet port 1835. Furthermore, side cover 1810 may be shaped so that the area of the front section of the downstream portion of the interior cavity decreases from outlet port forward and/or the area of the back section of the downstream portion of the interior cavity decreases from filter outlet port 1835 back. For example, top wall portion 2135 may also be shaped so that the interior cavity tapers downward from filter outlet port 1835 back. Top wall portion 2135 may also be shaped so that the interior cavity tapers downward from filter outlet port 1835 forward. Similarly, bottom wall portion 2140 may be shaped so that the interior cavity tapers upward from filter outlet port 1835 back and from filter outlet port 1835 forward. Sidewall 2145 may also be shaped so that the interior cavity taper inwards from filter outlet port 1835 back and filter outlet port 1835 down.

Figure 22:
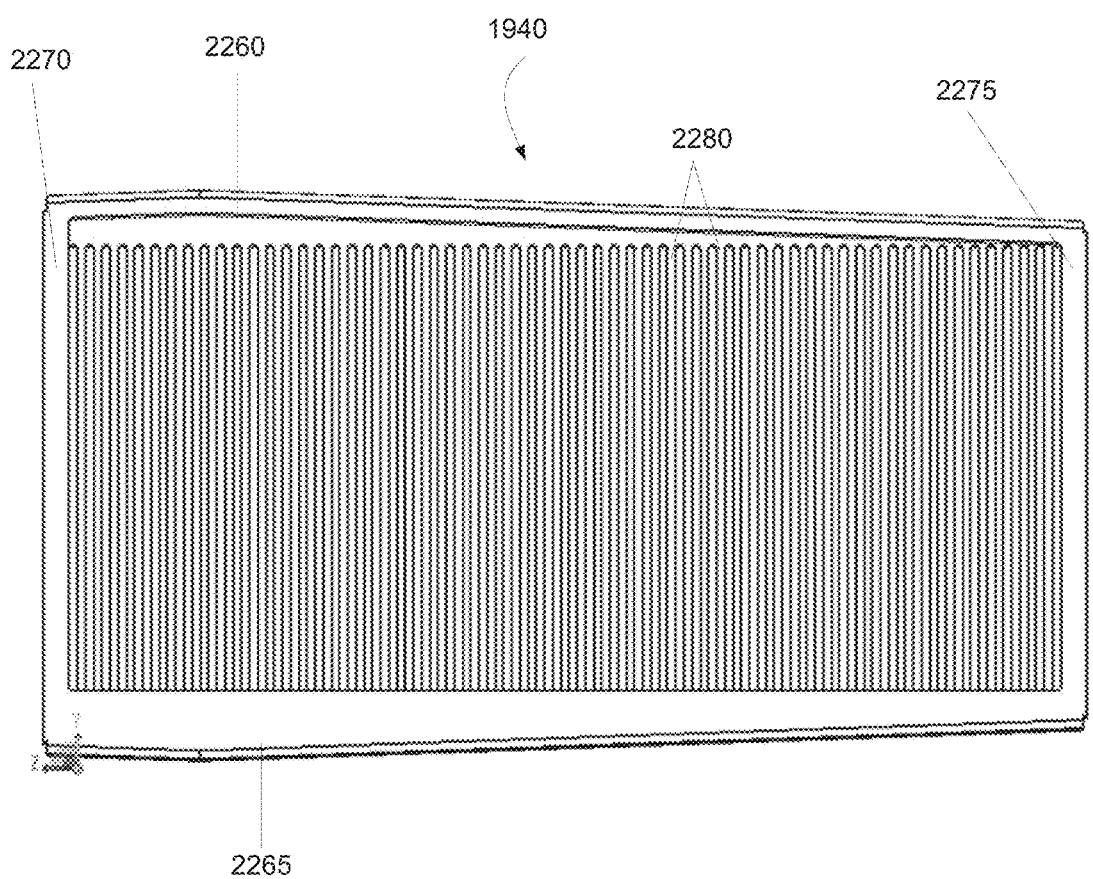
FIG. 22 is a diagrammatic representation of one embodiment of a media cover.

FIG. 22 is a diagrammatic representation of one embodiment of downstream media cover 1940. Media cover 1940 can be configured to maintain a purifier element in place while allowing flow. According to one embodiment, media cover 1940 can comprise an outer frame having an upper member 2260, a lower member 2265, a front end member 2270 and a back end member 2275 spanning between upper member 2260 and lower member 2265. Upper member 2260 and lower member 2265 may include features to allow coupling of media cover 1940 to the remainder of the purifier cassette. As discussed below, for example, media cover 2260 may include a tongue and groove feature for snap fit connection to the main cover. Media cover 2260 may be configured so that a first side of the upper member 2260 contains a contact surface to contact the tips of top ribs 2035 and lower member 2265 includes a contact surface to contact the tips of bottom ribs 2030.

Media cover 1940 may also include intermediate spaced members 2280 spanning between upper member 2260 and lower member 2265. The spaced members have open spaces between them to allow liquid or fluid flow. A support member spanning from end member 2270 and back end member 2275 may provide additional support for spaced members 2280. Preferably, the intermediate members 2280 or other retaining structure is sufficiently strong to hold the purifier element against ribs of the main cover. The side cover 1810 may also include ribs to contact intermediate members 2280 to provide additional support. Intermediate members 2280 may be angled up and to the front, to allow such ribs on the side cover to act as flow directing devices to direct flow entering the downstream portion of the interior cavity to the filter outlet port. In other embodiments, media cover 1940 may include mesh or other structural elements to maintain the purifier element while allowing flow.

Figure 23:
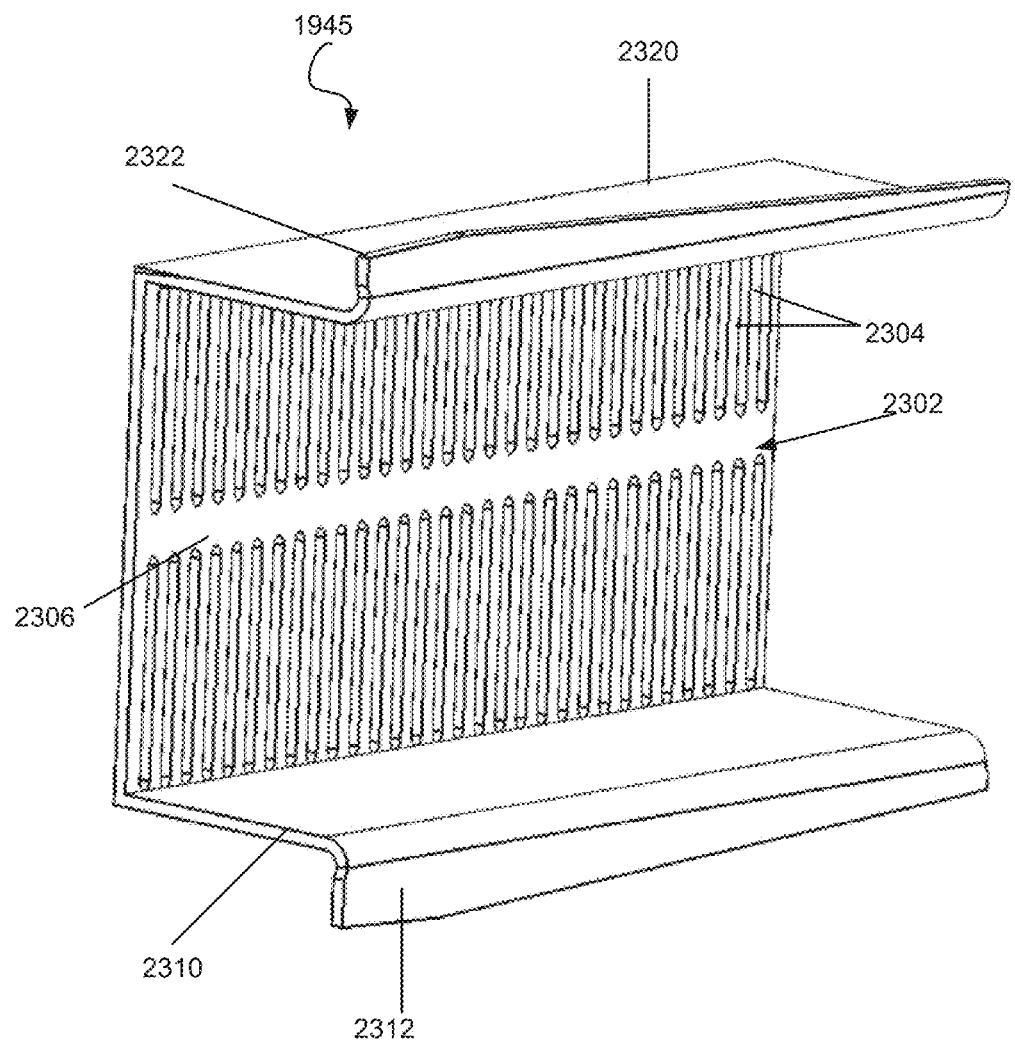
FIG. 23 is a diagrammatic representation of another embodiment of a media cover.

FIG. 23 is a diagrammatic representation of one embodiment of upstream media cover 1945. Upstream media cover 1945 can comprise a main media cover portion 2302 comprising a set a spaced members 2304. The spaced members have open spaces between them to allow flow. A support member 2306 may span the length of media cover 1945 to provide support to spaced member 2304. Upper and lower extensions 2320 and 2310 may extend from media cover portion 2302 (e.g., to create a top and bottom to the filter holding area). A tab 2322 may extend upward from upper extension 2320 and a tab 2312 may extend from lower extension 2310. Tabs 2322 and 2312 may be sufficiently thin so that they may be captured between downstream media cover 1940 and side cover 1805 when side cover 1805 and downstream media cover 1940 are coupled together.

Figure 24A:
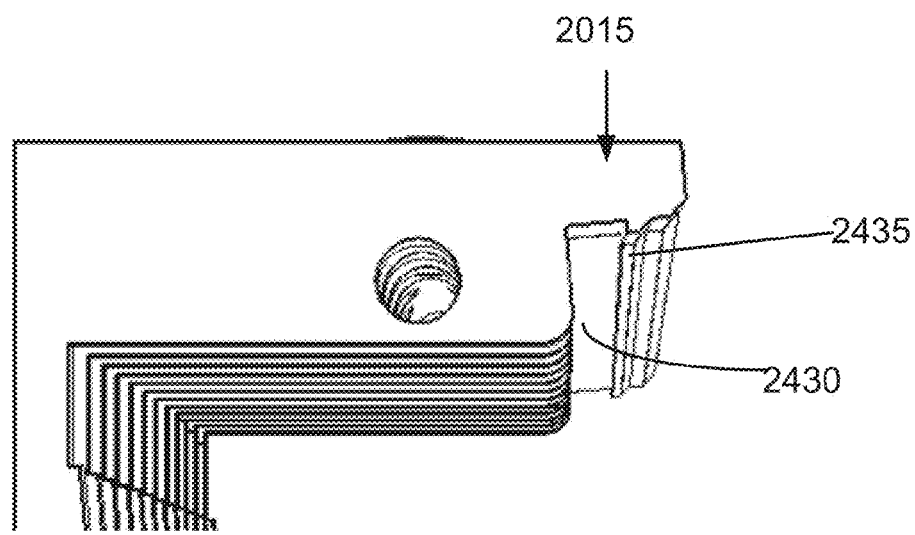
FIGS. 24A-24B are diagrammatic representations of a portion of a main body.
Figure 24B:
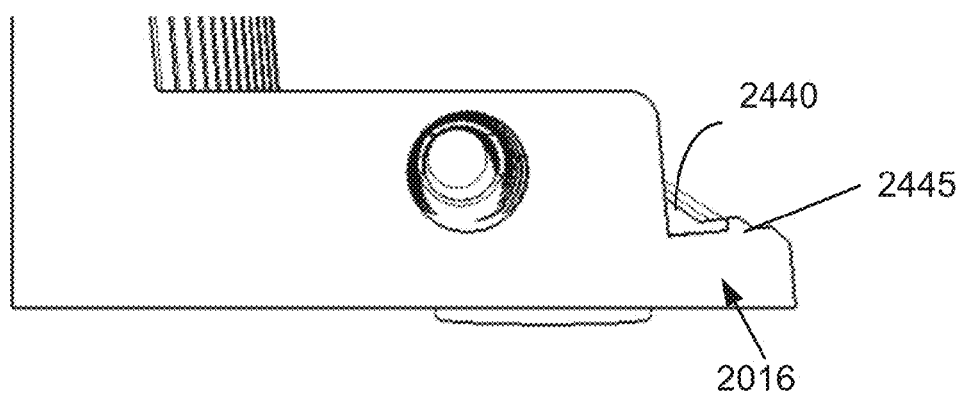
Figure 25A:
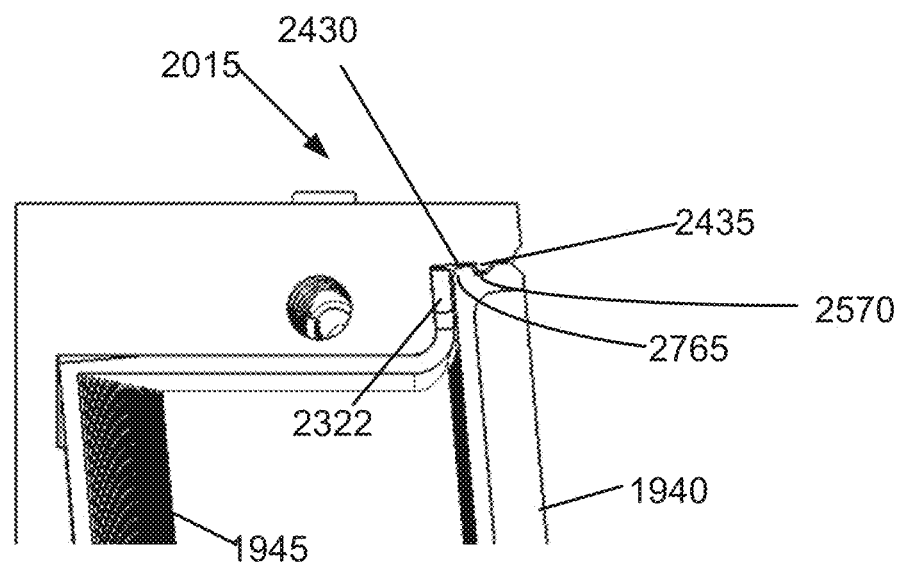
FIGS. 25A-25B are diagrammatic representations one embodiment of a portion of a cassette.
Figure 25B:
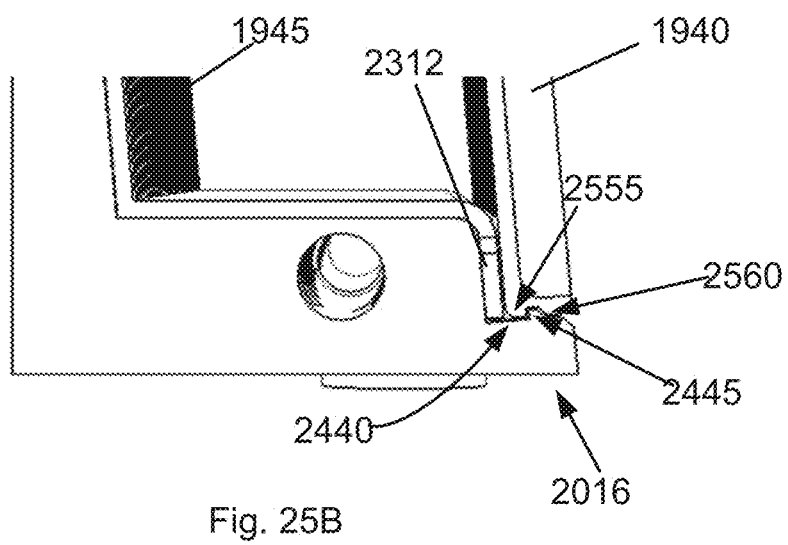
Figure 26A:
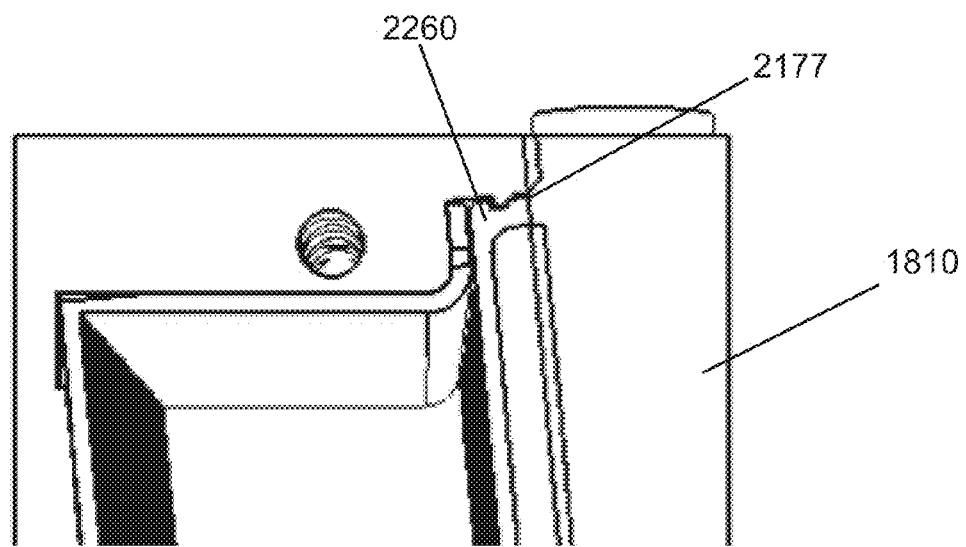
FIGS. 26A-26B are diagrammatic representations one embodiment of a portion of a cassette.
Figure 26B:
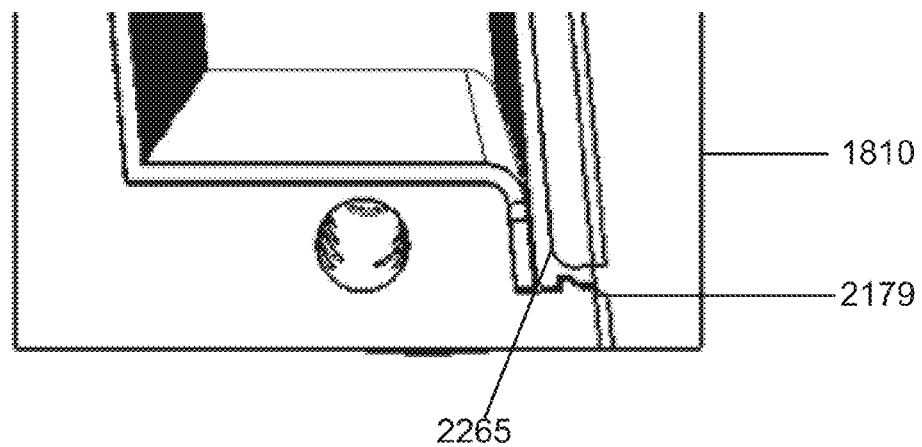
Figure 27A:
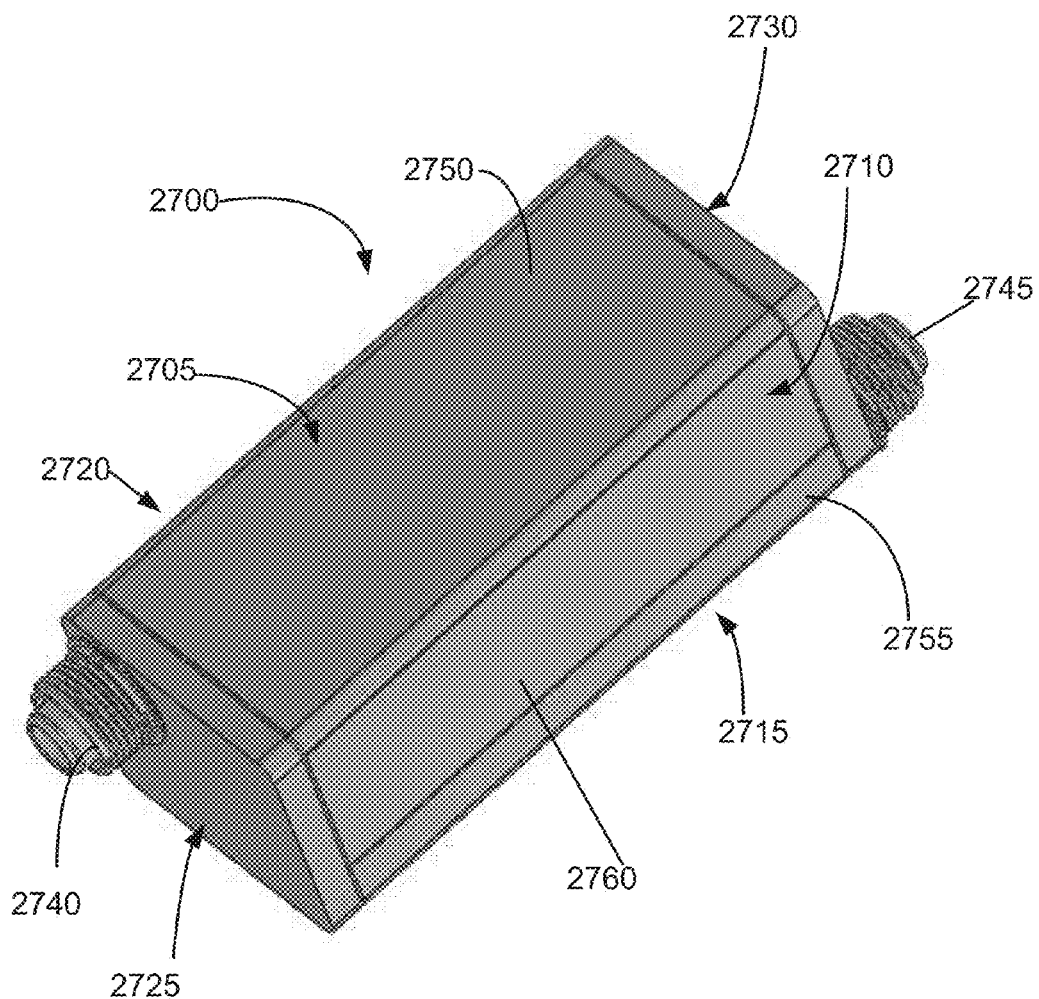
FIGS. 27A-27D are diagrammatic representations of another embodiment of a purifier cassette.
Figure 27B:
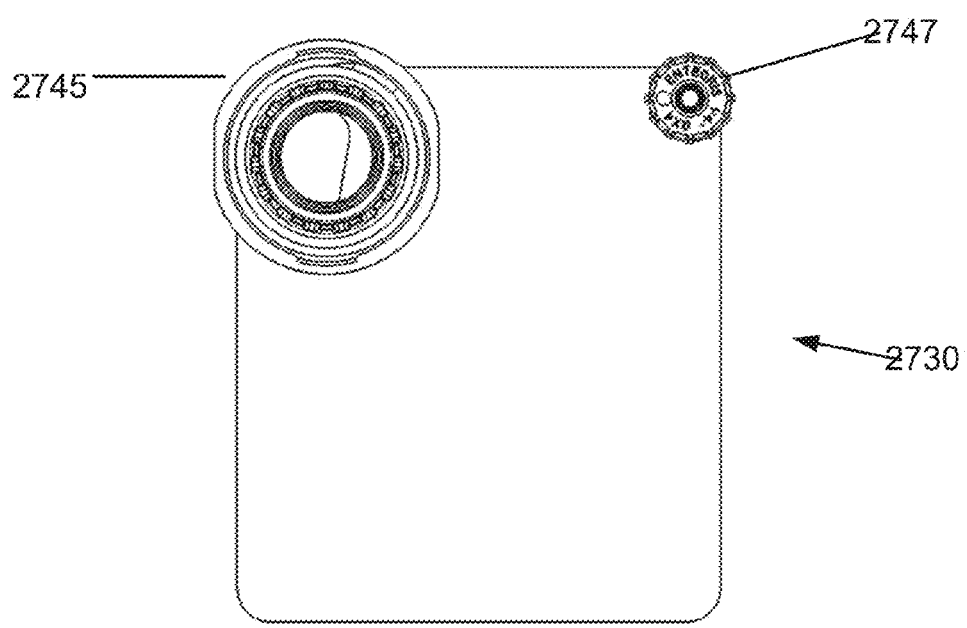
Figure 27C:
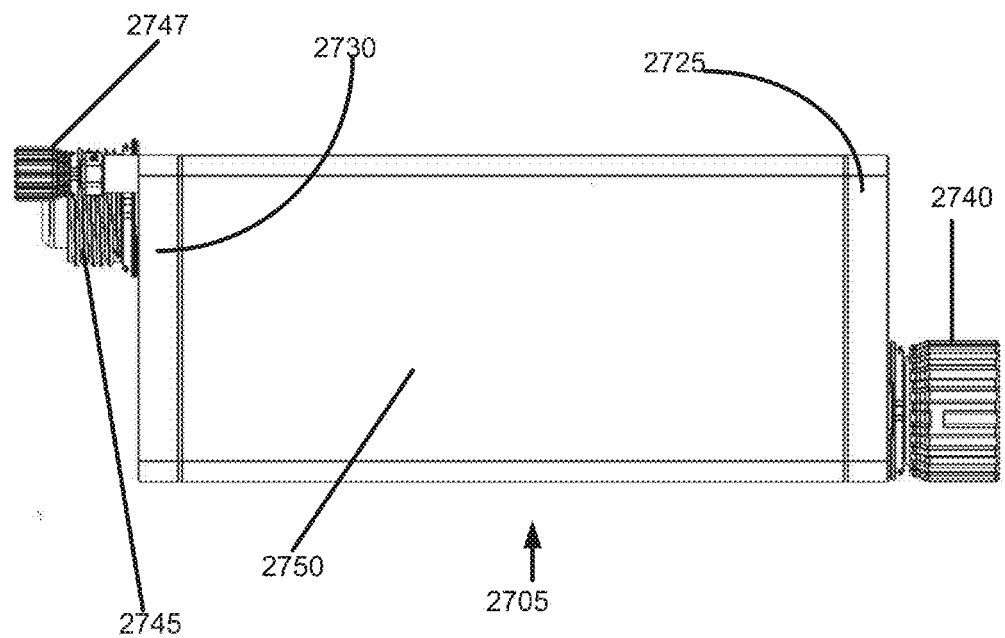
Figure 27D:
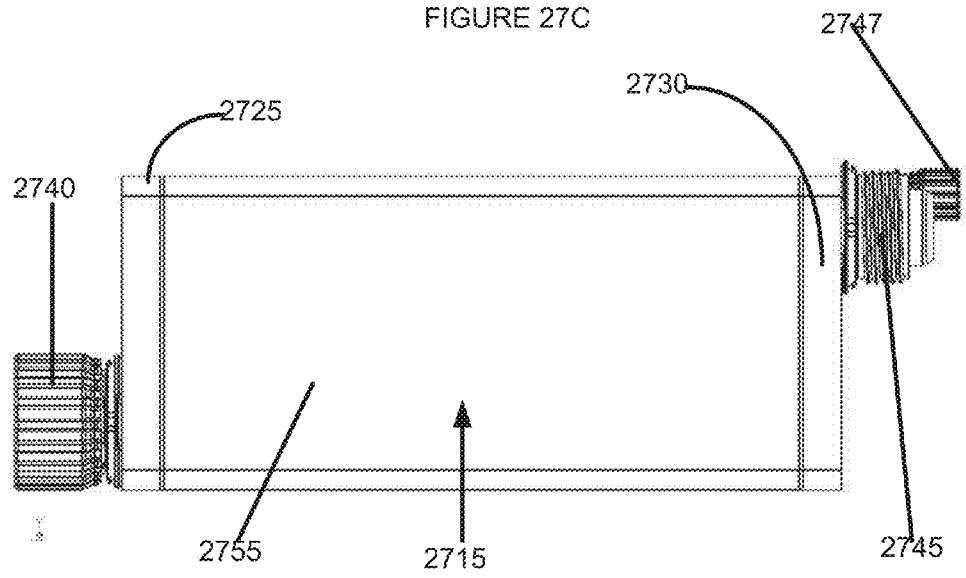

With reference to FIGS. 24A, 24B, 25A, 25B, 26A and 26B (with FIGS. 24A, 25A and 26A representing an upper portion and FIGS. 24B, 25B and 26B representing a lower portion), media covers 1940 and 1945 may be coupled to side cover 1805 using a snap-fit, interference fit, sonic bonding, thermal bonding or according to any suitable coupling mechanism. According to one embodiment, side cover 1805 may include lower and upper coupling portions 2015 and 2016 to couple media covers 1940 and 1945 to side cover 1805. Coupling portion 2015 defines a groove 2430 and tongue 2435 running the length of side cover 1805. Coupling portion 2016 includes a groove 2440 and tongue 2445 running the length of side cover 1805. Media cover 1940 includes corresponding lower tongue 2555 and groove 2560 and upper tongue 2765 and groove 2570. Groove 2430 captures tongue 2765 and groove 2570 captures tongue 2435. Similarly, groove 2440 captures tongue 2555 and groove 2560 captures tongue 2445. In operation, media cover 1940 can be secured using a snap-fit, with upper and lower coupling portion 2015 spreading apart slightly to allow tongues 2555 and 2765 to pass tongues 2435 and 2445 respectively and seat in grooves 2430 and 2440. The resilience of the side cover 1805 material can cause the coupling portions 2015 and 2016 to snap back to a position in which media cover 1940 is captured. According to one embodiment, the snap can be sufficient to provide haptic or auditory feedback that media cover 1940 is secure. Tabs 2322 and 2312 may be sufficiently thin so that they may be captured between downstream media cover 1940 and side cover 1805 when side cover 1805 and downstream media cover 1940 are snap-fit together. Although not shown, the upper and lower flaps of a pleated purifier element may also be captured between downstream media cover 1940 and side cover 1805.

Media covers 1940 and 1945 may be bonded to side cover 1805 at coupling portions 2015 and 2016. Furthermore, upstream media cover may be bonded to the edges of one or more of the end ribs, intermediate ribs, top ribs or bottom ribs. In addition, downstream media cover 1940 may be bonded to side cover 1810. For example, one side of upper member 2260 may be bonded to edge 2177 and one side of lower member 2265 may be bonded to edge 2179. The ends of upstream media cover 1945 and downstream media cover 1940 may also be bonded to the end covers.

Upstream media cover 1945 and downstream media cover 1940 may act as tension members to provide tension in a direction parallel to the pleats and perpendicular to the pleats (for example, parallel to the inlet and outlet flow paths). For example, upstream media cover 1945 and downstream media cover 1940 can provide strength from top to bottom and from front to back in the cassette of FIG. 19.

Returning to FIG. 19, in operation, a filter assembly may provide normal flow filtration (NFF). Fluid enters filter inlet port 1930 in a generally upward direction and is directed to an upstream sidewall 2005 of the media cavity. As pressure increases in the upstream portion, the fluid flows through the purifier element (in a pleat tip-to-pleat tip direction). The primary flow path of fluid through the purifier element, in one embodiment, can be generally perpendicular to the flow path through filter inlet port 1930. The media cavity can be configured to promote uniform or near uniform flow throughout the device to fully sweep the filter (e.g., to minimize or eliminate dead space) and minimize the pressure loss effects.

A purifier cassette using a pleat pack purifier element can be assembled according to the following steps. A filter membrane can be inserted into media cover 1945 and media cover 1945 can be placed in the side cover 1805 (or vice versa) with the ends of the last flaps of the pleat and the tabs 2322 and 2312 (FIG. 23) sitting along the coupling portions 2015 and 2016. Media cover 1945 may be bonded to side cover 1805 at one or more spots. Media cover 1940 can be snap fit into place. This step locks the membrane and media cover 1940 in position with the tongue-and-groove fit between the cover 1940 and the shell. Unlike a typical cylindrical style cartridge device, there is no need to wrap a pleat pack to seal the two long membrane edges together before assembling into a device. Side cover 1810 can then be bonded to side cover 1805 using any suitable bonding scheme including, but not limited to, sonic bonding, welding, adhesives, thermal contact or non-contact thermal bonding operations. According to one embodiment, bonding the housing and sealing the membrane edges can happen in a single bonding operation. Side cover 1810 may also be coupled to side cover 1805 using mechanical fasteners. If required, a gasket can be disposed between side cover 1810 and side cover 1805.

The ends of the pleat pack can be potted in a polymer or resin. According to one embodiment, a desired length of each end of the assembly can be dipped in the desired potting material, such as a laminate, polymer, resin, adhesive or other potting material to seal the ends of the interior chamber and pleat pack. Preferably the potting material is a thermoplastic. By way of example, but not limitation, the front and back 0.3175 centimeters to 1.27 centimeters of the pleat pack can be sealed with potting material. The potting material can seal the ends of the pleat pack and interior cavity, separating the upstream portion and downstream portion of the filter assembly and reducing or preventing hold up volume. In other embodiments, the ends of the pleat pack can be sealed with a potting material prior to insertion in side cover 1805, however doing so may result in some dead space between the potting and the ends of the purifier cassette. The front and back end covers 1812/1814 (FIG. 18B) can be coupled to the main body of the purifier cassette using the potting material, sonic bonding, welding, adhesives, thermal bonding, contact or non-contact bonding operations, mechanical fasteners or otherwise.

FIGS. 27A-D are diagrammatic representations of another embodiment of a filter assembly 2700 arranged as a purifier cassette. Filter assembly 2700 may comprise a housing formed from one or more portions. According to one embodiment, filter assembly 2700 may be generally rectangular with a first wall 2705, a second wall 2710, a third wall 2715 opposite the first wall, a fourth wall 2720 opposite the second wall, a fifth wall 2725 and a sixth wall 2730 opposite the fifth wall. The various walls may be formed by one or more portions of filter assembly 2700. According to one embodiment, the outer walls of filter assembly 2700 may be relatively straight. Filter assembly 2700 may further comprise a filter inlet port 2740 at the first end and a filter outlet port 2745 and inlet vent port 2747 at the second end. The inlet and outlet ports may include any suitable connectology. By way of example, but not limitation, the inlet and outlet ports may use PrimeLock® fittings. In some embodiments, one or more drain ports may also be included (e.g., at wall 2725). Walls 2725 and 2730 may be the same part with the same number and configuration of ports.

According to one embodiment the sidewalls of filter assembly 2700 can be formed by a first cover 2750, a second cover 2755 and an integrated purifier element shell 2760. End walls 2725 and 2730 may be integrated with or separate from integrated purifier element shell 2760. The integrated purifier element shell 2760 may integrate at least one media cover with the walls of the housing that act as a pressure vessel.

Figure 28:
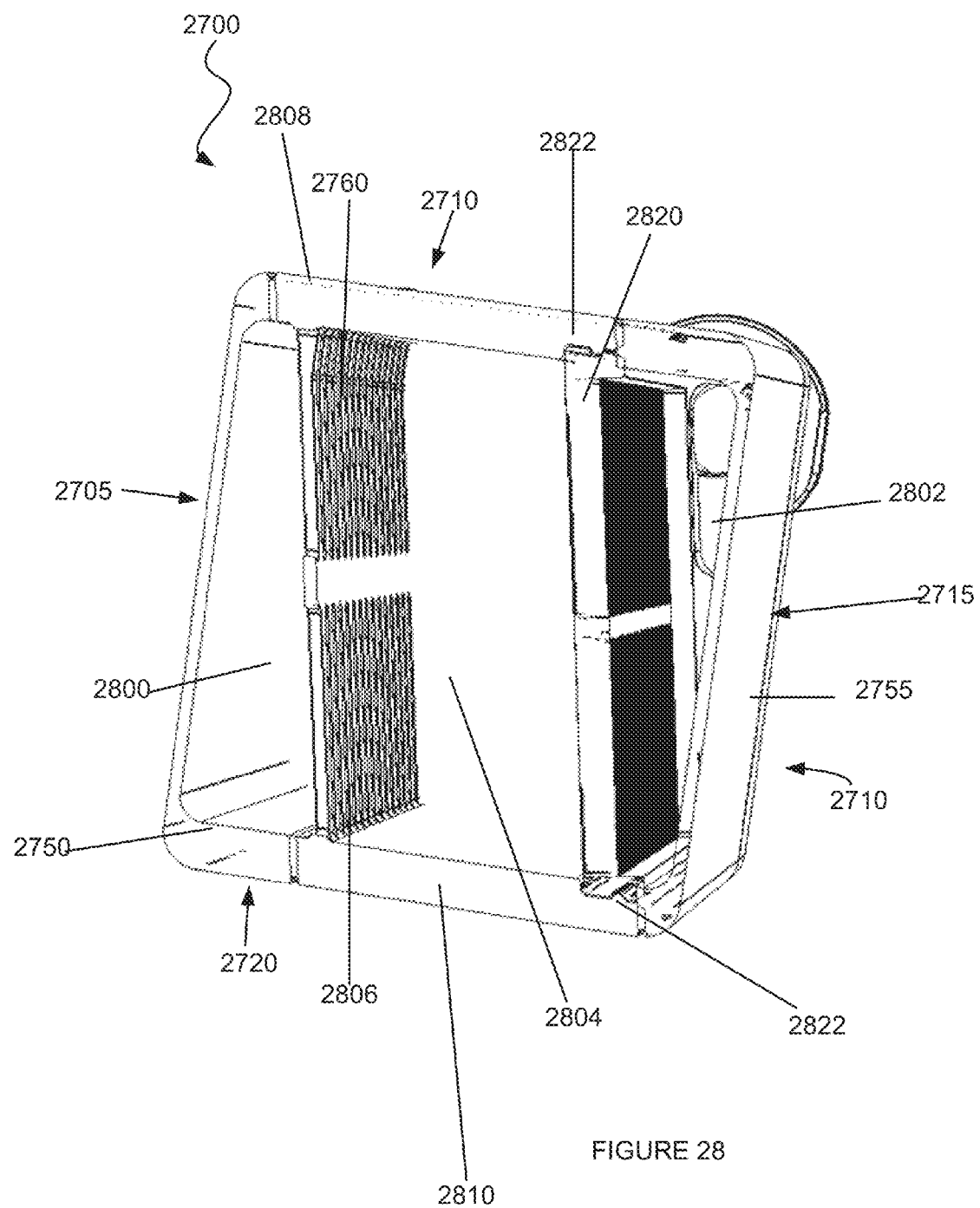
FIG. 28 is a diagrammatic representation of one embodiment of a view of a purifier cassette.

FIG. 28 is a diagrammatic representation of a cross section of one embodiment of filter assembly 2700. The housing defines a media cavity having an upstream portion 2800 and a downstream portion 2802 separated by a purifier element (not shown) disposed in purifier element holding area 2804. The purifier element, according to one embodiment, may comprise one or more rectangular pleat packs with the pleats parallel to the long axis of the filter assembly having a first set of pleat tips arranged generally in a plane and facing upstream portion 2800 and a second set of pleat tips arranged generally in a plane and facing downstream portion 2802.

According to one embodiment, integrated purifier element shell 2760 may include a first media cover 2806 (e.g., an upstream media cover) running the length of the media cavity, a first sidewall portion 2808 extending from the first media cover 2806 and forming a portion of wall 2710 and a second sidewall portion 2810 extending from first media cover 2806 and forming a portion of opposite wall 2720. A first inner edge and second inner edge of cover 2750 may be joined to integrated purifier element shell 2760 and a first inner edge and second inner edge of second cover 2755 may be joined to the ends of first sidewall portion 2808 and second sidewall portion 2810 to form bonding seams that run parallel to the pleats the length of the sidewalls. The end edges of first cover 2750 and second cover 2755 may be bonded to the end walls to complete sealing of filter assembly 2700.

Purifier element holding area 2804 can be defined as a shifted parallelogram by a second media cover 2820 (e.g., a downstream media cover) running the length of the media cavity in cooperation with integrated purifier element shell 2760. The ends of first sidewall portion 2808 and second sidewall portion 2810 may include coupling portions 2822 to couple to second media cover 2820 using a snap fit as discussed above.

According to one embodiment, the purifier element may be a pleat pack having pleat tips abutting upstream media cover 2806 and a set of pleat tips abutting downstream media cover 2820, the pleats running from the first end to a second end of the media cavity. The fluid can enter the media cavity in a direction parallel to the pleats (e.g., from the first end wall) and exit in a direction parallel to the pleats (e.g., from a second end wall). In another embodiment, Fluid can enter and leave from the same end wall.

Figure 29A:
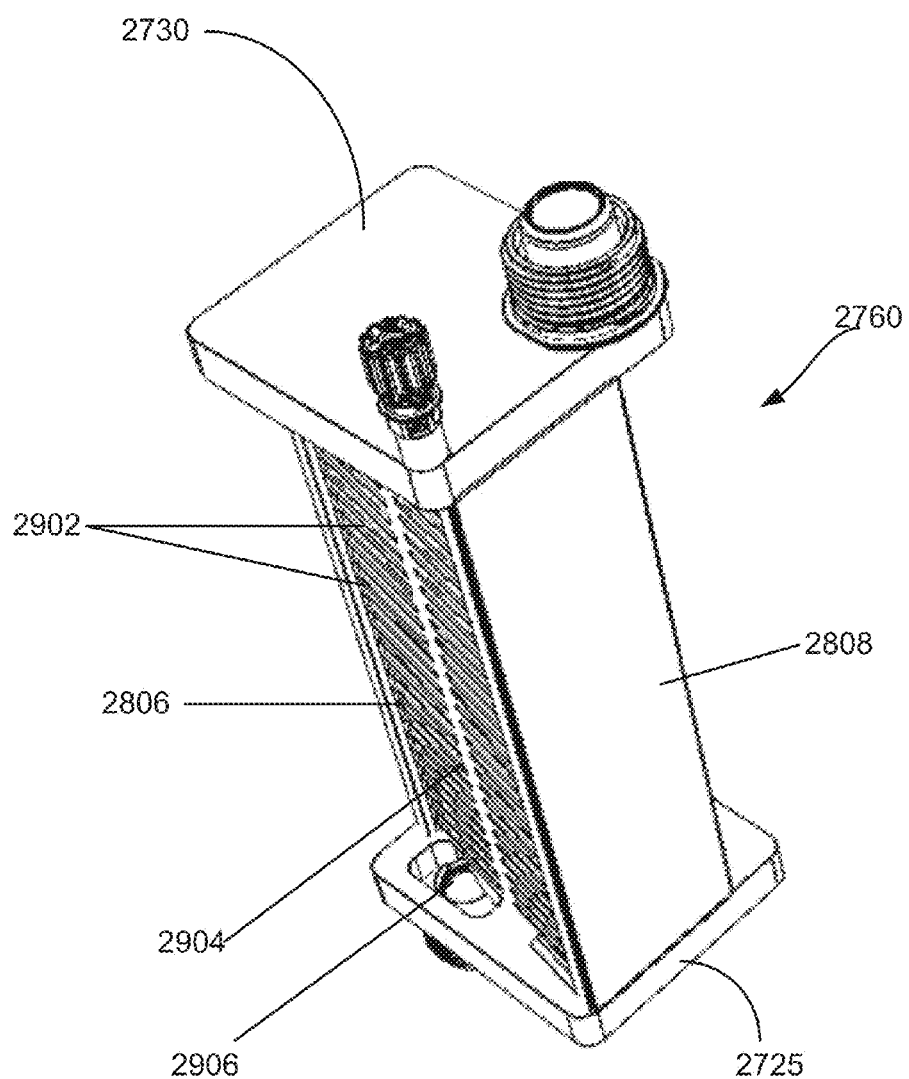
FIGS. 29A-29B are diagrammatic representations of one embodiment of a main shell.
Figure 29B:
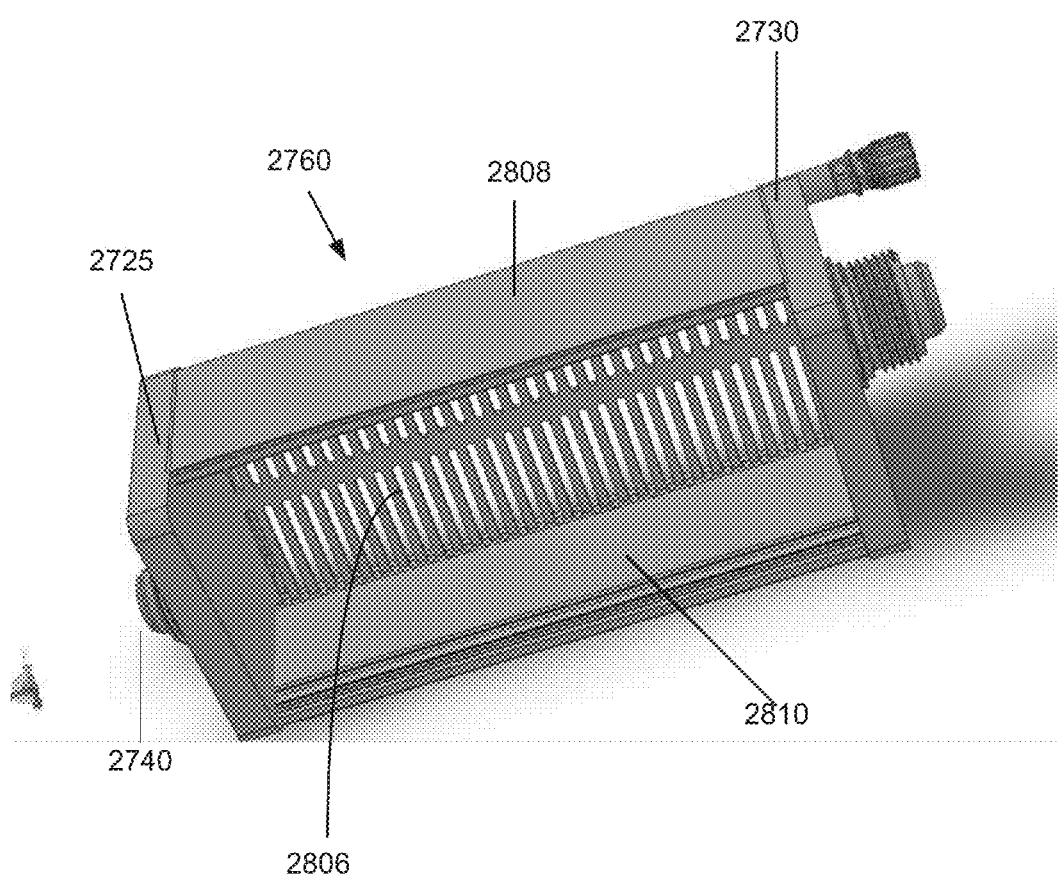

FIGS. 29A-B are diagrammatic representations of one embodiment of integrated purifier element shell 2760. In the embodiment illustrated, end wall 2725 and 2730 are portions of integrated purifier element shell 2760. First media cover 2806 extends from end wall 2725 to end wall 2730 and between first sidewall portion 2808 and second sidewall portion 2810. First media cover may include spaced members 2902 running across first media cover 2806 that allow fluid flow through 2806. A support 2904 may be included running from a first end to a second end of first media cover 2806 to provide support to the spaced members. First media cover 2806 may be angled so that when integrated purifier element shell 2760 is in place, the area of upstream portion 2800 decreases from the fourth wall 2720 to the second wall 2710 (see FIG. 28) so that there is a decreasing hydraulic diameter as fluid moves up and away from the inlet. FIG. 29A further illustrates opening 2906 open to the filter inlet port 2740.

Figure 30A:
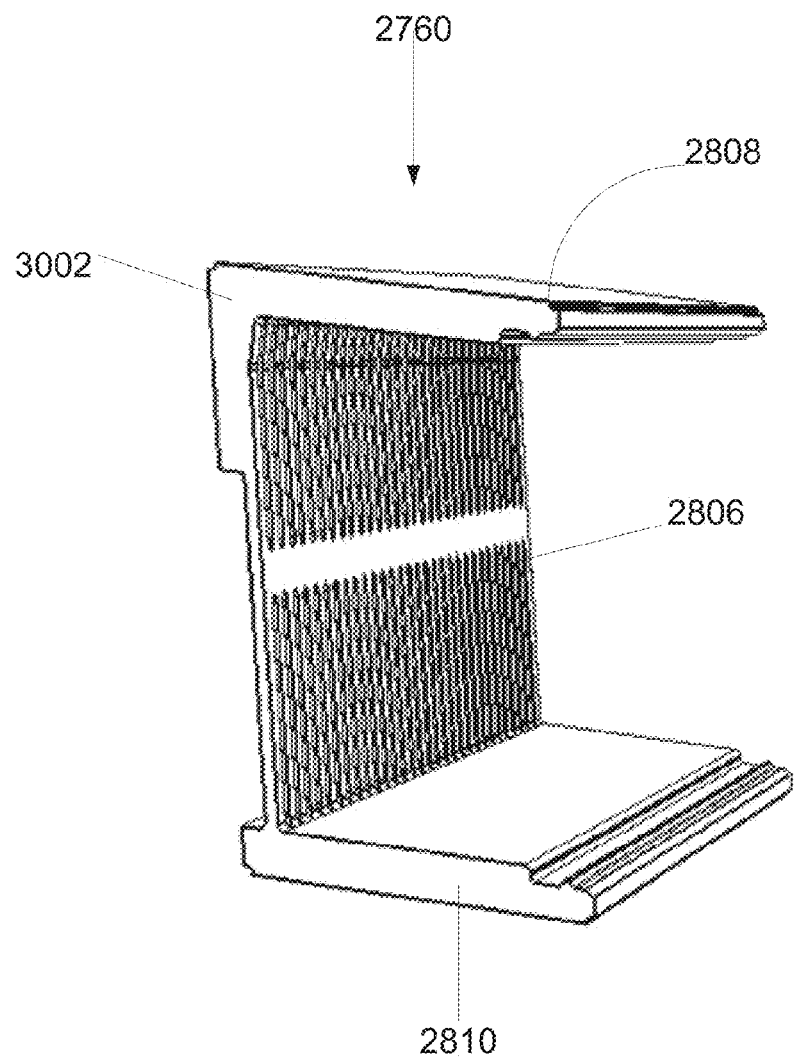
FIGS. 30A-30B are diagrammatic representations of another embodiment of a main shell.
Figure 30B:
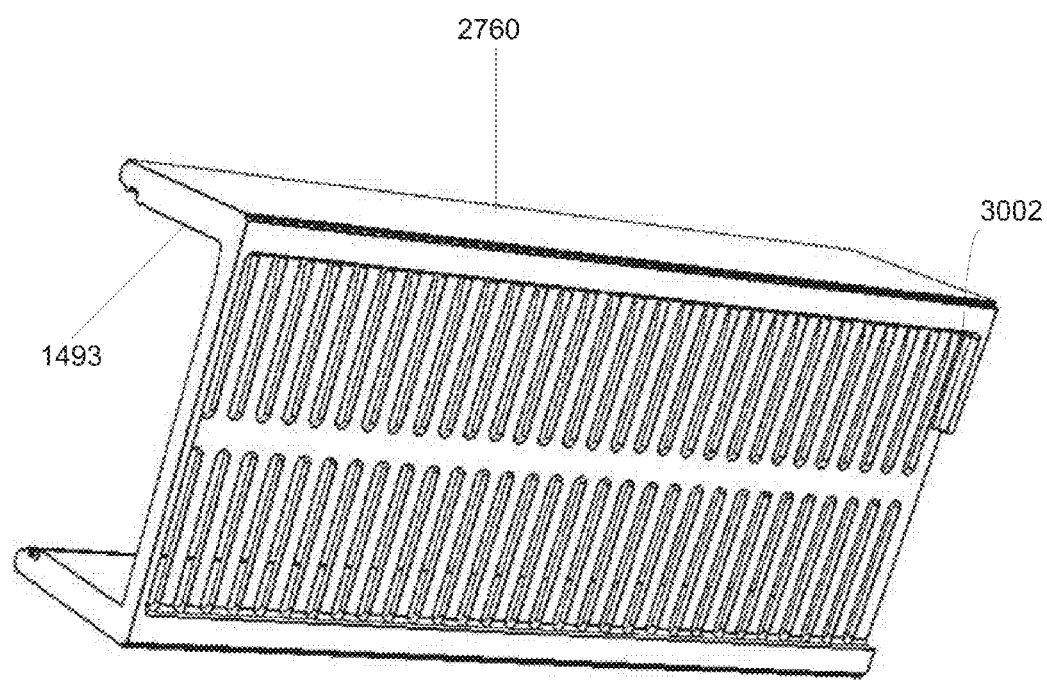

FIGS. 30A-B illustrate another embodiment of an integrated purifier element shell 2760 having media cover 2806 and sidewall portions 2810/2808. In this embodiment, the media cover 2806 is integrated with the sidewalls of the filter housing, but is separate from the end covers. Purifier element shell 2760 may define end surfaces 3002 and 1493 at the first end and second end of the purifier element shell 2760 to facilitate bonding or other coupling. The end surface 3002 may have a cutout on the side of end surface 3002 upstream of media cover 2806 so that end surface 3002 does not obstruct fluid from entering the media cavity.

Figure 31:
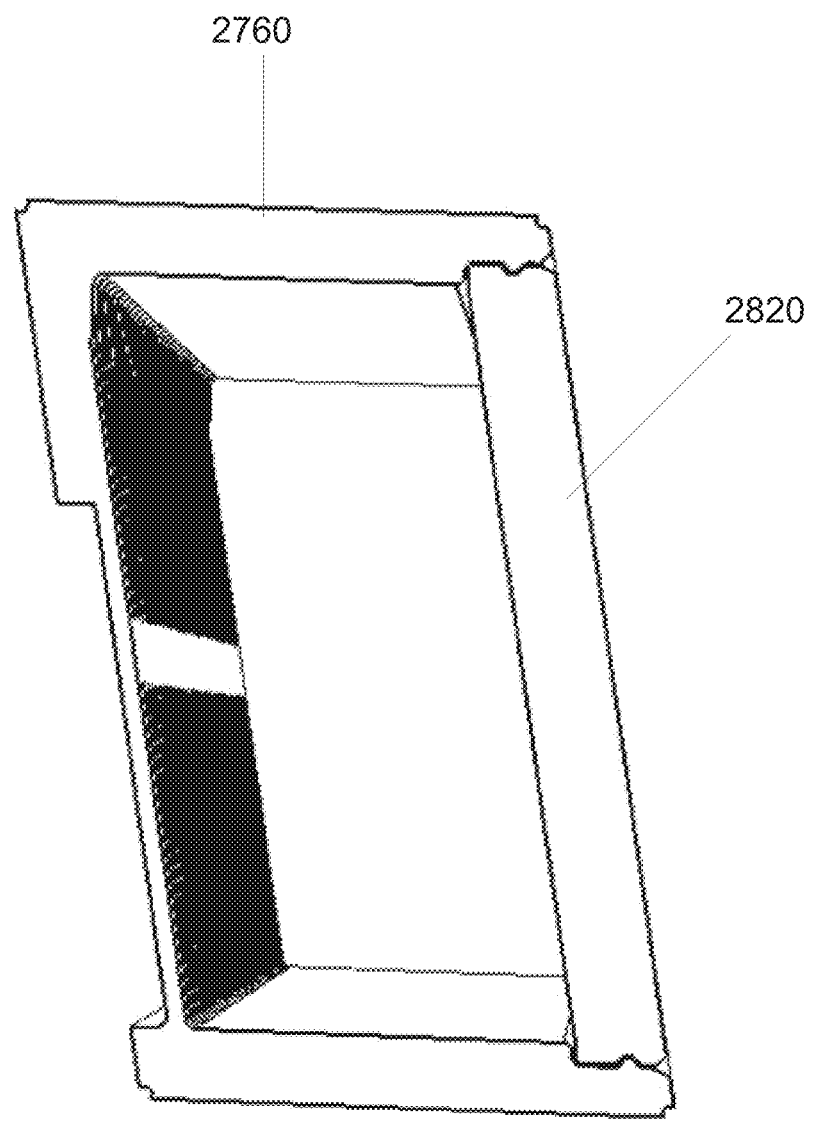
FIG. 31 is a diagrammatic representation of an embodiment of a main shell and media cover.
Figure 32:
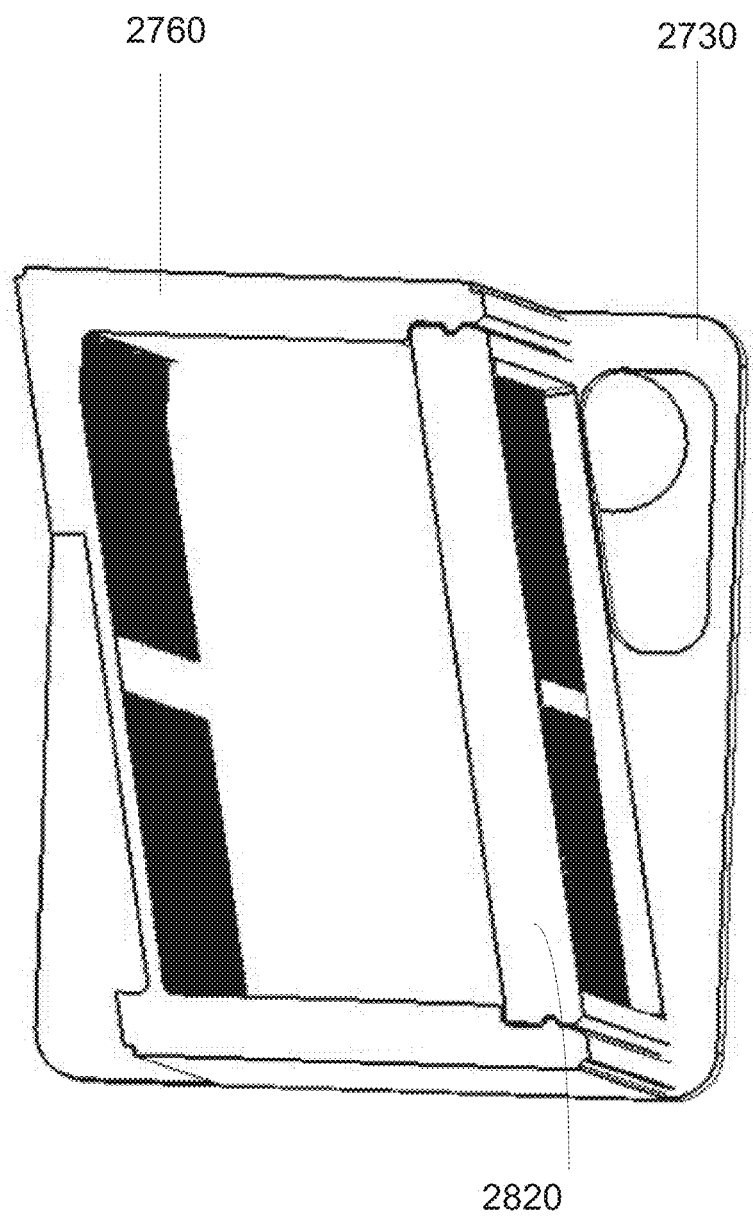
FIG. 32 is a diagrammatic representation of another view of an embodiment of a main shell and media cover.
Figure 33:
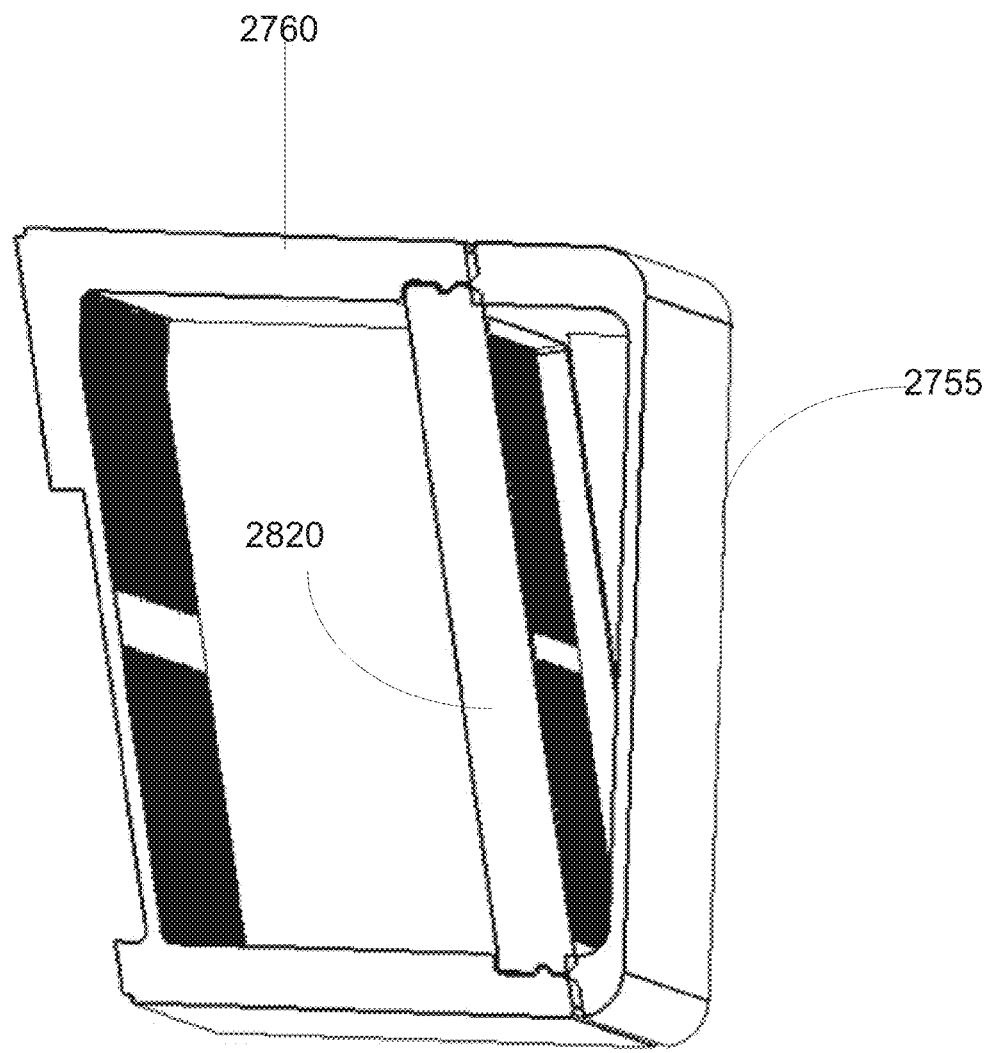
FIG. 33 is a diagrammatic representation of one embodiment of a main shell and media cover with a side cover.

FIGS. 31 and 32 are diagrammatic representations of one embodiment of integrated purifier element shell 2760 with media cover 2820 in place. According to one embodiment media cover 2820 may be snap fit to purifier element shell 2760 and may be further bonded. Media cover 2820 may be further bonded or otherwise coupled to end walls 2725 (of FIG. 29B) and 2730. FIG. 33 illustrates one embodiment of a filter assembly with second cover 2755 in place. An upper member of media cover 2820 may be bonded or otherwise coupled to a portion of the upper edge of second cover 2755 and a lower member of media cover 2820 may be bonded or otherwise coupled to the inner lower edge of second cover 2755 along the length of media cover 2820.

The embodiments of FIGS. 27-33, according to one embodiment, can be installed with the pleats running vertically. Filter inlet and outlet ports can be arranged such that the inlet flow path and outlet flow paths are parallel to the pleats of the purifier element arranged in purifier element holding area 2804. This vertical configuration provides better venting and draining characteristics and reduces the purifier cassette envelope. Furthermore, integrating the end walls and upstream media cover can reduce dead space at the ends of the pleat pack. The filter can also be run in a horizontal portion, preferably with the inlet at the low point of the housing and the vent and outlet at the high point of the housing.

Furthermore, integrated purifier element shell 2760 and media cover 2820 can provide tension members to provide structural support in a direction parallel to the pleat direction (to provide structural support to end wall 2725 and 2730 and in a direction perpendicular to the pleats (e.g., to walls 2710 and 2720).

FIGS. 34A-D are diagrammatic representations of another embodiment of a filter assembly 3400 arranged as a purifier cassette. Filter assembly 3400 may comprise a housing formed from one or more portions. According to one embodiment, filter assembly 3400 may be generally rectangular with a first wall 3402, a second wall 3404, a third wall 3406 opposite the first wall, a fourth wall 3408 opposite the second wall, a fifth wall 3410 and a sixth wall 3412 opposite the fifth wall. The various walls may be formed by one or more portions of filter assembly 3400. According to one embodiment, the outer walls of filter assembly 3400 may be relatively straight. Filter assembly 3400 may further comprise a filter inlet port 3420 at the first end and a filter outlet port 3422 and vent ports 3424 and 3426 at the second end. The vents may be otherwise placed. For example at least one vent may be open to the upstream side of the media cavity. An alternate vent position is illustrated, for example, at 3430. The inlet and outlet ports may include any suitable connectology. By way of example, but not limitation, the inlet and outlet ports may use Primelock® fittings.

According to one embodiment the walls of filter assembly 3400 can be formed by a first cover 3438, a second cover 3440 and an integrated purifier element shell 3442. The end walls 3410 and 3412 may be integrated with or be separate from integrated purifier element shell 3442. The integrated purifier element shell 3442 may integrate at least one media cover with the walls of the housing that act as a pressure vessel, including with the sidewalls and or end covers.

Figure 35:
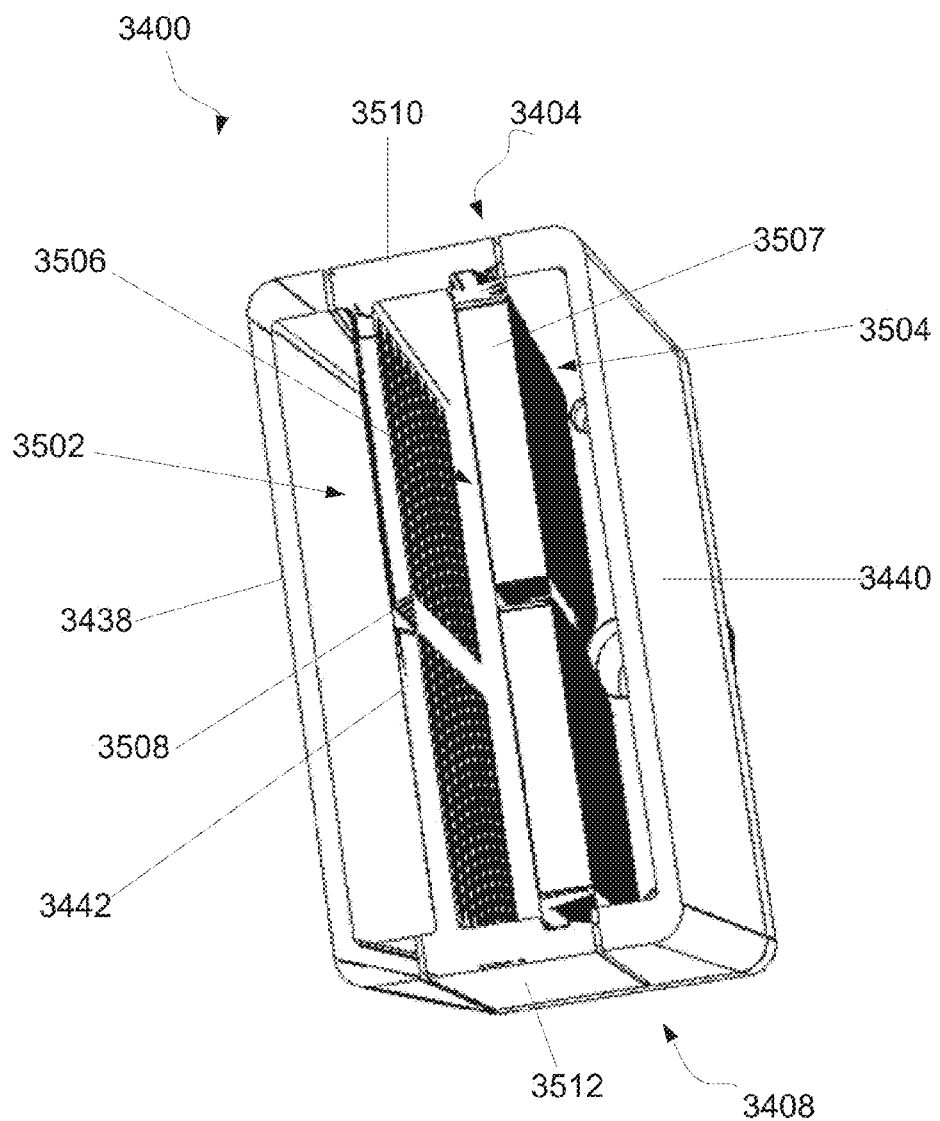
FIG. 35 is a diagrammatic representation of a cross-sectional view of one embodiment of a purifier cassette.

FIG. 35 is a diagrammatic representation of a cross section of one embodiment of filter assembly 3400. The housing defines a media cavity having an upstream portion 3502 and a downstream portion 3504 separated by a purifier element (not shown) disposed in purifier element holding area 3506. The purifier element, according to one embodiment, may comprise one or more rectangular pleat packs with the pleats parallel to the long axis of the filter assembly having a first set of pleat tips arranged generally in a plane and facing upstream portion 3502 and a second set of pleat tips arranged generally in a plane and facing downstream portion 3504.

According to one embodiment, integrated purifier element shell 3442 may include a first media cover 3508 (e.g., an upstream media cover) running the length of the media cavity, a first sidewall portion 3510 extending from the first media cover 3508 and forming a portion of sidewall 3404 and a second sidewall portion 3512 extending from first media cover 3508 and forming a portion of opposite sidewall 3408. A first inner edge and second inner edge of first cover 3438 may be joined to integrated purifier element shell 3442 and a first inner edge and second inner edge of second cover 3440 may be joined to the ends of first sidewall portion 3510 and second sidewall portion 3512 of integrated purifier element shell 3442 to form bonding seams that run parallel to the pleats the length of the sidewalls. The end edges of first cover 3438 and second cover 3440 may be bonded to the end walls to complete sealing of filter assembly 3400.

Purifier element holding area 3506 can be defined by a second media cover 3507 (e.g., a downstream media cover) running the length of the media cavity in cooperation with integrated purifier element shell 3442. The ends of first sidewall portion 3510 and second sidewall portion 3512 may include coupling portions to couple to second media cover 3507 using a snap fit as discussed above. A pleat pack membrane may be placed in 3506 and potted and covers 3438 and 3440 may be bonded to 3442 as described above.

According to one embodiment, the purifier element may be a pleat pack having pleat tips abutting upstream media cover 3508 and a set of pleat tips abutting downstream media cover 3507, the pleats running from the first end to a second end of the media cavity. The fluid can enter the media cavity in a direction parallel to the pleats (e.g., from the first end wall) and exit in a direction parallel to the pleats (e.g., from a second end wall).

Figure 36:
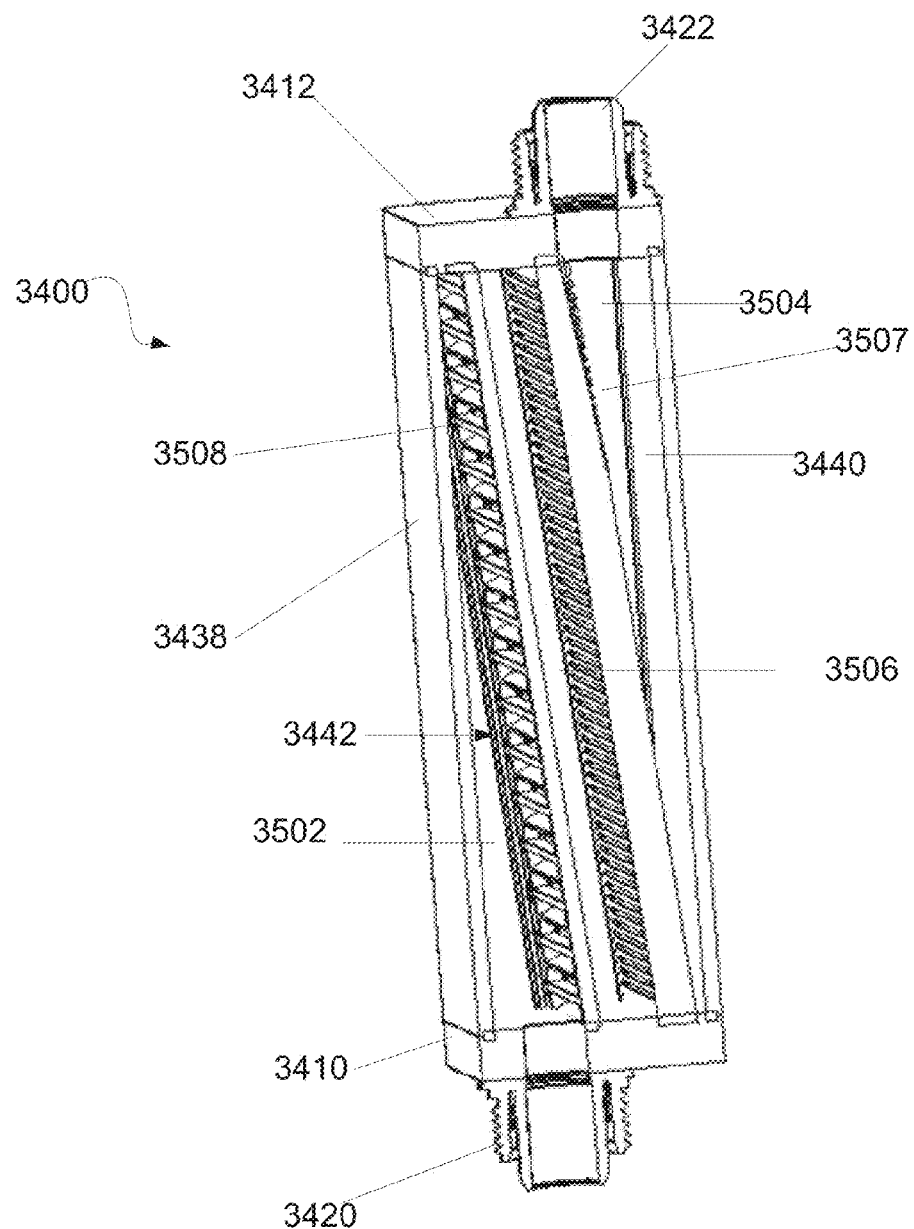
FIG. 36 is a diagrammatic representation of another view of one embodiment of a purifier cassette.

FIG. 36 illustrates another cross sectional view of one embodiment of filter assembly 3400. In the embodiment of FIG. 36, one or more pleated filters may be disposed in purifier element holding area 3506 with a first set of pleat tips facing upstream media cover 3508 and the second set of pleat tips facing downstream media cover 3507. The pleat pack(s) may be angled across the length of the media cavity such that the inlet and outlet fittings are in-line or closer to being in-line without having to re-direct the flow path for the fittings. In this example, there is a straight-line path from the inlet to the upstream set of pleat tips.

Figure 37:
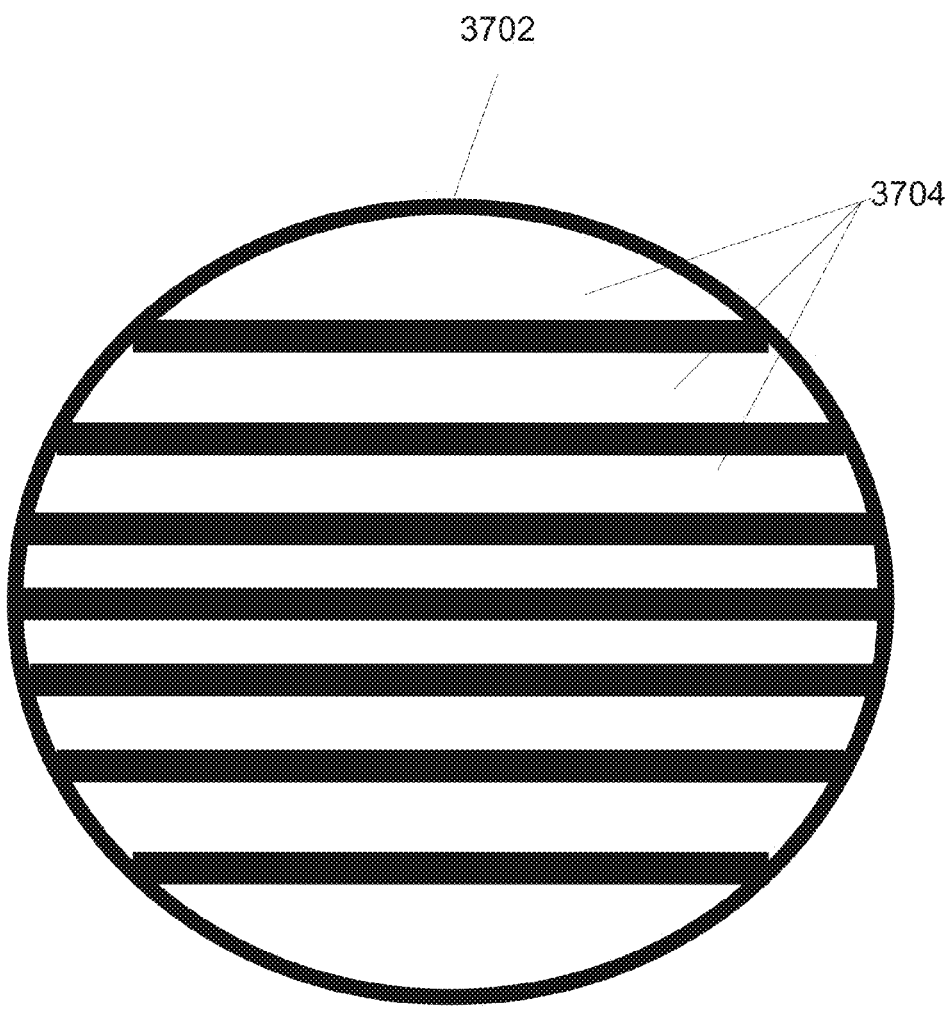
FIG. 37 is a diagrammatic representation of one embodiment of an inlet opening.

According to one embodiment, the filter grate openings and/or the inlet side surface of media cover 3508 can be designed such that the inlet fluid stream is re-directed through each grate opening in equivalent volumes. For example, the upstream media cover 3508 can be designed so that if the inlet fluid hole were broken into horizontal rectangular sections of equivalent area, each area section would each align with a corresponding opening in the inlet side media cover 3508. Turning briefly to FIG. 37, FIG. 37 illustrates one embodiment of an inlet hole 3702 to the media cavity broken into areas of equal area 3704. Each area of equal area can project to separate opening in upstream media cover 3508.

Returning to FIG. 36, as fluid enters the upstream cavity 3502 from the inlet port 3420, the fluid will tend to fan out. The grate size of upstream cover 3508 can be designed to accommodate this effect to ensure that the incoming fluid flow is captured at a uniform flow volume at each grate opening. The grate openings can be angled to redirect the flow perpendicularly through the pleat pack. The grate openings could also be angled to diffuse the force of the fluid flow that is driven into the filter housing by the smaller hydraulic diameter of the inlet port 3420. Geometry may also be incorporated in the grate openings to direct flow more uniformly to each of the exposed pleat tips within an exposed opening.

The distance of the media covers (and therefore the purifier element) from the upstream sidewall decreases from the first end wall 3410 to the second end wall 3412 and the distance of the media covers (and therefore the purifier element) from the downstream sidewall increases from the first end wall 3410 to the second end wall 3412. Thus, the hydraulic diameter decreases in the upstream cavity 3402 as the fluid moves away from the inlet port and the hydraulic diameter increases in the downstream cavity 3504 as fluid moves towards the outlet port 3422.

Figure 34A:
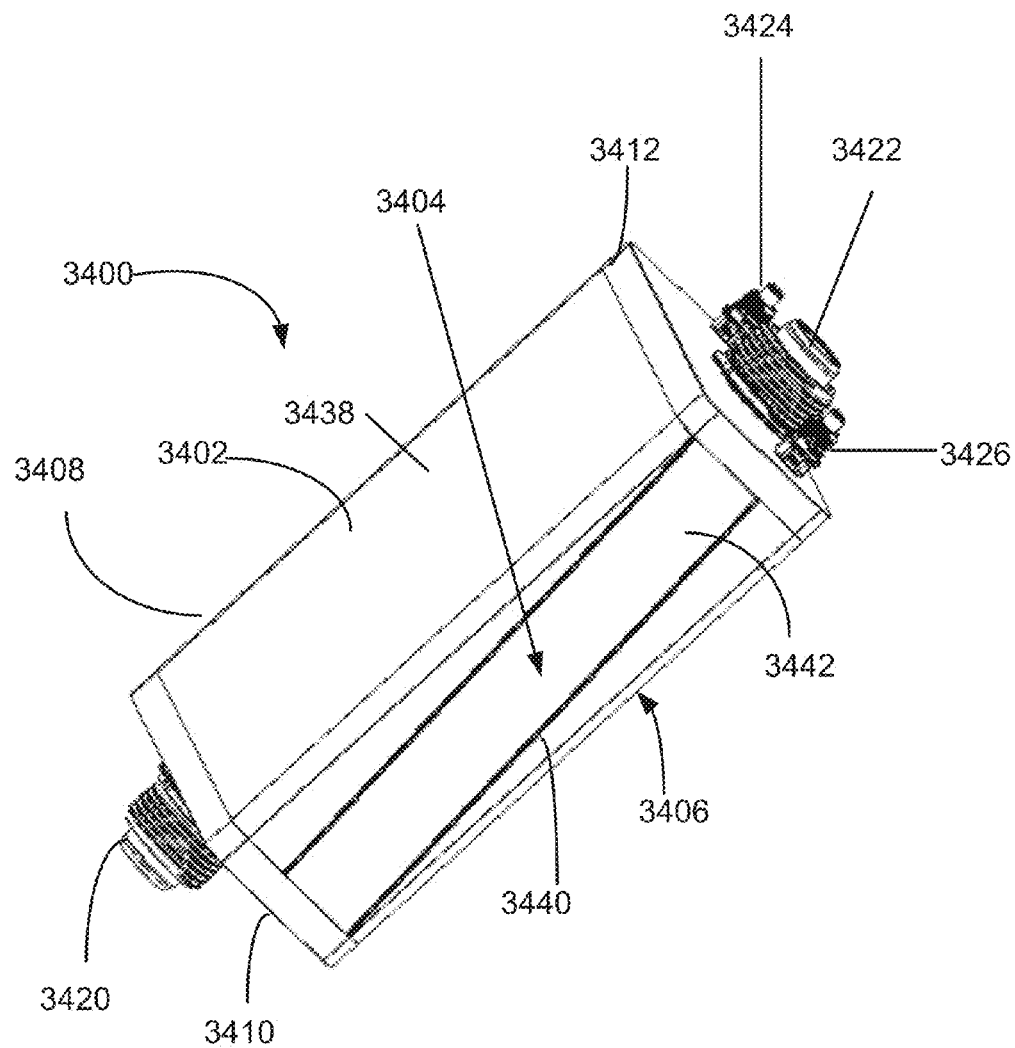
FIGS. 34A-34D are diagrammatic representations of views of one embodiment of a purifier cassette.
Figure 34B:
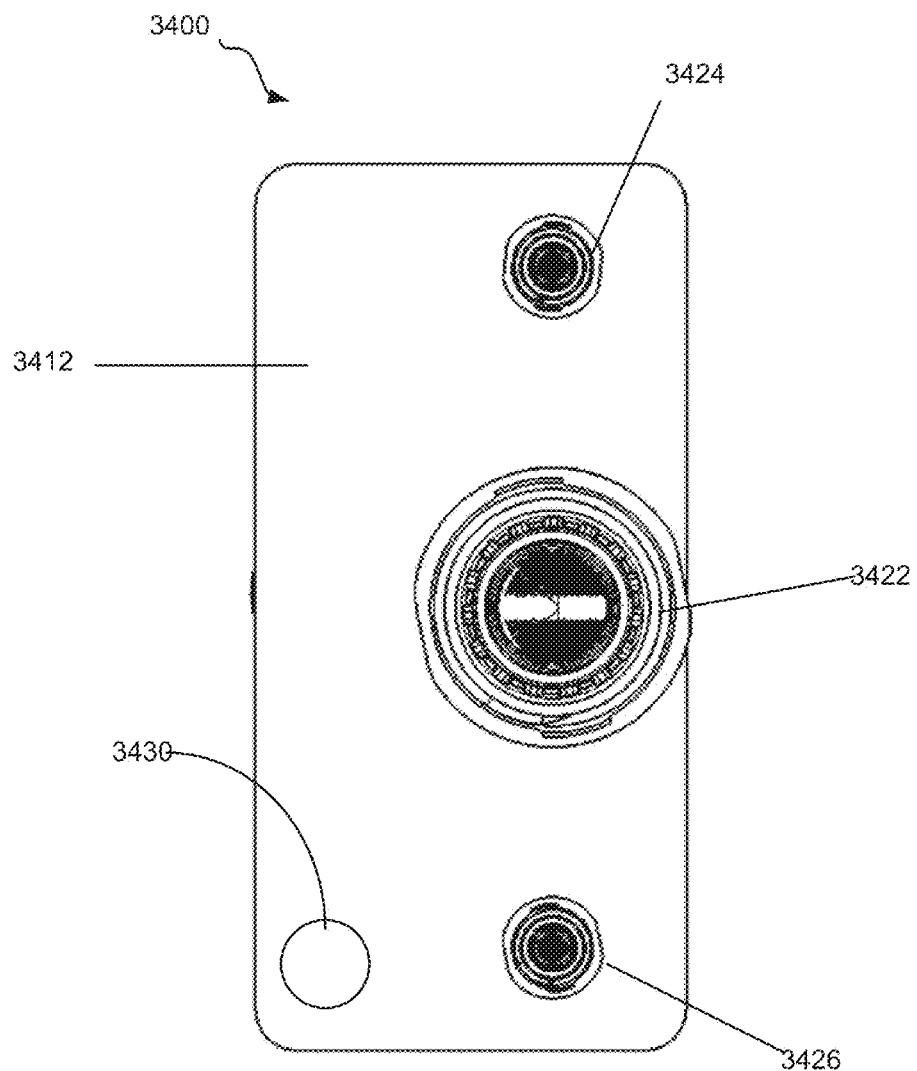
Figure 34C:
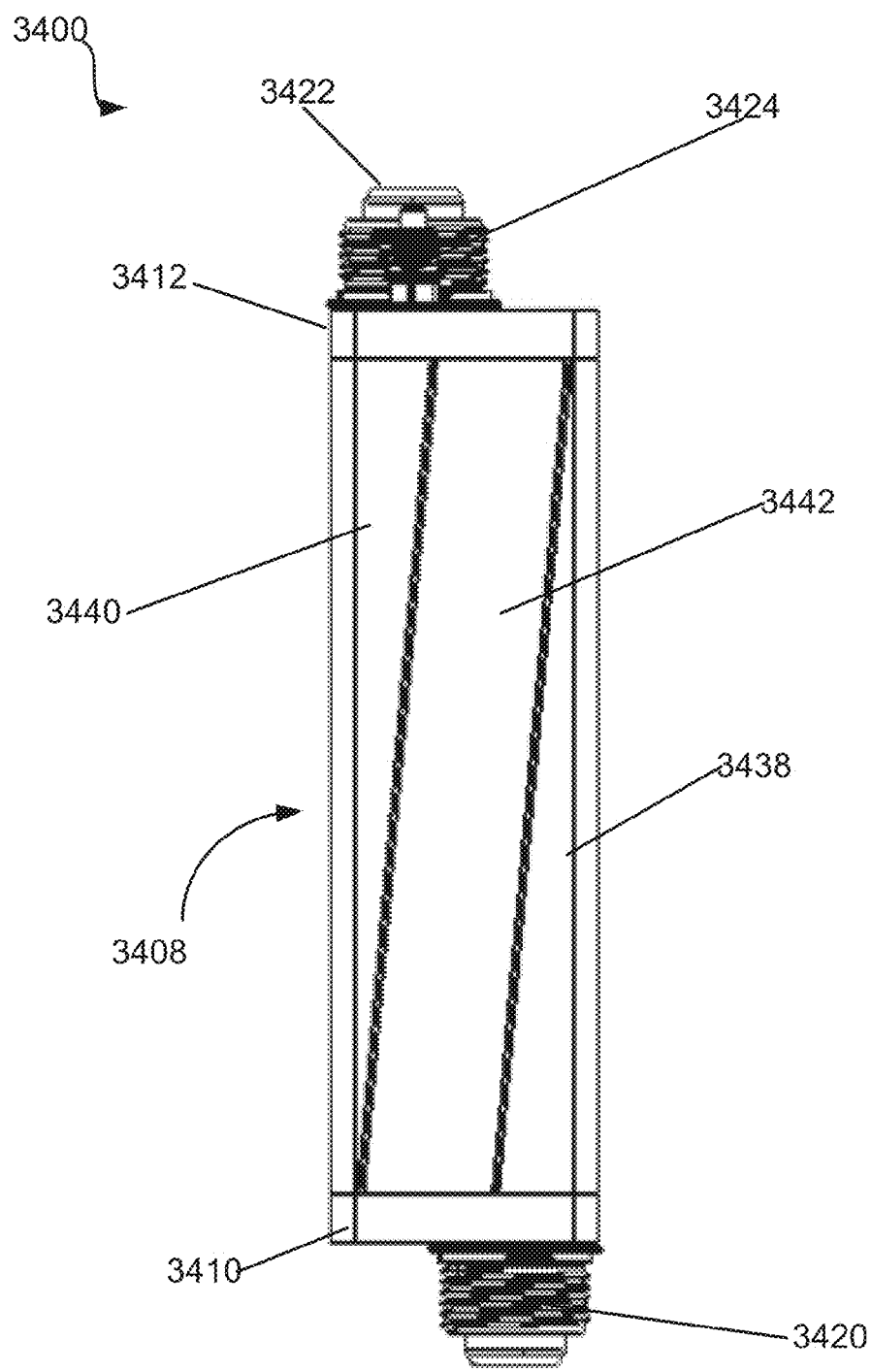
Figure 34D:
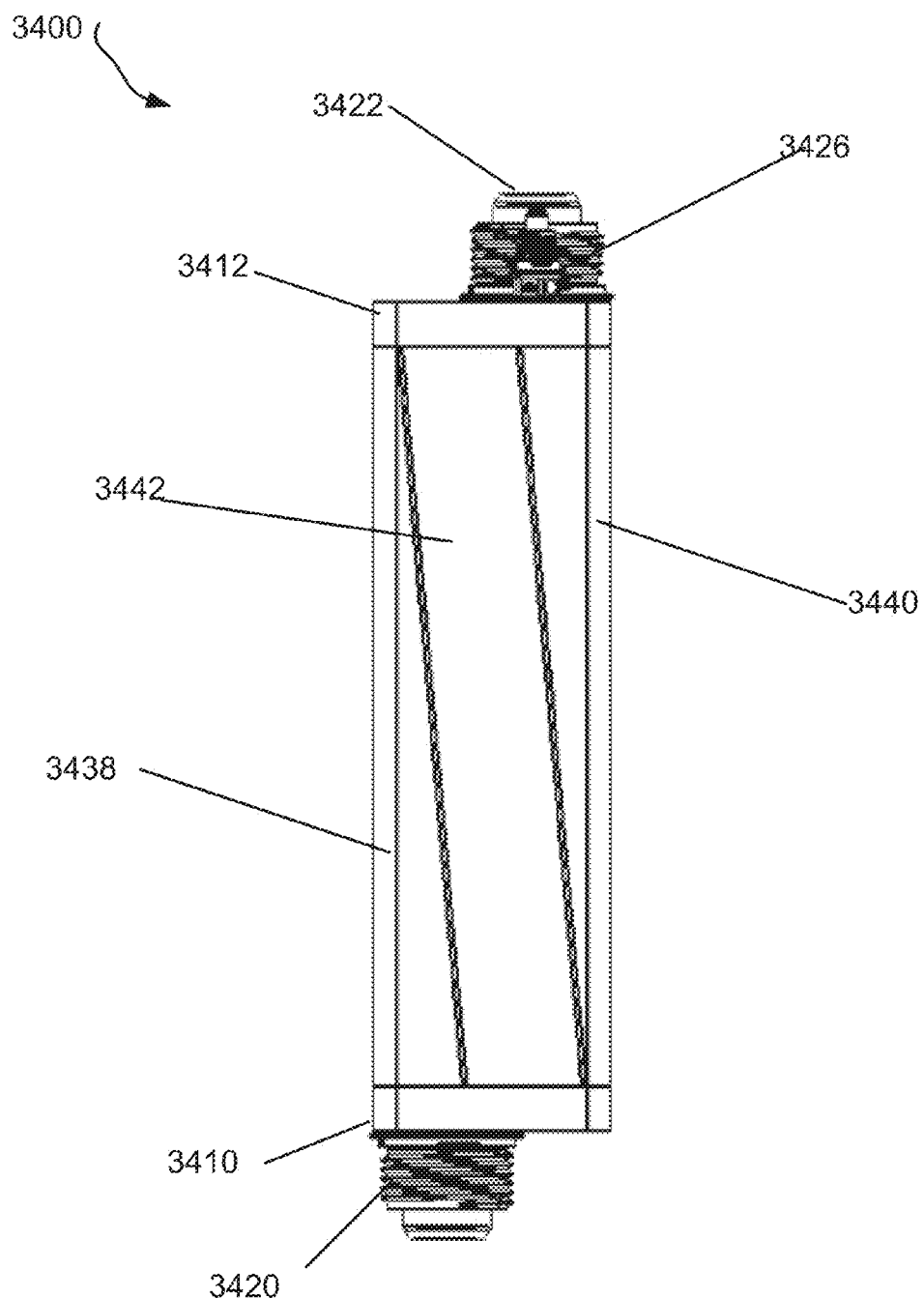

Furthermore, integrated purifier element shell 3442 and media cover 3507 can provide tension members to provide structural support in a direction parallel to the pleat direction (to provide structural support to end wall 3410 and 3412 and in a direction perpendicular to the pleats (e.g., to walls 3404 and 3408 of FIG. 34A).

Figure 38A:
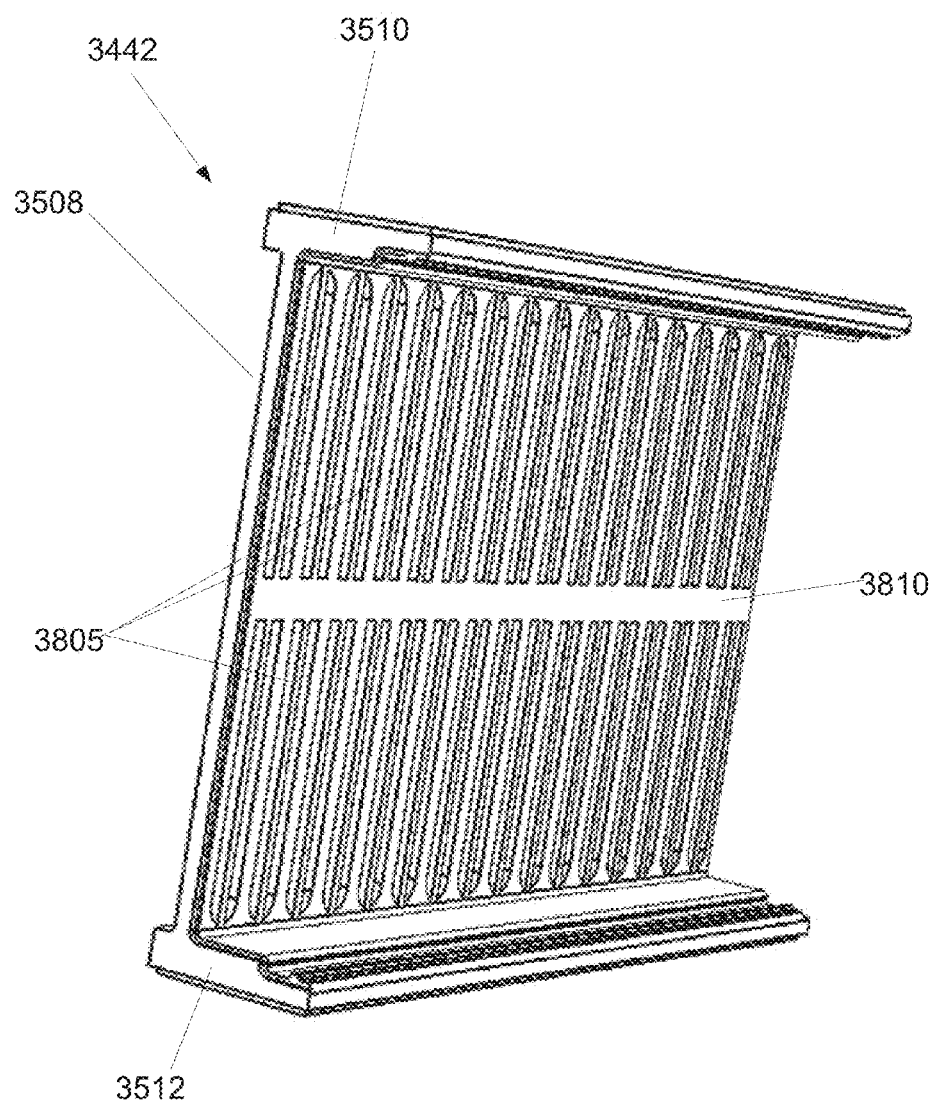
FIGS. 38A-38C are diagrammatic representations of one embodiment of a main shell.
Figure 38B:
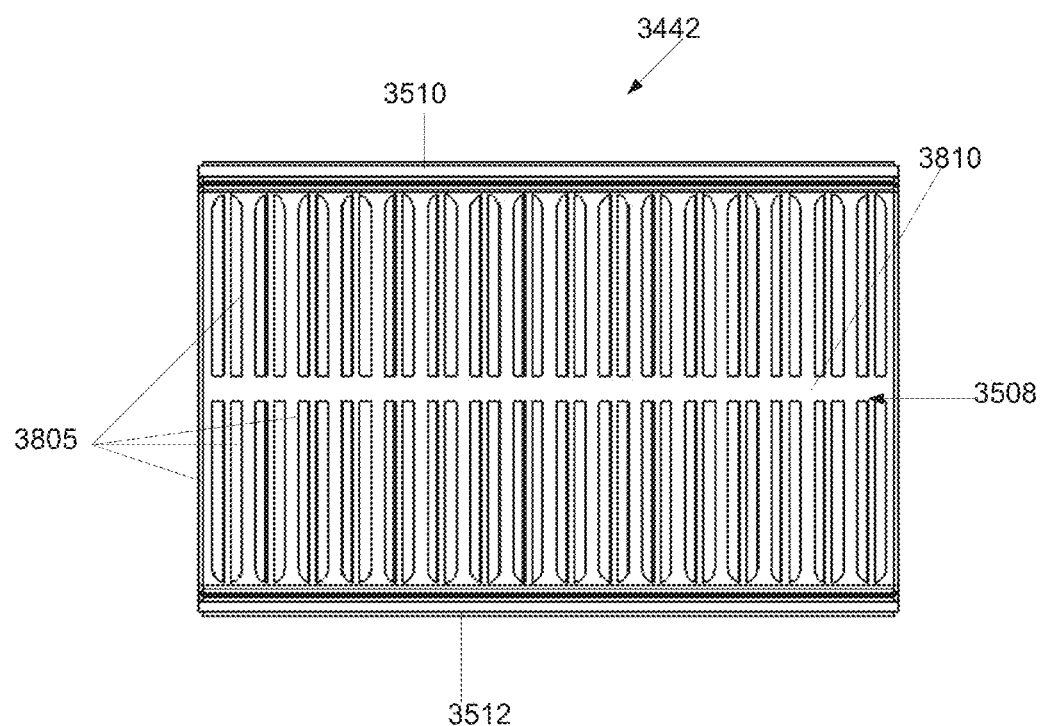
Figure 38C:
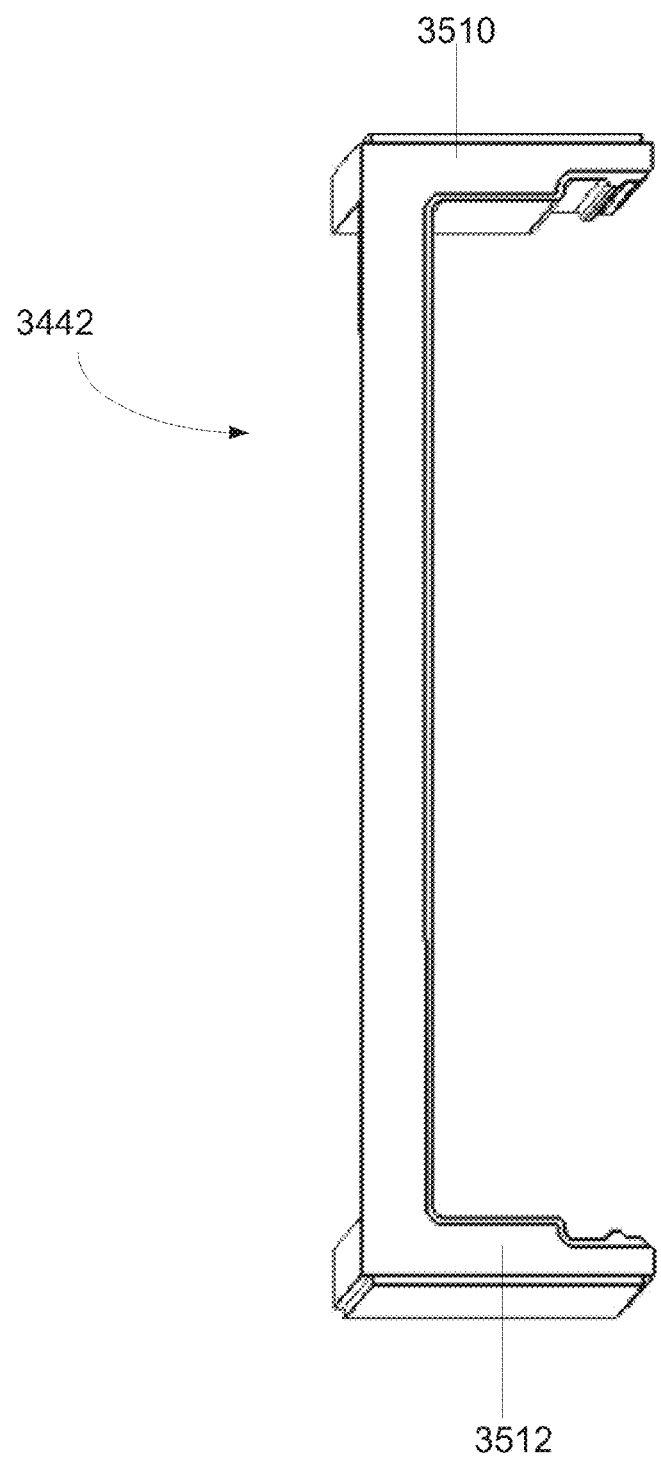

FIGS. 38A-38C are diagrammatic representations of one embodiment of integrated purifier element shell 3442. First media cover 3508 extends from a first end to a second end between spaced first sidewall portion 3510 and second sidewall portion 3512. First media cover 3508 may include spaced members 3805 running across first media cover 3508, thereby providing a grate for fluid flow through 3442. As discussed above, the spaced members 3805 may be designed to provide desired flow characteristics and to direct flow perpendicular to the pleat tips. Furthermore, the spaced members 3805 may be spaced so that the openings between the spaced members correspond to different sections of the inlet opening of equal area. A support 3810 may be included running from a first end to a second end of first media cover 3508 to provide support to the spaced members (and may serve as a tensile support for the housing).

Figure 39:
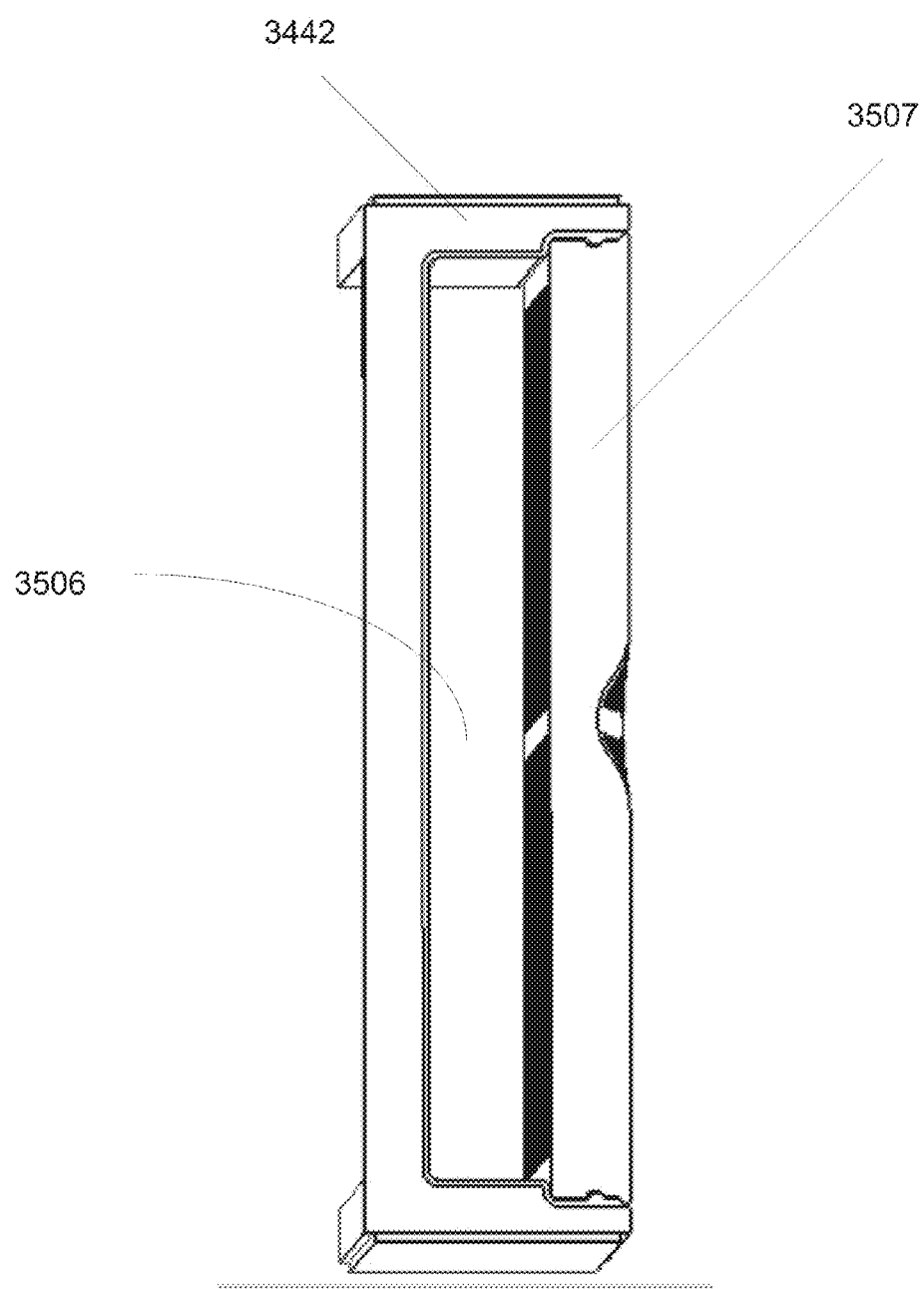
FIG. 39 is a diagrammatic representation of one embodiment of main shell and media cover.
Figure 40:
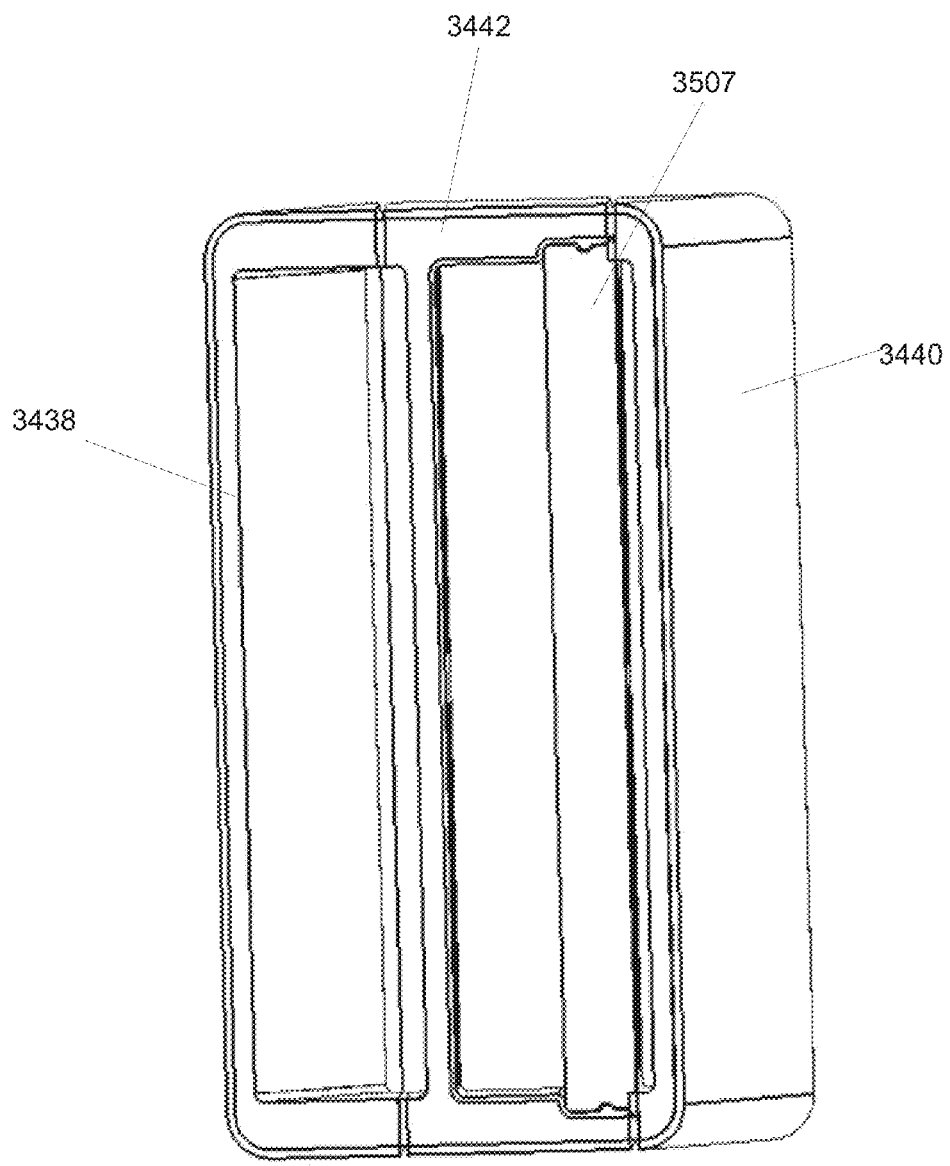
FIG. 40 is a diagrammatic representation of one embodiment of a main shell, media cover and side covers.

FIG. 39 is a diagrammatic representation of one embodiment of integrated purifier element shell 3442 with media cover 3507 in place defining purifier element holding area 3506 (membrane pleat pack not shown). The purifier element holding area 3506 may have a substantially rectangular end profile. According to one embodiment media cover 3507 may be snap fit to purifier element shell 3442 and may also be further bonded. The upper and lower membrane flaps of the purifier element may be captured between media cover 3507 and integrated filter shell 3442. Media cover 3507 may be further bonded or otherwise coupled to the end walls. FIG. 40 illustrates one embodiment of a filter assembly with covers 3438 and 3440 in place. An upper member of media cover 3507 may be bonded or otherwise coupled to a portion of the upper edge of cover 3440 and a lower member of media cover 3507 may be bonded or otherwise coupled to the inner lower edge of cover 3440 along the length of media cover 3507.

In the embodiments of FIGS. 27-40, a pleat pack or other may be placed in the integrated filter shell and the second media cover coupled to the integrated filter shell. The last flaps of the membrane may be captured between the integrated filter shell and second cover. The second cover may also be bonded to the integrated filter shell. The remaining portions of the housing may be coupled to the integrated filter shell through a bonding operation or other coupling operation. The pleat pack may or may not be potted. Other purification media or media to facilitate other processes (such as heat exchange) as described herein may be placed in the integrated filter shell.

Embodiments of purifier cassettes can be made from a variety of materials including but not limited to oleophilic resins, perfluorinated resin, (such as, but not limited to, polytetrafluoroethylene (PTFE), fluorinated ethylene propylene (FEP), perfluoroalkoxy polymer (PFA)), polyvinylidene fluoride (PVDF), polyimide, polyetherimide, polycarbonate, polypropylene (PE), polyethylene (PE), polyether ether ketone (PEEK), metals or other materials. According to one embodiment, outer layers may be formed of a relatively inexpensive polymer while the inner layer can comprise a more expensive polymer that is less likely to react with or contaminate the process fluid. For example, components may comprise an outer shell formed of polypropylene or other material that can withstand temperature and pressure requirements of an application. Inside the outer shell, an inner layer of typically more expensive, more chemically resistant, higher purity material can be thermoformed and attached to outer layers. In another embodiment, an inner layer of desired material can be over molded over the inside of the outer layers. The entire wetted surface of the filter can be the more chemically resistant, higher purity polymer, such as PTFE, FEP, PFA or other material.

Internal components, such as lane covers discussed below, can be made from a variety of materials including but not limited to oleophilic resins, perfluorinated resin, (such as, but not limited to PTFE, FEP, PFA, PVDF, polyimide, polyetherimide, polycarbonate, PP, PE PEEK, metals or other materials. In one embodiment, the lane covers can be formed of multiple layers. The core can comprise a relatively inexpensive first polymer (e.g., polypropylene) while any layers that contact fluid can comprise a more chemically resistant, higher purity second polymer that is less likely to react with or contaminate the process fluid. According to one embodiment, the second polymer can be over molded on the first polymer. For example, the melting temperature of PET is lower than PFA and of a PTFE membrane. According to one embodiment, therefore, one or more portions of a filter assembly having PFA and PTFE components may be overmolded or potted with PET.

Purifier cassettes may be configured to provide normal flow filtration (NFF), in which fluid is convected directly toward the filter membrane under applied pressure. Particles that are too large to pass through the pores of the membrane accumulate at the membrane surface or in the depth of the filtration media, while small molecules pass through the membrane pores to the downstream side. According to one embodiment, the purifier cassettes can be selected to remove micron and/or submicron particles (e.g., particles of 100 nanometer or less). Multiple filters may be applied in series in a single filtration system unit to successively remove smaller particles or different types of particles. The finest filter can be placed last in series so that larger particles are filtered out prior to reaching the last filter. This can reduce wear on the finest, typically most expensive, filter. In other embodiments, the cassettes may be configured for cross-flow filtration, for example but not limited tangential flow filtration or gas contacting.

In one embodiment, the purifier cassettes use non-circular pleated purifier elements. For example, one embodiment may include one more rectangular pleated filters with a first set of pleat tips facing the upstream portion of the media cavity and a second set of pleat tips facing the downstream portion of the media cavity. The first set of pleat tips may be generally arranged in a first plane and the second set of pleat tips may be generally arranged in a second plane. The purifier element may provide a generally planer rectangular entrance interface and a generally planer rectangular exit interface. In the case of porous polymeric membranes, the use of rectangular pleat packs can provide significant additional filtration area in the same footprint as traditional semiconductor liquid filters. The pleats of the filter can be formed from a single membrane or multiple membranes formed from the same or different materials. Additionally, polymeric netting materials and other materials may be pleated with the membrane. A membrane may be used that allows lateral flow in the membrane (flow parallel to the pleats).

Splitting a pleat pack into multiple lanes separated by tensile members offers an improvement in strength allowing a smaller cassette to be utilized. In some cases, a relatively thin walled cassette may be used. According to one embodiment, a PFA cassette can be formed in which the thickness of the housing is such that the fluid is less than 5 millimeters and, in some cases, less than 4 millimeters from the external surface on four sides of the device. Such a cassette may provide comparable filtration, flow rates and pressure drops to cylindrical filters in a reduced footprint and with less material. For example, a cassette with a PFA main body can be formed that has 3 $m^2$ membrane that achieves the same filtration, flow rates and pressure losses as a comparable cylindrical filter with a 3 $m^2$ membrane, but in a smaller volume and taking less than half the width. Thus, embodiments of purifier cassettes can be configured to reduce footprint and maintenance space needs. It can be noted that the 3 $m^2$ membrane and other dimensions are provided as an example and cassettes may be formed to include any suitable membrane area and may include other types of filter media. Moreover, purifier cassettes can be formed from a variety of materials and used in other purification applications or other applications.

In addition to providing a reduced size, purifier cassettes can provide reduced complexity. According to one embodiment, a purifier cassette can be formed using a minimum number of unique parts, reducing manufacturing complexity and cost. In some embodiments, these parts may include a main shell, side covers, lane covers and end caps. In other embodiments, however, the purifier cassette may be formed from any number of parts.

Furthermore, purifier cassettes can improve draining and venting compared to cylindrical filters and lower housing surface area and dead volume for improved performance and cleanliness. Embodiments described herein may also promote advanced filtration applications by facilitating individual, parallel and serial filtration. Embodiments described herein may also be more easily manipulated by robots, facilitating automation of filter changing and maintenance.

As can be understood from the foregoing, purifier cassettes may have a variety of configurations. The skilled artisan would understand that features shown in the various figures may be combined and that features shown in one embodiment may be used with other embodiments. Furthermore, while certain components may be shown as integral or separate, the components may be otherwise arranged. Thus, while sidewall 234, sidewall 236, second lane covers 239 and tension members are depicted as integrated into a main shell 234 they may be separate components. For example, second lane covers 239 may be separate covers and tension members 238 may be integrated with one of the side covers. Furthermore, it would be understood that other arrangements are considered, such as ports integrated with a main body or other configurations. Moreover, while described primarily in terms of filtration, cassettes may provide a compact pressure vessel for any suitable purification application or other application, including, for example, as a dummy cassette, a pressurized mixer, a heat exchanger, or other application.

A cassette may engage with a supply system using any suitable connection. For example, a purifier cassette may be connected using O-ring-less fittings and fitting assemblies as described in U.S. Pat. No. 7,547,049 entitled "O-Ring-Less Low Profile Fittings and Fitting Assemblies" by Gashgaee et al., issued Jun. 16, 2009, which is hereby fully incorporated by reference herein, or other connection mechanism. In other embodiments, the filters may use a connection mechanism such that ports can connect through rotation such as described in U.S. Pat. No. 6,378,907, entitled "Connector Apparatus and System Including Connector Apparatus" issued Apr. 30, 2002, U.S. Pat. No. 7,021,667, entitled "Connector Apparatus and System Including Connector Apparatus" issued Apr. 4, 2006, U.S. Pat. No. 7,296,582, entitled "Method and System for Purging a Dispensed Fluid Within a Fluid Dispensing System Including a Filter-Free Connector Apparatus," issued Nov. 20, 2007, U.S. Pat. No. 7,350,821, entitled "Method and System for Purging a Dispensed Fluid with a Fluid Dispensing System Including A Filter-Free Connector Apparatus," issued Apr. 1, 2008, U.S. Pat. No. 7,037,424 entitled "Connector Apparatus and System Including Connector Apparatus," issued May 2, 2006, each of which is hereby fully incorporated by reference herein. Additionally, the purifier cassette ports may connect using any other suitable connections known or developed in the art including, but not limited to Flare-Mount™, Pillar 5300, Super Pillar, Flaretek, PrimeLock®, Galtek, Swagelok connections.

FIGS. 41 and 42 are diagrammatic representations of one embodiment of an example connection system 4200. Connection system 4200 comprises a connection housing 4202 defining a nut receiving area, a connection nut 4210 disposed in the nut receiving area, a first fitting 4212, at least partially received by the nut, and a second fitting 4214. First fitting 4212 provides a fluid flow passage open to the end of first fitting 4212 proximate to connection nut 4210 and second fitting 4214 provides a fluid flow passage open to an end of second fitting 4214 proximate to connection nut 4210. First fitting 4212 and second fitting 4214 can be configured to mate or abut so that the flow passages may be connected to form a continuous flow passage. Preferably, the fittings are complementary fittings that are configured to form a seal under axial force, such as a Primelock® fitting, Flare-Mount™ fitting or other fitting known or developed in the art. While fitting 4212 is illustrated as a female fitting and fitting 4214 as a male fitting, in other embodiments, fitting 4212 can be a male fitting and fitting 4214 a female fitting. One of the fittings can be part of an end cap of a cassette (e.g., as shown in FIG. 1A).

Connection nut 4210 comprises an opening extending from a first side 4215 to a second side 4216 along a primary axis of connection nut 4210. The nut encircles the end portion of one of the fittings and is rotatable about the fitting coaxially with the flow passage. The opening through the nut can have areas of different diameter including an area of smaller diameter 4220 and an area of greater diameter 4222. According to one embodiment, the opening of the nut has a narrower diameter at a first end of the opening through connection nut 4210 and a greater diameter at the second end of the opening through connection nut 4210 (forming a stepped shoulder).

According to one embodiment, one of the fittings can be shaped so that a first portion of the fitting passes through the area of narrower diameter while a second portion has a larger diameter (or other shaped footprint) than the area of narrower diameter. As depicted, for example, the end portion of first fitting 4212 has a first section 4230 that passes through the left end of the nut and a second section 4232 that is too large to pass through the narrower diameter area 4220. In this embodiment, the connection nut 4210 and first fitting form complementary radial shoulders 4240 that are shaped and positioned to abut during use (e.g, an internal shoulder of connection nut 4210 abuts an external shoulder of fitting 4212). Second fitting 4214 may include an end portion 4242 that is received through the second end of the nut opening. The received portion of second fitting 4214 may include outer threads 4244.

A set of connection nut inner threads 4246 are disposed proximate to the second end of connection nut 4210 and can be designed to engage the port fitting external threads 4244. Connection nut 4210 may also include outer threads 4250 disposed on at least a portion the outer side of connection nut 4210 that engage housing threads 4252 disposed on the inside of housing 4202.

In operation, the ends of first fitting 4212 and second fitting 4214 can be brought together. When the end portion of second fitting 4214 is at the appropriate location, connection nut 4210 can be rotated to engage the nut inner threads 4246 with the fitting outer threads 4244. The force on the fitting outer threads 4244 and on the shoulder 4240 of the fitting 4212 presses first fitting 4212 and second fitting 4214 together to create a seal (as shown in FIG. 42).

Connection system 4200 can be used to help maintain seals, particularly for fittings where seals are formed or promoted by axial force. According to one embodiment, nut inner threads 4246 can engage fitting outer threads 4244 360 degrees around the fitting without requiring connection nut 4210 to rotate 360 degrees to create the 360 degree engagement. To this end, nut inner threads 4246 and fitting outer threads 4244 can be multi-start threads, such as double start threads, triple start threads, etc. A double start, triple start or other multi-start thread can provide 360-degree axial loading around the full seal connection with roughly a half-of-a-rotation or less. Nut inner threads 4246 and fitting outer threads 4244 can be threads that accept high axial loads. The threads may include various standard thread profiles including, but not limited to 1-12 UNF threads, buttress threads, acme threads or other threads. Additionally, custom or proprietary threads may be used.

In one embodiment, nut inner threads 4246 and fitting outer threads 4244 can be double start threads with each thread start offset by approximately 180 degrees and the threads running at least 180 degrees from each start. In this case, the connection nut 4210 can be rotated to engage the double start threads. Rotating the nut 180 degrees will cause the double start threads to engage 360 degrees around the outer fitting. More particularly, using the start of a first thread as the reference, the first thread of nut inner threads 4246 starting from the first start may contact the fitting outer threads 4244 from 0-180 degrees and a second thread of nut inner threads 4246 starting from a second start may contact the fitting outer threads 4244 from 180-360 degrees such that there is an axial force on fitting 4214 360 degrees around the fitting. While the example of 180 degrees is used, double start threads of other lengths may be used.

Using the example of triple start threads, each start can be offset by approximately 120 degrees and the threads can run approximately 135 degrees from each start. In this case, rotating connection nut 4210 about 135 degrees will create 360 degrees of engagement. In this example, a first thread of nut inner threads 4246 starting at a first start can contact fitting outer threads 4244 from 0-135 degrees, a second thread of nut inner threads 4246 starting from a second start may contact the fitting outer threads 4244 from 120 degrees to 255 degrees and a third thread starting from a third thread may contact fitting outer threads 4244 from 240 degrees to 15 degrees, such that there is an axial force on fitting 4214 360 degrees around the fitting. While the example of 135 degrees is used, triple start threads of other lengths can be used.

Thus, multi-start thread configurations can be used to provide 360-degree axial loading around the full seal connection with less than 360 degrees, and in some cases less than 180 degrees of rotation of connection nut 4210. In other embodiments, the axial loading may be less than 360 degrees but sufficient to create a seal. For example, small gaps may exist in the loading profile provided the seal can still hold with the gaps (e.g., where there is an angular range where there is no thread engagement). One of ordinary skill in the art would understand that the thread examples provided are provided by way of example and other configurations of multi-start threads may be used.

Connection system 4200 may include a counter rotation prevention feature to create a sufficient force so that the connection nut 4210 will not counter rotate (rotate to release the seal) under axial loading. According to one embodiment, the counter rotation prevention feature may be a friction fit. The friction fit may be provided by friction between inner housing threads 4252 and outer nut threads 4250. Outer nut threads 4250 and inner housing threads 4252 can be finer threads selected to create sufficient surface area contact between the threads so that there is an effective amount of friction between connection nut 4210 and connection housing 4202 to prevent connection nut 4210 from counter rotating under expected axial loading, including cyclical axial loading. However, the effective amount of friction may be low enough that connection nut 4210 can counter rotate when sufficient external rotational force is placed on connection nut 4210, thereby allowing the fittings to be disengaged. In this case, outer nut threads 4250 hold the position of connection nut 4210 and inner nut threads 4246 bear the axial load. The counter rotation prevention threads may include any standard thread including Unified screw threads or custom thread that provides sufficient friction. Other thread designs may also be used, including, but not limited to, buttress threads. According to one embodiment, nut outer threads 4250 and housing inner threads 4252 are single start threads.

A locking mechanism (e.g., such as detents and/or indents on the rotating member of fitting, snap fits or other features) may also be provided to prevent nut 4250 from counter rotating unexpectedly. In some cases, the locking mechanism may be used in addition to or in lieu of higher friction outer nut threads 4250 (while still using outer nut threads or not using outer nut threads at all) to prevent backing out of the nut. In some embodiments, connection nut 4210 does not have external threads and nut 4210 is held in position axially by an alternate retaining mechanism.

A connection system may include features to hold the nut to a required angular range (e.g., such as stops on the threads) to prevent rotation of the nut past a certain point. In particular, rotation of the nut may be limited to a range between a first angular position and a second angular position, where the first angular position corresponds to full engagement and a second angular position corresponds to full disengagement. In the second angular position, the starts of the inner threads will be in a known position helping ensure proper alignment of the nut inner threads and fitting outer threads.

A connection system can be adapted to different port sizes. The internal and external threads can change based on the port size, axial travel requirements, load requirements and seal performance requirements. Components can be made from a variety of materials including polymeric materials, such as but not limited to oleophilic resins, perfluorinated resin, (such as, but not limited to, PTFE, FEP), PFA, PVDF, polyimide, polyetherimide, polycarbonate, PP, PE, PEEK, metals or other materials. According to one embodiment, the connection system can be formed primarily of PFA to provide a true ultra-clean PFA, quick connect seal connection for the semiconductor industry.

The connection system may be used in a variety of applications, including with stand-alone fittings, straight union fittings, elbow fittings or other fittings and may be integrated into other devices. While the fittings illustrated above feature a FlareMount™ seal mechanism, other styles of fittings may be used. The fittings may be Purebond welded to pipe or tubing or molded with a tubing connection at one or both ends. The fittings may also be inserted into flared ends of tubing. One of the fittings may also be welded onto or molded into a filter housing (e.g., a Chemline or Chemlock® filter housing or other filter housing, for example). The connection system may also be used to make a tube seal style connections instead.

Figure 43:
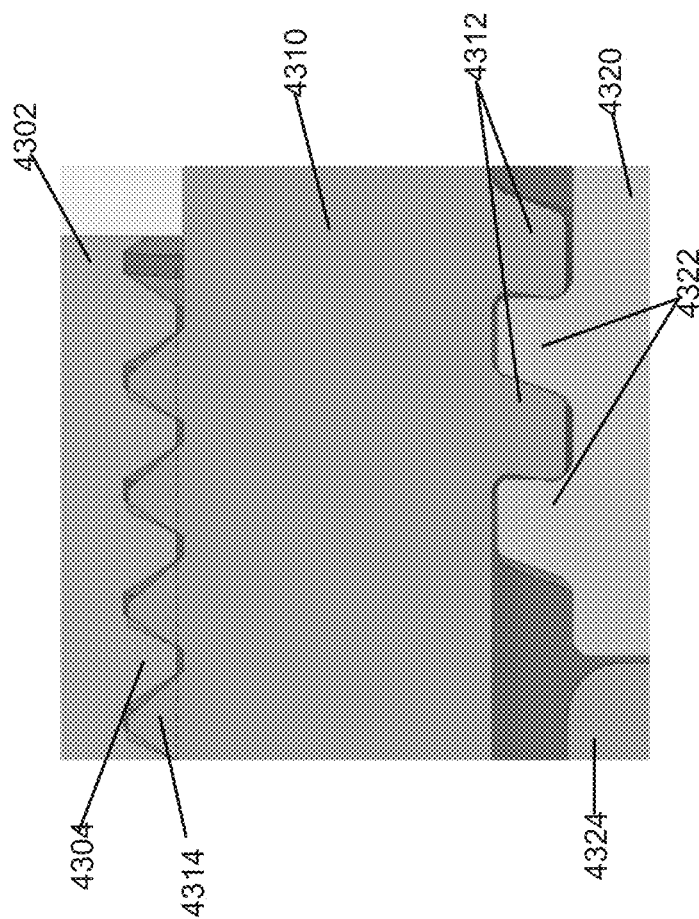
FIG. 43 is a diagrammatic representation of another embodiment of a connection system.

FIG. 43 is a diagrammatic representation of one embodiment of a connection system using a modified thread design. The portion of the connection system illustrated comprises a connection housing 4302 having inner connection housing threads 4304, a connection nut 4310 having inner nut threads 4312 and outer nut threads 4314 and a fluid fitting 4320 having an exterior thread 4322. A portion of another fitting 4324 is also illustrated.

Nut inner threads 4312 and fitting outer threads 4322 can be modified buttress threads. An American Standard buttress thread has a load flank angle of 7 degrees to the normal axis and a relief flank angle of 45 degrees to the opposite side of the normal axis, resulting in a thread angle (the angle between a load flank and adjacent relief flank) of 52 degrees. Embodiments of nut inner threads 4312 and fitting outer threads 4322 may have a relief flank angle of less than 45 degrees. According to one embodiment, the relief flank angle is between 15-40 degrees, but may be less. The load flank angle may be between 0-15 degrees and may be to the same or opposite side of the normal axis as the relief flank angle. In one embodiment, for example, the relief flank angle is approximately 30 degrees and load flank angle is approximately 3 degrees to provide a 33 degree thread angle. In another embodiment, the load flank may be angled so that the thread angle is less than the relief flank angle. In other words, the load flank and relief flank may be angled to the same side of the normal axis as the relief flank.

Additionally, in some embodiments, the load flank angle of fitting outer threads 4322 may be different than the load flank angle of nut inner threads 4312 to increase interference. For example, the load flank of the fitting outer threads, as illustrated, may be approximately 0 degrees while the load flank of the connection nut inner threads is angled toward the fitting thread load flank several degrees.

In addition, housing inner threads 4304 and nut outer threads 4314 may be configured to increase interference. According to one embodiment, for example, the load flank angles of inner housing threads 4304 and outer nut threads 4314 may be different. In some embodiments, connection nut 4310 does not have outer threads and is axially retained in the housing, while another mechanism is used to prevent counter rotation of connection nut 4310.

Connections discussed above can be formed of any suitable material including, but not limited to PVDF, FEP, PP, PFA and PTFE, compositions comprising polymers, metals or other materials, which meet requirements for use in semiconductor manufacturing. In some cases, if high temperatures are expected, it may be desirable to use materials that exhibit lower creep. Thus, for example, it may be preferable to use PFA for the connection nut and fittings when applications exceed 100 degrees Celsius, as PTFE exhibits more creep at these temperatures. In any case, a connection systems can exceed qualifications for semiconductor manufacturing fittings and may withstand 245 psi (1.69 MPa) for 5 minutes at room temperature or higher (e.g., 535 psi (3.7 MPa) for 5 minutes at room temperature). For example, a connection system of FIG. 43 formed of PFA and PTFE can have a leak pressure of greater than 415 psi (214 lbs. of axial sealing force) (2.87 MPa and 952 Newton sealing force), when pressure is applied at room temperature for five minutes. The leak pressure of the fitting may be greater than 500 psi (3.4 MPa) and even greater than 950 psi (6.6 MPa) at room temperature. A connection system having a nut and fittings formed of PFA, for example, can thus provide the required 150 lbs. (667 Newton) of force specified for FlareMount™ connections with a safety factor (for example, a connection system may provide over 210 lbs. (934 Newton) of axial force for a 1 inch (2.54 centimeter) fitting).

A connection nut may have any suitable form factor and may be integrated as a portion of another component. In some embodiments, the connection nut can feature a wing nut style design where the wings are positioned such that a user can provide the twisting load on the nut to engage or disengage from the fitting. In other embodiments, another form of rotation member may be provided that allows a user to more easily apply torque to the nut. In one embodiment, a connection nut may be coupled to a gear assembly or other drive train that rotates one more connection nuts. The drive train may be arbitrarily complex and can rotate multiple connection nuts at once to create several seals simultaneously.

Figure 44B:
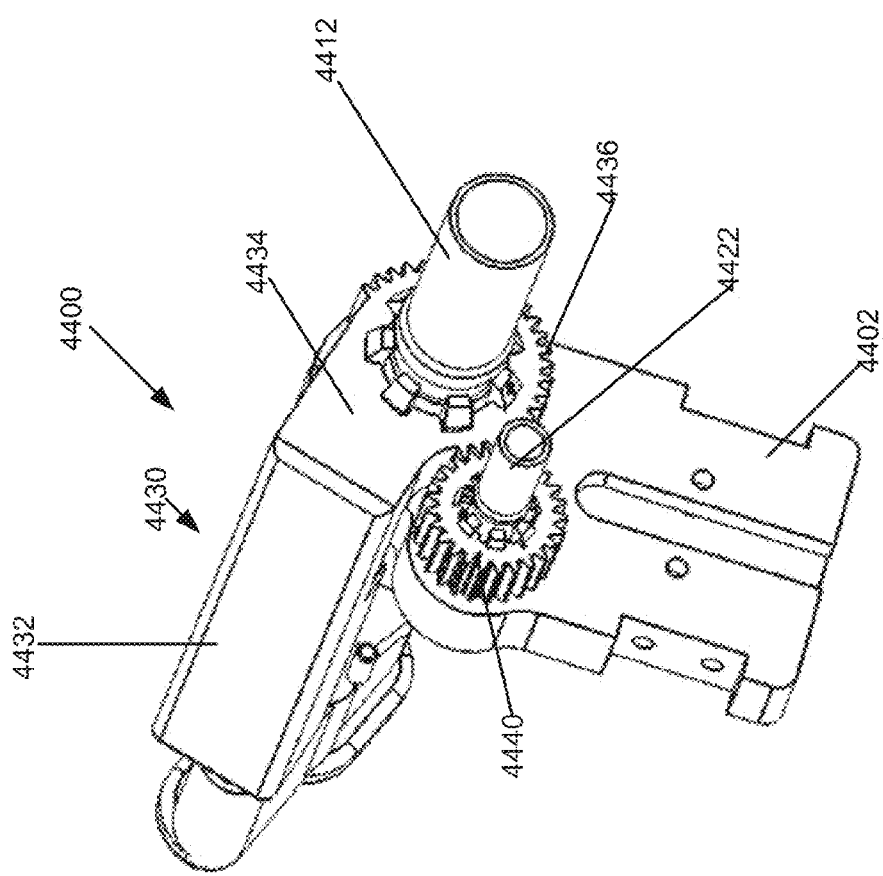

FIGS. 44A and 44B are diagrammatic representations of one embodiment of a connection system 4400. Connection system 4400 comprises a connection housing 4402, a first connection nut 4410 rotatable about a first fluid fitting 4412, a second connection nut 4420 rotatable about a second fluid fitting 4422 and drive system. Connection housing 4402 includes threaded openings passing through housing 4402 from a first side of housing 4402 to a second side of housing 4402. The threads may be configured to engage outer nut threads of connection nuts 4410 and 4420. The drive system is operatively coupled to first connection nut 4410 and second connection nut 4420 to simultaneously rotate first connection nut 4410 and second connection nut 4420 within housing 4402.

A nut coupling member 4434 at a first end of gear arm 4430 extends to the first side of housing 4402. A drive arm 4432 extends from nut coupling member 4434 past the second side of housing 4402 a desired distance. Connection nut coupling member 4434 is coupled to first nut 4410 and includes an outer surface having gear teeth 4436. Gear arm 4430 drives a second gear 4440 coupled to second connection nut 4420. Gear arm 4430 acts as rotation member such that rotation of gear arm 4430 causes first connection nut 4410 and second connection nut 4420 to rotate simultaneously to form a seal between first fluid fitting 4412 and a fitting on a purifier cassette and second fluid fitting 4422 and a second fitting on a purifier cassette.

When gear arm 4430 is rotated, the smaller gear 4440 is also rotated in the opposite direction to engage the smaller port at the same time as the larger port. This mechanism allows for sealing two ports with one single rotating action on gear arm 4430. In the embodiment illustrated, the gears are have a 1.6:1 gear ratio so the smaller connection nut 4420 is rotated more than larger connection nut 4410 (though any suitable gear ratio can be used). If connection nut 4410 is configured with a triple start inner thread so that 165 degrees of rotation results in a 360 degree (or more) of thread engagement, then connection nut 4420 can be configured with a triple start or other multi-start inner thread so that 264 degrees of rotation results in 360 degrees of sealing force. It can be noted that, when the connection nuts turn, the connection nuts may translate toward the purifier cassette end cap (or other fitting). Accordingly, gear arm 4430 and gear 4440 may also translate. In other embodiments, the connection nuts create less than 360 degrees of threaded engagement (and less than 360 degrees of circumferential axial sealing force), but still a sufficient force to seal the fittings.

The internal and external threads of the smaller connection nut 4420 may have pitch that is scaled relative to the internal and external threads of connection nut 4410 so that the filter and the nuts move the same distance axially as gear arm 4430 is rotated. Gear ratios and pitch heights can vary based on the choice of port sizes and the axial travel distance required. Moreover, gears can be provided to rotate additional connection nuts to provide sealing for additional ports and the connection system can be geared so that all the connection nuts rotate the same direction.

A drive handle 4450 can be provided for easy manipulation by a human or robotic user. A drive shaft 4452 extends from handle 4450 toward housing 4402 and may be received in a drive shaft passage in gear arm 4430. Drive shaft 4452 and the drive shaft passage may be splined or otherwise configured to allow translation of drive shaft 4452 in the passage. An end cap alignment post 4454 may extend parallel to drive shaft 4452. End cap alignment post 4454 can be received in a complementary opening in a purifier cassette end cap (e.g., opening 1530 of FIG. 15). End cap alignment post 4454 defines the drive shaft pivot axis.

Rotation of gear arm 4430 may be limited to a particular range of rotation and features may be provided to lock the angular position of gear arm 4430. To this end, a portion of the drive shaft passage more proximate to the connection housing 4402, near a first end of gear arm 4430, may be open to expose the outer surface of drive shaft 4452. Drive shaft 4452 can be retracted so that the end drive shaft 4452 closest to connection housing 4402 can pass past surface 4460 as drive shaft 4452 is rotated about its pivot point. That is, the drive shaft passage and housing 4402 may be configured so that the end of drive shaft 4452 overlaps and may be spaced away from surface 4460 of housing 4402 in a range of angular positions about the drive shaft pivot axis. In certain positions though the end of drive shaft 4452 can be received in an opening in surface 4460, a notch or groove 4464 in the side of housing or other feature to lock gear arm 4430 in a desired angular position. Thus, for example, the end of drive shaft 4452 may pass over surface 4460 from position 4465 to notch 4464. When drive shaft 4452 is aligned with notch 4464, drive shaft 4452 may be translated so that a portion of drive shaft 4452 is received in notch 4464 (engaged position), preventing rotation of gear arm 4430.

Other mechanisms may be used to inhibit rotation of gear arm 4430. As another example, surface 4462 of housing 4402 and facing surface of nut coupling member 4434 may include bevel gear teeth or other features so that the angular position of gear arm 4430 may be maintained. Other locking mechanisms such as indents and detents, locking pins, clips may also be used.

In some embodiments, the end points of rotation may be marked by dots and arrows or other visual indicators. The dots and arrows also provide one example of a visual indicator used to confirm engagement or disengaged. In yet another embodiment, LEDs or other lights that turn on when the rotation member is in the proper position can be used, again providing an indication of proper engagement/disengagement.

Figure 45:
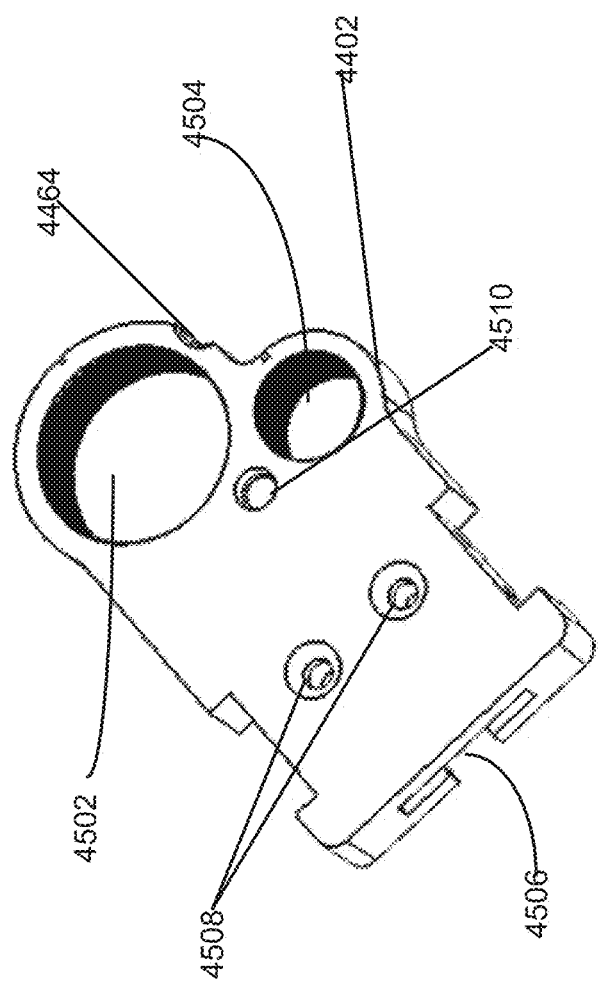
FIG. 45 is a diagrammatic representation of one embodiment of a connection housing.

FIG. 45 is a diagrammatic representation of one embodiment of a connection housing 4402 depicting an embodiment of a first connection nut opening 4502 having internal threading and a second connection nut opening 4504 having internal threading. Although illustrated with two connection nut openings, embodiments can include a connection housing with one or more threaded openings and corresponding connection nuts and fluid fittings. In other embodiments, the housing may axially retain the connection nut without threads. FIG. 45 further depicts notch 4464 disposed in the sidewall of housing 4402 configured to capture a portion drive shaft 4452.

Connection housing 4402 may comprise a bracket having a slot 4506 that can be shaped so that connection housing 4402 may be mounted to a manifold plate. Fastener openings 4508 allow a screw, pin or other member to be used to couple connection housing 4402 to the manifold plate. A threaded hole 4510 can allow a cassette alignment feature to be coupled to connection housing 4402.

FIG. 46A is a diagrammatic representation of one embodiment of a connection nut 4410. Connection nut 4410 comprises outer threads 4600 and inner threads 4602. Inner threads 4602 may be configured so that less than 360 degrees of rotation, and in some cases less than 180 degrees of rotation can create a seal between fittings (and can create 360 degrees of threaded engagement or more or less than 360 degrees of threaded engagement). Outer threads 4600 may be configured to prevent connection nut 4410 from backing out. In other embodiments, connection nut 4410 may lack outer threads and may be axially retained in the housing, while another mechanism is used to prevent counter rotation of connection nut 4410.

Connection nut may 4410 may comprise a set of alignment features that align with complementary features on a fitting. For example, connection nut 4410 may comprise projections 4604 projecting inward from the inner radial surface of the nut opening. Projections 4604 may align with features on a fitting. With reference to FIG. 15B, for example, projections 4604 may fit through notches 1516 in alignment rib 1514. Projections 4604 may be spaced from the start of inner threads 4602 such that inner threads 4602 cannot engage the fixture external threads (e.g., threads 1512 of FIG. 15B) unless projections 4604 pass through the corresponding notches. Projections 4604 may be located so that inner threads 4602 can only engage the external fixture threads when connection nut 4410 is in a specific orientation in relation to the end cap or other fitting threads. Furthermore, in the embodiment illustrated, connection nut 4410 cannot rotate until the projections pass through the notches. Thus, the alignment features of the fitting and alignment features on the connection system (on the connection nut in this example) prevent rotation of the connection nut until the threads properly positioned relative to each other.

Connection nut 4410 may further comprise resilient fingers 4606 extending from one side. Resilient fingers 4606 may be captured by a gear arm or gear. Features 4608 at the ends of resilient fingers 4606 can provide shoulders 4609 that can abut a surface of a gear or gear arm.

FIG. 46B is a diagrammatic representation of one embodiment of connection nut 4410 and fluid fitting 4412. The opening through connection nut 4410 may comprise an area of larger diameter and an area of small diameter to form a connection nut shoulder 4610. The portion of fluid fitting 4412 received in connection nut 4410 may have a portion with a smaller diameter and a portion with a larger diameter to form fluid fitting shoulder 4612 that abuts connection nut shoulder 4610. Connection nut shoulder 4610 may push against fluid fitting shoulder 4612 to provide an axial force sufficient to seal fluid fitting 4412 to a port of a purifier cassette or other component.

Figure 47A:
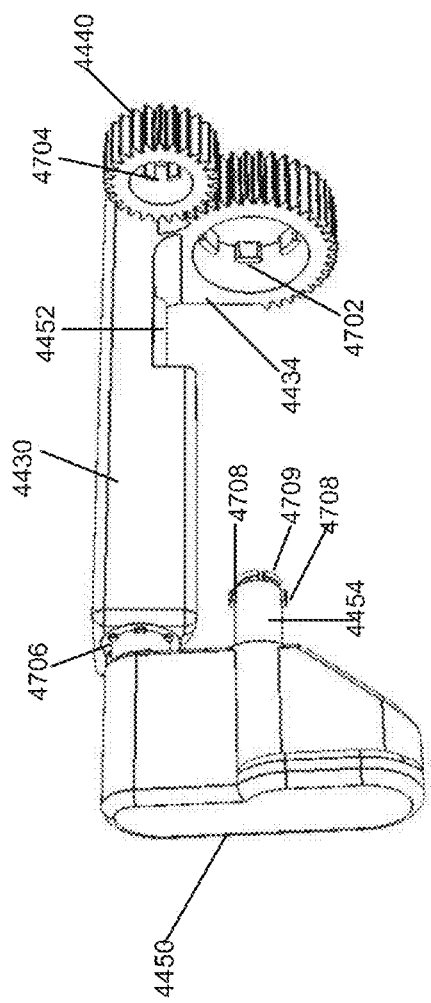
FIGS. 47A-47B are diagrammatic representations of one embodiment of a drive system.

FIG. 47A is a diagrammatic representation of one embodiment of a drive system. Gear arm 4430 may include a nut coupling member 4434 having an opening to receive a first connection nut and gear 4440 having an opening to receive a second connection nut. Features 4702 and 4704 may create channels through which resilient fingers of the respective connection nuts can pass. The features at the end of the resilient fingers (features 4608 of FIG. 46A) can act to fasten the connection nut into the gear arm or gear opening. When the gear arm and gear rotate, features 4702 and 4704 can place radial force on the respective connection nut by pushing on the side edges of the resilient arms, causing the connection nut to rotate.

FIG. 47A further illustrates one embodiment of a drive handle having a drive shaft 4452 and an end cap alignment post 4454. Drive shaft 4452 may be inserted in a passage in gear arm 4430. All or a portion of drive shaft 4452 and the passage may be splined. According to one embodiment, the drive shaft passage splines may be provided by an insert 4706 into the end of gear arm 4430. End cap alignment post 4454 can comprise one or more radial projections 4708 that fit in channels in an end cap opening. The channels and projections 4708 can cooperate to guide the movements of drive handle 4450 to help ensure a proper seal as discussed below. The end of alignment post 4454 may comprise a compressible ring 4709 having an annular groove and lip. The lip may be captured by a portion of the end cap as discussed further below.

Figure 47B:
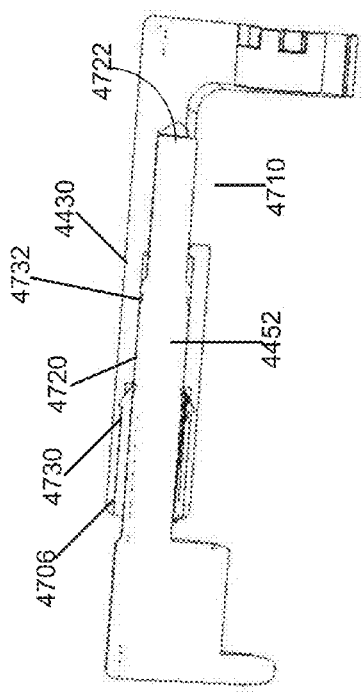

FIG. 47B is a diagrammatic representation of a cross-sectional view of the embodiment of a drive system shown in FIG. 47A. Gear arm 4430 comprises drive shaft passage 4720 that receives drive shaft 4452. An end portion of drive shaft passage 4720 is open to expose a portion drive shaft 4452 (indicated at portion 4710).

Drive shaft 4452 may be translatable in drive shaft passage 4720, such that the drive shaft tip 4722 may be pushed in and retracted. The translation in the direction to retract drive shaft 4452 may be limited by insert 4706. Insert 4706 may include a set of resilient fingers 4730 coaxial with drive shaft 4452 that push inward. When drive shaft 4452 is retracted out a certain distance, resilient fingers 4730 push inward into annular groove 4732 to inhibit further translation in that direction. Insert 4706 may be rotatable in passage 4720 so that drive handle 4450 may rotate about the axis of drive shaft 4452 until the alignment post 4454 is pushed forward into the end cap alignment opening, aligning the splines with slots that permit drive handle 4450 to be pushed further in to lock the two parts together rotationally.

Figure 48:
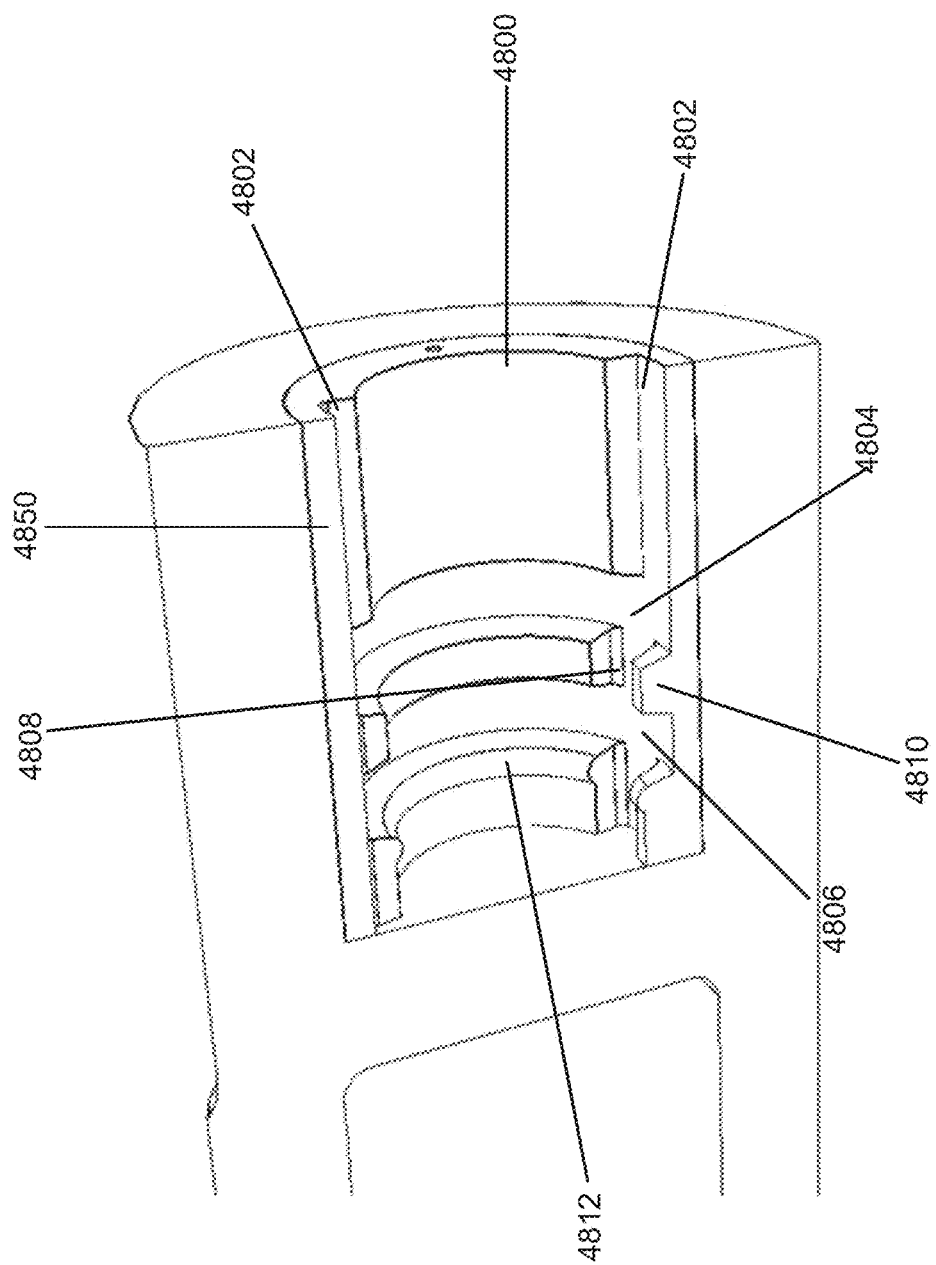
FIG. 48 is a diagrammatic representation of one embodiment of an alignment opening.

FIG. 48 is a diagrammatic representation of one embodiment of an alignment opening 4800 disposed in an end cap or other component to receive alignment post 4454 (FIG. 44A). A number of ribs or other features may be defined on the inside of alignment opening 4800 to define a series of axial and radial channels. According to one embodiment, the features define entrance channels 4802, a first radial channel 4804, a second radial channel 4806, and second axial channels 4808 (one of which is shown) connecting first radial channel with second radial channel 4806. In one embodiment, the channels may be defined in an insert 4850 that is inserted in an end cap opening.

With reference to FIGS. 44-48, when alignment post 4454 is inserted in opening 4800, projections 4708 are received in entrance channels 4802. This means that the drive system is in the correct orientation before alignment post 4454 can be inserted. This orientation may coincide with the orientation in which the inner threads of connection nut 4410 and connection 4420 are properly aligned with the external threads on an end cap, fitting or other fixtures. Drive handle 4450 may be translated, translating drive shaft 4452 in passage 4720. However, the second axial channels 4808 are not aligned with entrance channels 4802 (e.g., rib 4810 overlaps entrance channel 4802 and acts as a stop) such that further translation of drive handle 4450 is limited. Drive handle 4450 can be rotated until projections 4708 align with axial channels 4808. This position can correspond to a position in which drive shaft 4452 aligns with notch 4464 in housing 4402 and connection nut 4410 and connection nut 4420 are rotated to create a 360 degree seal. Drive handle 4450 can then be pushed in further such that drive shaft 4452 is received in notch 4464. The annular lip of compression ring 4709 may pass over ridge 4812 such that ridge 4812 is captured in the groove of compression ring 4709. The compression ring 4709 and ridge 4812 can create a snap fit that provides haptic feedback when drive shaft 4452 is fully engaged with notch 4464. Furthermore, the compression ring 4709 and ridge 4812 provide a mechanism to prevent drive shaft 4452 from being retracted accidentally.

Thus, alignment opening 4800 may provide a keyed feature configured so that when drive shaft 4452 is in a first angular position, drive shaft 4452 can be pushed in a limited first distance. Drive shaft 4452 can then be rotated to a second angular position by rotating gear arm 4430, the second angular position corresponding to a sealed connection. Drive shaft 4452 can be pushed in to a final, fully inserted position, in which drive shaft 4452 acts as a retaining pin to prevent further angular rotation.

FIG. 49A is a diagrammatic representation of one embodiment of a portion of a connection system 4900 similar to connection system 4400. Connection system 4900 may include an alignment feature that engages with a complementary alignment feature on an end cap, fitting or other fixture. In this example, the rotation member (e.g., gear arm 4930) with a slot 4932 having an entrance normal to the direction of radial travel of gear arm 4930 (that is, in the side parallel to the pivot axis). Slot 4932 may receive a radially extending rib 4934 on an end cap, fitting or other fixture (e.g., rib 130 of FIG. 1). These mating features wrap partially around the axis of the port. According to one embodiment, slot 4932 and rib 4934 are configured so that the end of rib 4934 and entrance of slot 4932 align when the connection nut inner threads and outer threads of the end cap, fitting or other fixture are correctly positioned to allow proper engagement. Thus, the connection system alignment feature and complementary end cap, fitting or other fixture alignment feature are configured so that the threads are in the proper position and orientation before the gear arm is rotated.

According to one embodiment, rib 4934 is held in slot 4932 of gear arm 4930 due to the cross-section of rib 4934 being larger as rib 4934 extends out radially (shown in FIG. 49B). Slot 4932 may also be wider as the slot extends out radially. Furthermore, according to one embodiment the slot 4932 and rib 4934 can be helical. This mechanism can be used to help hold the position of gear arm 4930 relative to the filter end cap and can also generate (e.g., through an interference fit) more axial load between the end cap and fluid fitting as gear arm 4930 is rotated about the port axis. The load on the other side of connection housing 4902 can be roughly equivalent to the load generated by the interference fit of the engagement between the walls of slot 4932 and rib 4934. This can help distribute the load on both sides of the rotating mechanism to ensure a smooth rotation and seal engagement. Rib 4934 and slot 4932 can have a pitch that is approximately equal to the pitch of the internal connection nut threads (e.g., the larger connection nut).

The drive shaft may feature a boss or other feature designed to engage a groove 4940 located on the helical rib 4934 of the filter fitting. When the drive shaft is pushed forward after the filter is fluidically sealed, the boss is forced into groove 4940 on the rib 4934. This provides an anti-rotation feature close to the filter fitting. The feature will not engage if the drive shaft is not in the right orientation, alerting the user that the drive handle is not rotated to the correct orientation and the seal is not complete. FIG. 49B illustrates one embodiment of a cross-section of rib 4934. FIG. 49C is a diagrammatic representation of one embodiment of drive handle 4950 having a drive shaft 4952 with boss 4954.

Figure 50:
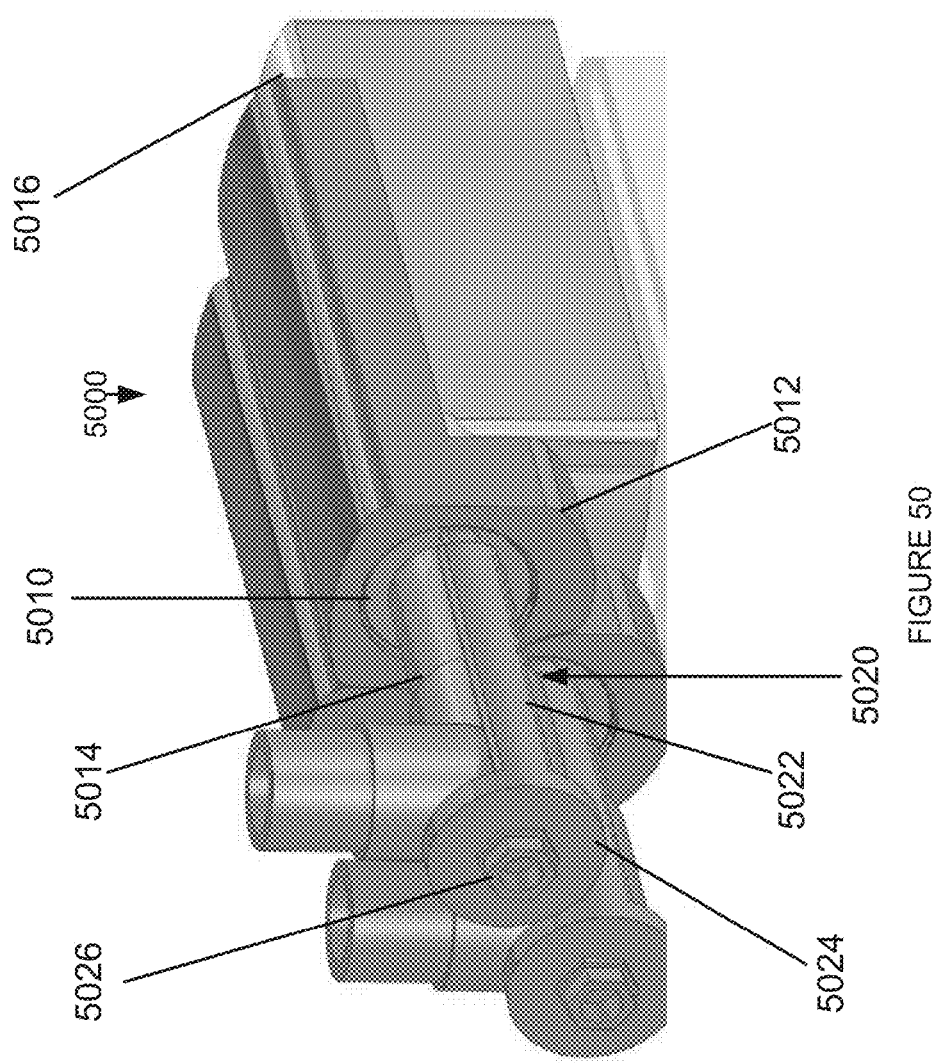
FIG. 50 is a diagrammatic representation of one embodiment of connection system.

FIG. 50 illustrates another embodiment of a connection system 5000 for connecting to a cassette end cap or other fitting. Connection system 5000 can include a connection nut 5010 disposed on a connection housing 5012. The connection nut 5010 connects an elbow fitting 5014 to a fitting on an end cap 5016. A rotation member 5020 facilitates rotating of nut 5010. According to one embodiment, rotation member 5020 comprises an arm 5022 coupled to nut 5010 a radial distance from the opening through nut 5010. The arm 5022 can extend from an end face of the nut 5010. Arm 5022 can be longer than a first portion of elbow fitting 5014 that is coaxial with the end cap fitting. The rotation member 5020 can also include a platform 5024 extending perpendicular to arm 5022 so that an outer face of platform 5024 is parallel to the end face of nut 5010. Platform 5024 can include a tool interface 5026 to allow a rotary tool bit (e.g., such as a hex driver, Philips bit, flat head bit, star bit or other tool, to engage with the rotation member). Rotating rotation member 5020 rotates the nut 5010. In some embodiments, rotating rotation member 5020 less than 360 degrees, including less than 180 degrees and, in some cases, less than 135 degrees, may cause 360 degree engagement of the inner threads of the nut with the outer threads of the end cap 5016.

The range of rotation of rotation member 5020 may be limited so that nut 5010 stops rotating in known positions. This can help ensure that the threads of nut 5010 are properly aligned in the fully disengaged position. In some embodiments, the end points of rotation may be marked by dots and arrows or other visual indicators. The dots and arrows also provide one example of a visual indicator used to confirm engagement or disengaged. In yet another embodiment, LEDs or other lights that turn on when the rotation member is in the proper position may be used, again providing an indication of proper engagement/disengagement.

Figure 51:
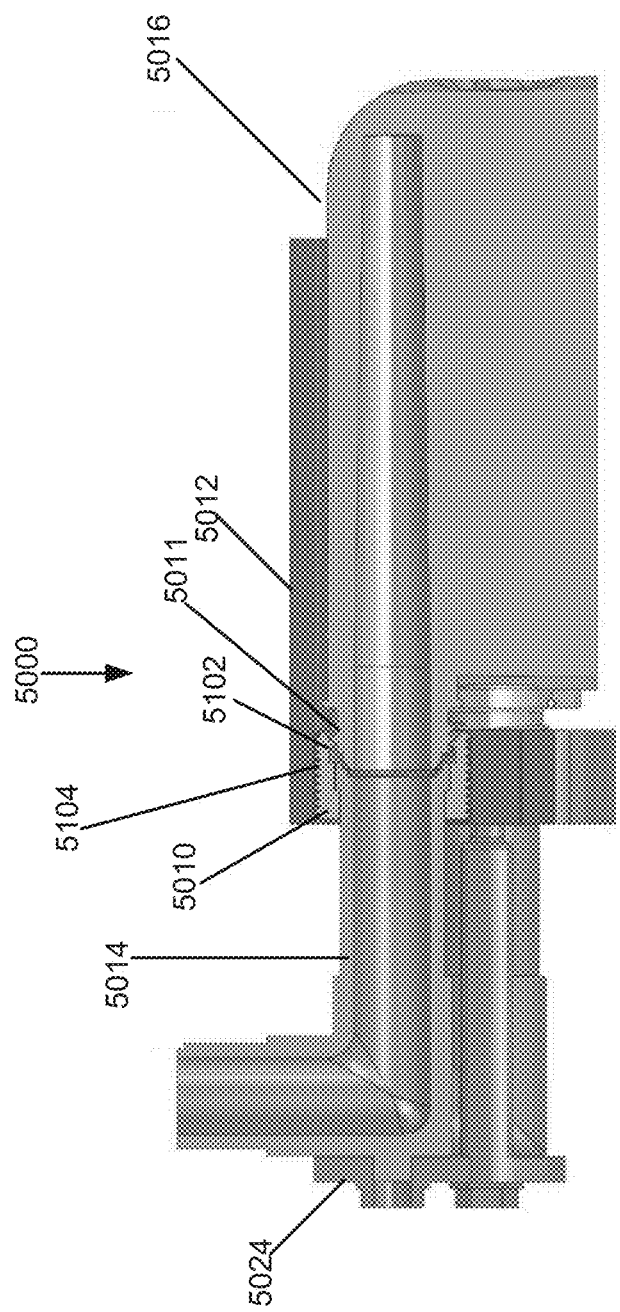
FIG. 51 is a diagrammatic representation of a view of one embodiment of connection system.

FIG. 51 is a diagrammatic representation of a cross-section of one embodiment of connection system 5000. As depicted in FIG. 51, connection nut 5010 may include inner nut threads 5102 that engage with outer threads 5011 on the port fitting of end cap 5016 and outer nut threads 5104 that engage with inner threads of connection housing 5012. As describe above, threads can be configured so that nut 5010 creates a 360 seal between fitting 5014 and end cap 5016 with less than 360 degrees of rotation and will not back out under expected loads A locking mechanism (e.g., such as detents and/or indents on the rotating member of fitting, snap fits between the rotating member and fitting or other component or other features) may also be provided to prevent the rotating member from rotating unexpectedly. In some cases, the locking mechanism may be used in lieu of the outer nut threads to prevent backing out of the nut.

Figure 52:
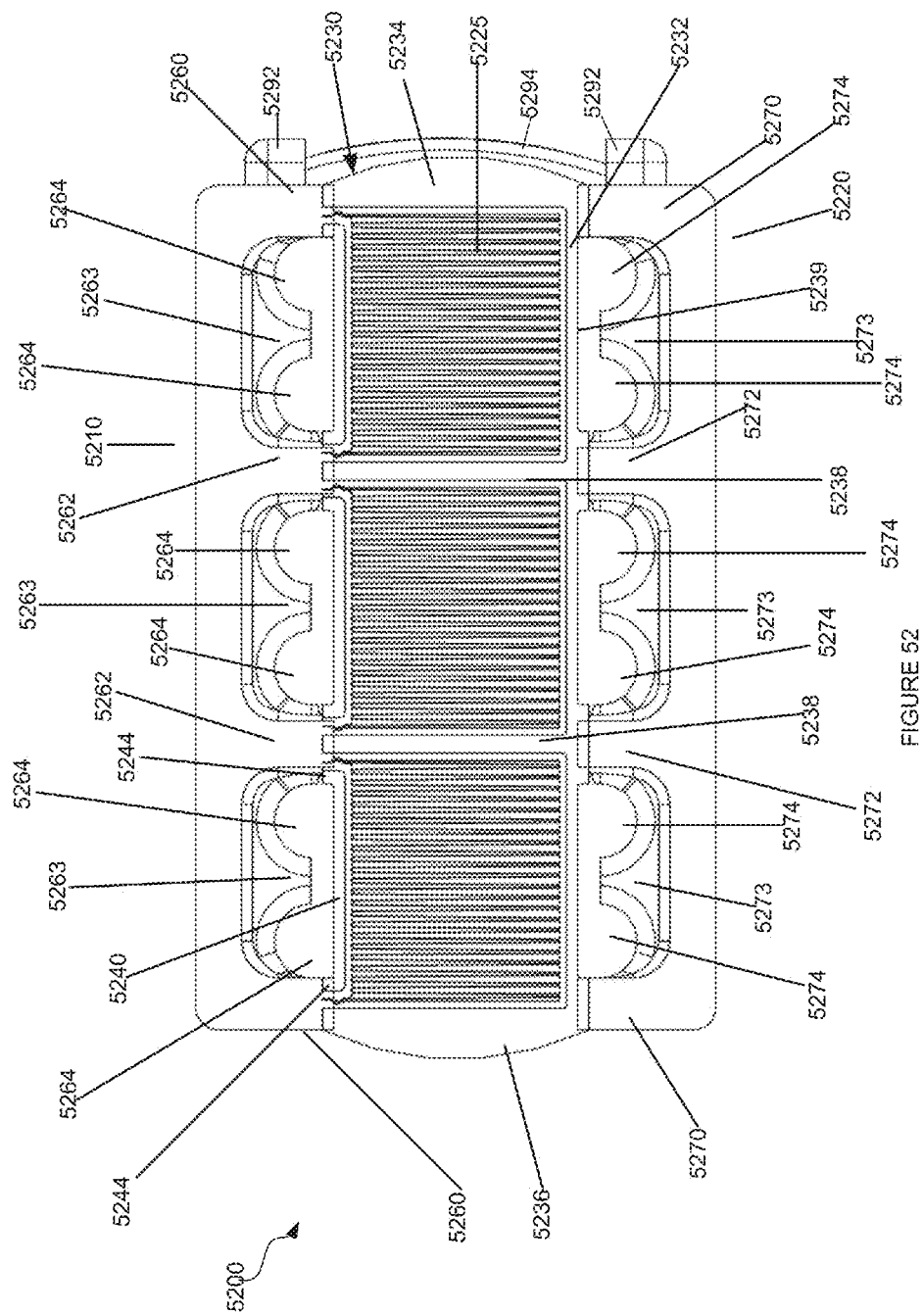
FIG. 52 is a diagrammatic representation of another embodiment of a cassette.

FIG. 52 is a diagrammatic representation of one embodiment of main body 5200 viewed from an end (e.g., with end cap 104 and end cap 106 removed). Main body 5200 may define a media cavity. The media cavity may be segregated into lanes with a purifier element 5225 disposed in each lane. According to one embodiment, the parallel lanes have a generally rectangular (including square) profile in the x-z plane and x-y plane. While three lanes are shown, the purifier cassette may have more or fewer lanes. The lanes may be sealed from each other such that fluid does not flow between lanes. In other embodiments, openings may be provided so that fluid may flow between the segregated lanes. FIG. 52 further illustrates label 5294 in label holders 5292.

According to one embodiment, main body 5200 comprises first side cover 5210, a second side cover 5220, main shell 5230 and lane covers 5240 (one of which is indicated). Main shell 5230, first side cover 5210, second side cover 5220 and the end caps may be coupled together using fasteners, sonic bonding, interference fits or other coupling mechanism and may cooperate to form the media cavity and parallel lanes. Main shell 5230 provides a base 5232 extending between outer sidewall 5234 and outer sidewall 5236 and a set of spaced tension members 5238 extending from base 5232. Sidewall 5234, sidewall 5236, side cover 5210 and side cover 5220 may form the sidewalls of the internal cavity. The main shell sidewalls and tension members 5238 may extend a length along the long axis within the cavity to form lane sidewalls. The portions of base 5232 between the lane sidewalls (for example, between the outer sidewalls 5234/5236 and a tension member 5238 and between two tension members 5238) form integrated lane covers 5239 that comprise a grate to allow fluid flow into or out of the corresponding lane.

One side of base 5232 may include features to facilitate coupling of side cover 5220 to base 5232. According to one embodiment, the base provides a set of side cover mounting surfaces to which a portion of side cover 5220 may be bonded or otherwise coupled. On the opposite side, the ends of outer sidewall 5234, outer sidewall 5236 and tension members 5238 distal from base 5232 can provide features to facilitate coupling of side cover 5210 to main shell 5230. The distal end surfaces may, for example, provide side cover mounting surfaces to which a portion of side cover 5210 may be bonded or otherwise coupled.

Lane covers 5240 span between each main shell sidewall 5234/5236 and a tension member 5238 or between adjacent tension members 5238 and extend the length of the lanes to cover the opposite side of lanes from base 5232. Lane covers 5240 may comprise an outer frame including frame members 5244 that run the length of lane covers 5240 and a grate portion spanning between frame members 5244. The openings in lane covers 5240 may be the same as or different than the openings in integrated lane covers 55239 of base 5232.

The surfaces of frame members 5244 facing side cover 5210 may provide a side cover mounting surface to facilitate coupling of side cover 5210. For example, the side cover mounting surfaces may provide a surface to which a portion of side cover 5210 may be bonded or otherwise coupled. The lane covers 5240 may also include coupling features to facilitate coupling of lane covers 5240 to main shell 5230 using a snap-fit, interference fit, sonic bonding or according to any suitable coupling mechanism. According to one embodiment, lane covers 5240 may include tongues, grooves or other features such that the lane cover 5240 can be captured the in the proper location.

As depicted in FIG. 52, a lane cover is provided on both an upstream and a downstream side of a purifier element 5225 (e.g., in the form of lane cover 5240 and integrated lane cover 5239). In other embodiments, a lane cover is only provided on one side of purifier element 5225. In yet another embodiment, lane covers are not used at all. One advantage to having lane covers to cover both the upstream and downstream side of purifier element 5225 is that the purifier element 5225 can be supported in both forward and reverse flow, allowing the cassette to function similarly in either flow direction.

Side cover 5210 can include side support members 5260, a set of spaced ribs 5262 that align with tension members 5238 and a set of spaced ribs 5263. Side cover 5220 can similarly include side support members 5270, a set of spaced ribs 5272 that align with tension members 5238 and a set of spaced ribs 5273. It can be noted that in contrast to ribs 263 and 273 of FIG. 2, ribs 5263 and ribs 5273 do not extend all the way to the lane covers. That is, there is a gap between the lane covers 5240 and the ends of ribs 5263 and a gap between the ends of ribs 5273 and the lane covers 5239.

Flow channels may be disposed along the sidewalls. To this end, side support members 5260, spaced ribs 5262 and spaced ribs 5263 may extend a length and cooperate to form a set of parallel flow channels subdivided into sub-channels 5264 that are open to lane covers 5240 along their length. Similarly, side support members 5270, spaced ribs 5272 and spaced ribs 5273 may extend a length and cooperate to form a set of parallel flow channels subdivided into flow channel portions 5274 that are open to lane covers 5239 along their length. The ends of the flow channels may form plenums as discussed above and be fluidly coupled to one or more of the inlet, outlet, vent or drain.

While one flow channel subdivided into two sub-channels is depicted per lane, the cassette may have multiple segregated flow channels per lane and additional sub-channels or no sub-channels. The flow channels 5264 and 5274 may have any desired shape and size and different flow channels on the same side or opposite sides may have different configurations. According to one embodiment, the flow channels may be arced, elliptical or otherwise rounded to create a series of arches along the side covers. One arced, elliptical or rounded shape per lane can also be used (e.g., such that the flow channel is not subdivided, but still rounded).

Some of the spaced ribs on each side cover are spaced to align with tension members 5238. The inner surface of these ribs may be coupled to the ends of the tension members. For example, the inner surfaces of ribs 5272 may be coupled to main shell 5230 at the base of tension members 5238 and the inner surfaces of ribs 5262 may be coupled to the distal end of the tension members 5238. Consequently, when the pressure vessel cavity is under pressure, tension members 5238 will assert a force on side covers 5210 and 5220 to reduce or prevent bowing of side covers 5210 and 5220. The size and configuration of tension members 5238 may be selected so that the volumetric deformation of the pressure vessel cavity is less than a desired percentage under expected operating pressures.

Main body 5200 can comprise a series of hoop-like structures to better distribute forces as discussed above. According to one embodiment, transitions in internal surfaces running parallel to the lanes are curved. Thus, for example, corners side cover 5210, the corners of side cover 5220 and the flow passages are curved about axes parallel to the lanes as discussed above in conjunction with FIG. 2 above. Furthermore, the main shell sidewalls 5234 and 5236 have curved exteriors and side covers 5210 and 5220 have curved corners (e.g., with reference to FIGS. 1A and 1B, at the transitions from side 125 to side 124 and side 123 and the transitions from side 126 to side 124 and side 123).

As discussed above, the lanes can provide purifier element holding areas to hold purifier elements 5225. The purifier elements 5225, according to one embodiment, can comprise pleat packs pleated with the length of the pleat parallel to the long axis of the cassette. The pleat tips may be oriented so that the pleat tips on one side point at side cover 5210 while the opposite pleat tips are oriented to point at side cover 5220 with the pleat tips abutting the respective lane cover. In this arrangement, one set of pleat tips faces the upstream portion of the cavity and the other set of pleat tips faces the downstream portion of the cavity. The purifier elements 5225 may be separate purifier elements or each of the purifier elements may be portions of the same continuous pleat pack such that, for example, the last flap of one purifier element 5225 transitions into the first flap of the next filer element 5225 and the last flap of that purifier element transitions into the first flap of the next purifier element 5225 and so on. The pleats of the each purifier element can be formed from a single membrane or multiple membranes formed from the same or different materials. Preferably the pleats are compressed together and form a generally planer rectangular entrance interface on the upstream side and a generally planer rectangular exit interface on the downstream side. The amount of compression of the membrane in a lane for a given area of membrane can be selected to achieve a desired pressure drop and flow rate. Other purification media or media for other purposes (e.g., heat exchange) may also be placed in the lanes, as discussed above.

Figure 53:
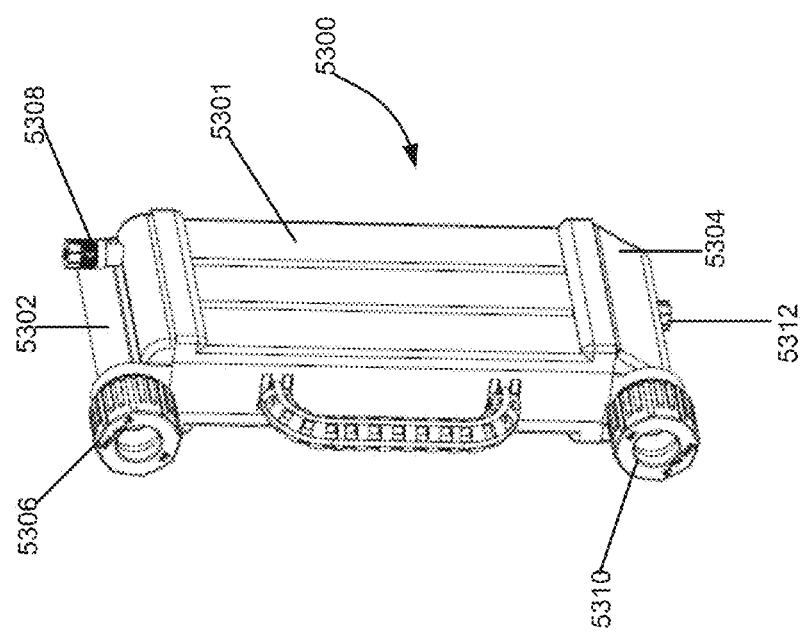
FIG. 53 is a diagrammatic representation of another embodiment of a cassette.

FIG. 53 is a diagrammatic representation of another embodiment of a purifier cassette 5300 comprising a main body 5301, a first end cap 5302 and a second end cap 5304. Main body 5301 can be configured as discussed above. End cap 5302 can provide a first port 5306 and a second port 5308 and end cap 5304 can provide a third port 5310 and a fourth port 5312. The ports can provide an inlet port, an outlet port, a vent port and a drain port. For example, port 5306 may be an outlet port, port 5308 a vent port, port 5310 an inlet port and port 5312 a drain port. In the embodiment of FIG. 53, the port fittings can be standard port fittings used, for example, in semiconductor manufacturing.

End cap 5302 can be configured so that gas on an upstream side of the cassette is directed to second port 5308 (e.g., end cap 5302 may be drafted or otherwise shaped so that the vent port is at the highest point on the upstream side of the cavity) and end cap 5304 can be configured so that fluid on the downstream side flows to port 5312 (e.g., end cap 5304 may be drafted or otherwise shaped so that the drain port is at the lowest point on the downstream side of the cavity).

Figure 54:
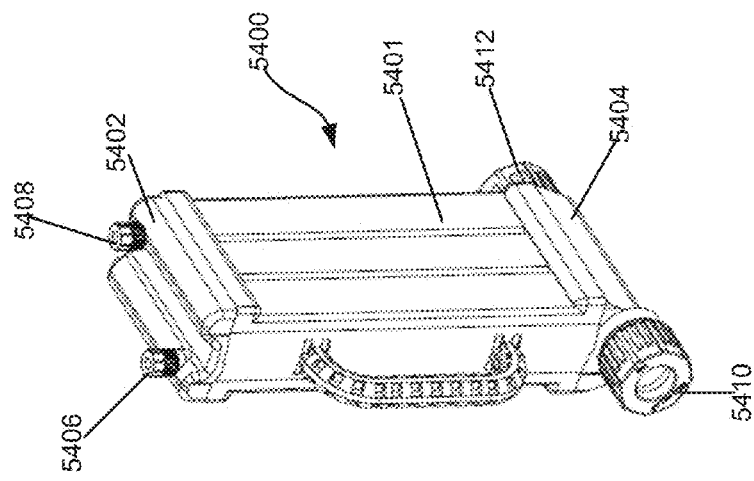
FIG. 54 is a diagrammatic representation of another embodiment of a cassette.

FIG. 54 is a diagrammatic representation of another embodiment of a purifier cassette 5400 comprising a main body 5401, a first end cap 5402 and a second end cap 5404. Main body 5401 can be configured as discussed above. End cap 5402 can provide a first port 5406 and a second port 5408 and end cap 5404 can provide a third port 5410 and a fourth port 5412. The ports can provide an inlet port, an outlet port, an upstream vent port and a downstream vent port. For example, port 5406 may be a downstream vent port, port 5408 an upstream vent port, port 5410 an inlet port and port 5412 an outlet port. End cap 5402 can be configured so that gas is directed to first port 5406 and second port 5408 (e.g., end cap 5402 may be drafted or otherwise shaped so that the vent ports are at the highest point on the upstream side of the cavity and downstream side of the cavity). In the embodiment of FIG. 54, the port fittings can be standard port fittings used, for example, in semiconductor manufacturing.

Figure 55:
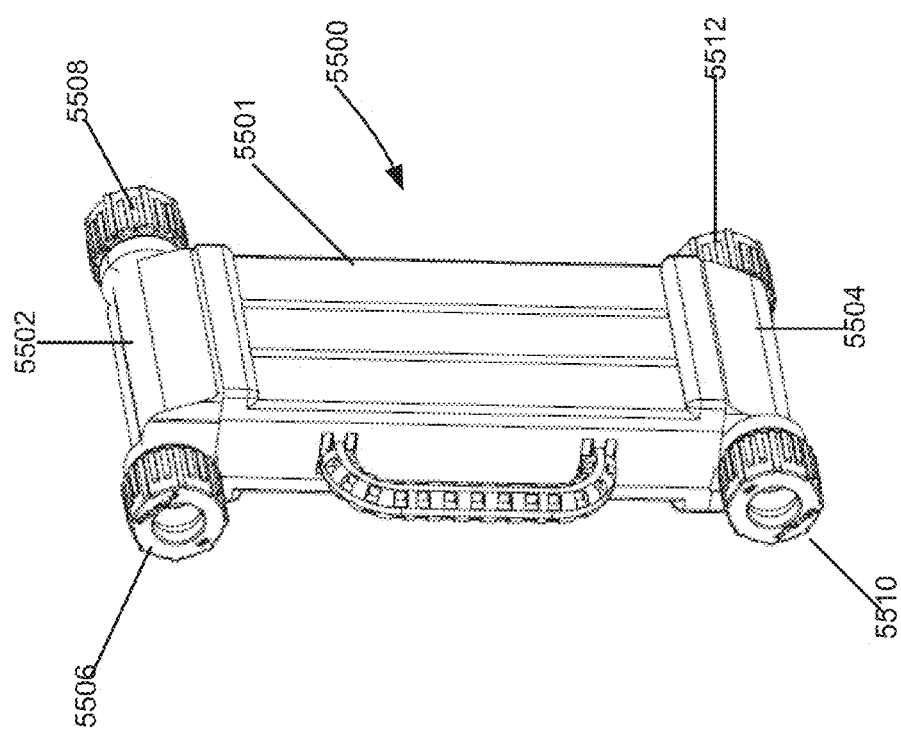
FIG. 55 is a diagrammatic representation of another embodiment of a cassette.

FIG. 55 is a diagrammatic representation of another embodiment of a purifier cassette 5500 with fluid port facing front and back, comprising a main body 5501, a first end cap 5502 and a second end cap 5504. Main body 5501 can be configured as discussed above. End cap 5502 can provide a first port 5506 and a second port 5508 and end cap 5504 can provide a third port 5510 and a fourth port 5512. The ports can provide an inlet port, an outlet port, a vent port and a drain port. In this case, all the ports can be horizontal ports. In the embodiment of FIG. 55, the port fittings can be standard port fittings used, for example, in semiconductor manufacturing.

End cap 5502 can be configured so that gas on an upstream side of the cassette is directed to the vent port (e.g., end cap 5502 may be drafted or otherwise shaped so that the vent port is at the highest point on the upstream side of the cavity) and end cap 5504 can be configured so that fluid on the downstream side flows to port 5512 (e.g., end cap 5504 may be drafted or otherwise shaped so that the drain port is at the lowest point on the downstream side of the cavity).

FIG. 56 is a diagrammatic representation of one embodiment of a filtration system 5600 with two, generally rectangular, purifier cassettes 5602 that each provide 3 m$^2$ of filtration membrane (for a total of 6 m$^2$) compared to prior cylindrical filters (Chemline I filters 5604 by Entegris, Inc. of Billerica, Mass. and Chemlock cylindrical filters 5606 (also by Entegris, Inc.)) having the same filtration area. The generally rectangular purifier cassettes provide the same filtration area in a smaller volume. Filtration system 5600 takes up room and only requires space in front of the manifold to manipulate the gear arms and insert the filters. The cylindrical filters are wider and, in practice, take more lateral room than shown in order for a user to manipulate the filter fittings when replacing the filters. The dimensions of FIG. 56 are provided by way of context and not limitation. Purifier cassettes may be made larger or smaller depending on application and purification and flow requirements.

Although specific embodiments have been described, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

For example, any filter structures described herein may comprise a first polymer overmolded on one or more surfaces with a second polymer. As another example, the media may include a membrane that can be surface modified by chemical coating, plasma treatment, laser or lamp treatment and the like to include ion exchange groups, hydrophilic groups, hydrophobic groups and other functional moieties that aid in the purification of fluids treated by the porous membrane. As another example, ion exchange media can be placed in membrane pouches and these pouches sealed into the channels or lanes of the cassette. In another embodiment, a porous membrane with embedded ion exchange membrane could be pleated and bonded into the lanes. It would also be possible to gasify or degas a liquid using a porous or non-porous membrane within a cassette by flowing liquid on one side of the housing and either applying gas or pulling vacuum through the fittings on the other side of the cassette. In another embodiment, a cassette can be configured to transfer heat using a non-porous membrane.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A purifier cassette with a rectangular profile, the cassette comprising:
a purifier body that comprises a set of media cavity sidewalls at least partially defining a media cavity, the set of media cavity sidewalls comprising a first sidewall, a second sidewall, a third sidewall and a fourth sidewall, the first sidewall opposite the second sidewall and the third sidewall opposite the fourth sidewall;
one or more tension members coupled to the first sidewall and the second sidewall of the media cavity, the one or more tension members at least partially defining one or more media holding areas, the one or more tension members run parallel to the third sidewall and fourth sidewall and divides the media cavity into a plurality of parallel lanes;
a first purifier port fluidly connected to the media cavity and a second purifier port fluidly connected to the media cavity;
a purifier element disposed in each of the one or more holding areas, the purifier element comprises a rectangular pleat pack disposed in each of the plurality of lanes, wherein each rectangular pleat pack is arranged with a first set of pleat tips facing an upstream portion of the media cavity and providing a generally planar rectangular entrance interface and a second set of pleat tips facing a downstream portion of the media cavity and providing a generally planar rectangular exit;
a first side cover providing the first sidewall and defining a first set of flow channels disposed along the first sidewall, the first set of flow channels connected to the first purifier port; a second side cover providing the second sidewall and defining a second set of flow channels disposed along the second sidewall the second set of flow channels on an opposite side of the plurality of parallel lanes from the first set of flow channels;
the first side cover comprises a first set of spaced ribs extending inward from the first sidewall; the second side cover comprises a second set of spaced ribs extending inward from the second sidewall; the first set of flow channels comprises a first series of rounded channels open on a first side cover inner side facing the plurality of parallel lanes, the first series of rounded channels at least partially defined by the first set of spaced ribs; and the second set of flow channels comprises a second series of rounded channels open on a second side cover inner side facing the plurality of parallel lanes, the second series of rounded channels at least partially defined by the second set of spaced ribs.

2. The purifier cassette of claim 1, wherein the first set of flow channels comprises a plurality of flow channels per lane and the second set of flow channels comprises a plurality of flow channels per lane.

3. The purifier cassette of claim 1, further comprising a main shell, the main shell further comprising a base having openings to allow fluid to flow into or out of the plurality of lanes; a set of outer sidewalls providing the third sidewall and the fourth sidewall; and the one or more tension members.

4. The purifier cassette of claim 3, wherein the first side cover and second side cover are coupled to the outer sidewalls and the one or more tension members on opposite sides of the main shell.

5. The purifier cassette of claim 4, further comprising a lane cover disposed over each lane between the first side cover and the purifier element disposed in that lane, each lane cover comprising openings to allow fluid to flow from the first set of flow channels into the lane.

6. The purifier cassette of claim 4, further comprising a first end cap coupled to a first end of the purifier body and a second end cap coupled to a second end of the purifier body, the first end cap comprising the first filter port.

7. The purifier cassette of claim 6, wherein the second end cap comprises the second purifier port.

8. The purifier cassette of claim 6, wherein the purifier element comprises a first end proximate to the first end cap and a second end proximate to the second end cap, wherein the first end and second end of the purifier element are potted.

9. The purifier cassette of claim 1, wherein fluid flows through the lanes in parallel.

10. The purifier cassette of claim 6, wherein the first end cap comprises a guide slot to receive a guide of a manifold.

11. A method of assembling a purifier cassette having a media cavity, the method comprising:
    providing a main shell that comprises a set of outer sidewalls and one or more tension members, the outer sidewalls and one or more tension members at least partially defining one or more media holding areas;
    placing a purifier element in each of the one or more media holding areas, the one or more media holding areas comprise a plurality of parallel lanes wherein the placing comprises placing a pleat pack in each of the plurality of lanes with each pleat pack arranged with a first set of pleat tips facing a first portion of the media cavity and providing a generally planer rectangular entrance interface and a second set of pleat tips facing a second portion of the media cavity and providing a generally planer rectangular exit interface;
    coupling a lane cover to the main shell to cover the one or more media holding areas, wherein coupling the lane cover to the main shell comprises coupling a plurality of lane covers to the main shell such that each lane has a corresponding lane cover between the lane and a first side cover;
    coupling the first side cover and a second side cover to opposite sides of the main shell, the first side cover comprises a first set of spaced ribs extending inward and defines a first series of rounded flow channels in fluid communication with a first port and open on a first side cover inner side facing the plurality of lanes; and the second side cover comprises a second set of spaced ribs extending inward and defines a second series of rounded flow channels in fluid communication with a second port and open on a second side cover inner side facing the main shell;
    coupling a first end cap comprising the first port to the main shell at a first end of the media cavity such that the first port of the first end cap is in fluid communication with the first portion of the media cavity;
    and coupling a second end cap comprising the second port to the main shell at a second end of the media cavity such that the second port is in fluid communication with a second portion of the media cavity that is on the opposite side of the main shell from the first portion of the media cavity.

12. The method of claim 11, wherein the main shell comprises a grated base.

* * * * *